US012759912B2

(12) United States Patent
Rau et al.

(10) Patent No.: US 12,759,912 B2
(45) Date of Patent: Oct. 13, 2026

(54) METHODS AND SYSTEM FOR ALKALIZING A BODY OF WATER AND REMOVING CARBON DIOXIDE, AND A DOSING STATION THEREFOR

(71) Applicant: PLANETARY TECHNOLOGIES INC., Gatineau (CA)

(72) Inventors: Gregory Hudson Rau, Castro Valley, CA (US); William James Burt, Halifax (CA); Yuanyuan Xu, Dartmouth (CA); Stephen A. Rackley, Englefield Green (GB); Robert Izett, Sambro Head (CA); Michael John Kelland, Ottawa (CA); Maged E. Beshai, Maberly (CA)

(73) Assignee: Planetary Technologies Inc., Gatineau (CA)

( * ) Notice: Subject to any disclaimer, the term of this patent is extended or adjusted under 35 U.S.C. 154(b) by 388 days.

(21) Appl. No.: 18/537,553

(22) Filed: Dec. 12, 2023

(65) Prior Publication Data

US 2024/0190733 A1 Jun. 13, 2024

Related U.S. Application Data

(60) Provisional application No. 63/432,320, filed on Dec. 13, 2022.

(51) Int. Cl.
*C02F 103/00* (2006.01)
*C02F 1/00* (2023.01)
(Continued)

(52) U.S. Cl.
CPC .............. *C02F 1/683* (2013.01); *C02F 1/008* (2013.01); *C02F 1/686* (2013.01);
(Continued)

(58) Field of Classification Search
CPC .......... C02F 1/008; C02F 1/683; C02F 1/686; C02F 2101/10; C02F 2103/007;
(Continued)

(56) References Cited

U.S. PATENT DOCUMENTS 11,358,098 B2 6/2022 Regan et al.
11,745,141 B2 9/2023 Johnson et al.
(Continued)

OTHER PUBLICATIONS

Ho, et al., "Monitoring, reporting, and verification for ocean alkalinity enhancement," State of the Planet, Chapter 12, Guide to Best Practices in Ocean Alkalinity Enhancement Research (Year: 2023).*
(Continued)

*Primary Examiner* — Patrick Orme
(74) *Attorney, Agent, or Firm* — IP-MEX Inc.; Victoria Donnelly; Daisy Williams

(57) ABSTRACT

Methods and systems are described for removing carbon dioxide from the atmosphere by adding $CO_2$-reactive chemical base to a body of water in contact with the atmosphere, and determining the quantity of carbon dioxide removed from the atmosphere or prevented from reaching the atmosphere. The alkalinity addition to the body of water is controlled by a dosing apparatus capable of determining an amount of $CO_2$-reactive alkalinity required for achieving a permissible target carbon dioxide removal. A rate of alkalinity flow is affected by input from sensors that monitor conditions in the body of water.

22 Claims, 43 Drawing Sheets

(51) Int. Cl.
*C02F 1/68* (2023.01)
*C02F 103/02* (2006.01)
*C02F 103/08* (2006.01)
*C02F 101/10* (2006.01)

(52) U.S. Cl.
CPC .... *C02F 2101/10* (2013.01); *C02F 2103/007* (2013.01); *C02F 2103/023* (2013.01); *C02F 2103/08* (2013.01); *C02F 2209/003* (2013.01); *C02F 2209/24* (2013.01)

(58) Field of Classification Search
CPC ............ C02F 2103/023; C02F 2103/08; C02F 2209/003; C02F 2209/24
See application file for complete search history.

(56) References Cited

U.S. PATENT DOCUMENTS

| | | | |
|---|---|---|---|
| 2009/0169452 A1 | 7/2009 | Constantz et al. | |
| 2021/0129078 A1* | 5/2021 | Regan .................... | B63H 21/00 |

OTHER PUBLICATIONS

D. Pierrot, D. E. Lewis, and D. W. R. Wallace. Index of /ftp/co2sys/CO2SYS_calc_XLS. MS Excel Program Developed for CO2 System Calculations. ORNL/CDIAC-105a. Carbon Dioxide Information Analysis Center, Oak Ridge National Laboratory, U.S. Department of Energy, Oak Ridge, Tennessee. doi: 10.3334/CDIAC/otg.CO2SYS_XLS_CDIAC105a. Oct. 24, 2006.

Richard E. Zeebe and Dieter Wolf-Gladrow. CO2 in Seawater: Equilibrium, Kinetics, Isotopes. Elsevier Oceanography Series 65. Chapter 1 Equilibrium. Published 2001.

Ken Caldeira and Michael E. Wickett. Ocean model predictions of chemistry changes from carbon dioxide emissions to the atmosphere and ocean. Journal of Geophysical Research, vol. 110, Issue C9, pp. 1-12. Published Sep. 21, 2005.

Christopher L. Sabine and Toste Tanhua. Estimation of anthropogenic CO2 inventories in the ocean. Annual Review of Marine Science, 2010. 2:175-98. First published online as a Review in Advance on Oct. 1, 2009.

Daniel C. Jones et al. Spatial and seasonal variability of the air-sea equilibration timescale of carbon dioxide. Global Biogeochem. Cycles, 28, 1163-1178. Published online Nov. 5, 2014.

Rik Wanninkhof. Relationship Between Wind Speed and Gas Exchange Over the Ocean. Journal of Geophysical Research, vol. 97, No. C5, pp. 7373-7382, May 15, 1992.

R.C. Upstill-Goddard et al. Gas transfer velocities in lakes measured with SF6. Tellus, 42B, vol. 4, p. 364-377. Published Feb. 23, 1990.

E. P. Jones and S. D. Smith. A First Measurement of Sea-Air CO. Flux by Eddy Correlation. Journal Ofgeophysical Research, vol. 82, No. 37. pp. 5990-5992. Published Dec. 20, 1977.

Cor M. J. Jacobs et al. Air'sea fluxes and transfer velocity of CO2 over the North Sea: results from ASGAMAGE. Tellus B: Chemical and Physical Meteorology, 51:3, 629-641, DOI: 10.3402/tellusb.v5113.16447. Published online Dec. 15, 2016.

Peter Rogowski et al. Mapping ocean outfall plumes and their mixing using autonomous underwater vehicles. Journal of Geophysical Research, vol. 117, C07016, doi: 10.1029/2011JC007804, p. 1-12, Published Jul. 20, 2012.

Holt, J., and Proctor, R. The seasonal circulation and volume transport on the northwest European continental shelf: A fine-resolution model study. J. Geophys. Res. 113, C06021, doi: 10.1029/2006JC004034, p. 1-20. Published Jun. 24, 2008.

Brown, J., et al. Observations of the physical structure and seasonal jet-like circulation of the Celtic Sea and St. George's Channel of the Irish Sea. Continental Shelf Research 23 (2003) 533-561. doi:10.1016/S0278-4343(03) 00008-6. Published Jan. 2003.

David T. Ho, Laurent Bopp, Jaime B. Palter, Matthew C. Long, Philip W. Boyd, Griet Neukermans, and Lennart T. Bach, "Monitoring, reporting, and verification for ocean alkalinity enhancement," State of the Planet, Chapter 12—Guide to Best Practices in Ocean Alkalinity Enhancement Research, p. 1-9 (Nov. 27, 2003).

* cited by examiner

200

1200 Sensor's data 1210 1220 1230

| Sensor Identifier | Location $(\rho, \phi)$ | Measured water property | | | | | | | | |
|---|---|---|---|---|---|---|---|---|---|---|
| | | $P_1$ | $P_2$ | $P_3$ | $P_4$ | $P_5$ | $P_6$ | $P_7$ | $P_8$ | $P_9$ |
| (1) | | | | | | | | | | |
| (2) | | | | | | | | | | |
| | | | | | | | | | | |
| (Σ−1) | | | | | | | | | | |
| (Σ) | | | | | | | | | | |

*FIG. 12*

1500

| 1510 Alkalinity source → | 1520 Experimentation Site → | | | | |
|---|---|---|---|---|---|
| | Site-1 | Site-2 | ••• | Site-(M−1) | Site-M |
| Source-1 | Q(1,1) | | | | |
| Source-2 | | | | Q(2, M−1) | |
| ••• | | | | | |
| Source-(N−1) | | | | | |
| Source-N | | 1530 CDRnet Q(N,2) | | | Q(N,M) |

FIG. 15

| | | | | | | | | | | | | | | |
|---|---|---|---|---|---|---|---|---|---|---|---|---|---|---|
| | + | + | + | + | + | − | | | | + | − | + | | − |
| Δ | 0200 | 0200 | 0200 | 0200 | 200 | 200 | 00 | 00 | 00 | 200 | 200 | 200 | 00 | 200 |
| Φ | 0200 | 0400 | 0600 | 0800 | 1000 | 0800 | 800 | 0800 | 800 | 1000 | 800 | 1000 | 1000 | 800 |

| | | | | | | | | | | | |
|---|---|---|---|---|---|---|---|---|---|---|---|
| | + | + | + | + | + | − | + | − | + | − | + |
| Δ | 0200 | 0200 | 0200 | 0200 | 200 | 100 | 50 | 25 | 12.5 | 6.25 | 3.125 |
| Φ | 0200 | 0400 | 0600 | 0800 | 1000 | 0900 | 950 | 925 | 937.5 | 931.25 | 934.37 |

5000

METHODS AND SYSTEM FOR ALKALIZING A BODY OF WATER AND REMOVING CARBON DIOXIDE, AND A DOSING STATION THEREFOR

FIELD OF THE INVENTION

The present invention relates to sequestering a carbon dioxide gas from the atmosphere, and in particular to methods and system for alkalizing a body of water that is in contact with the atmosphere, measuring the carbon dioxide uptake and storage, and a dosing station therefor, thereby sequestering the carbon dioxide from the atmosphere.

BACKGROUND OF THE INVENTION

It is of interest to reduce or stabilize atmospheric $CO_2$ concentrations in order to avoid deleterious climate and ocean chemistry impacts. Various thermo-chemical and electrochemical processes have been developed to reduce $CO_2$ emissions as well as to remove $CO_2$ from air.

Among these processes, $CO_2$ capture through the reaction with certain $CO_2$-reactive, alkaline chemicals has been explored in capturing and sequestering $CO_2$ coming from a variety of concentrated and dilute sources. These alkaline chemicals include but are not limited to metal oxides, hydroxides, carbonates and silicates that may be in dissolved, solid or mixed form that ultimately completely or partially dissolve to produce alkalinity in solution.

For example, the addition of $CO_2$-reactive alkalinity to surface ocean waters can remove and store atmospheric $CO_2$ through the transformation of some of the $CO_2$ naturally dissolved in seawater, into dissolved bicarbonate and carbonate ions. This can force a $CO_2$ undersaturation relative to air in the seawater such that when equilibrated with air, $CO_2$ diffuses from air to the seawater via air-sea gas equilibration processes. Thus, an atmospheric $CO_2$ sink is created.

On the other hand, the addition of $CO_2$-reactive alkalinity to solutions that are supersaturated in $CO_2$, where the $CO_2$ partial pressure in the solution is naturally greater than that of the atmosphere, consumes some or all of the excess $CO_2$ such that the otherwise natural flux of $CO_2$ from the solution to the air is reduced or eliminated. In this way the natural addition of such $CO_2$ to the existing atmospheric $CO_2$ burden is beneficially reduced or avoided. Examples include the addition of $CO_2$-reactive alkalinity to areas of the surface ocean or other water bodies that are naturally supersaturated in $CO_2$ relative to air, and that is a natural source of atmospheric $CO_2$. Ocean areas where subsurface ocean water supersaturated in $CO_2$ is forced to the ocean surface due to wind-driven upwelling or other mixing mechanisms. In the extreme, if enough alkalinity is added to such an area of natural $CO_2$ emissions to the atmosphere, seawater $CO_2$ can become undersaturated relative to air, thus converting what was once an atmospheric $CO_2$ source into a $CO_2$ sink.

There is a significant global potential for such approaches to contribute to atmospheric $CO_2$ management. However, actual measurement and verification of such $CO_2$ removal and/or sequestration is challenging. Therefore there is a need in the industry for developing a system and methods for accurate determining of carbon dioxide removal, and a dosing station therefor.

SUMMARY OF THE INVENTION

Methods and system are described for adding $CO_2$-reactive chemical compounds in particular certain chemical bases or alkalinity, for example magnesium hydroxide or another metal hydroxide, to a body of water that is in contact with the atmosphere so as to effect $CO_2$ removal from the atmosphere or to prevent $CO_2$ from entering the atmosphere.

More specifically, methods and system are described that allow maximum $CO_2$ removal or emissions reduction while staying within desired environmental limits and to allow increased precision and accuracy of the measurement of the $CO_2$ removal or emissions reduction effected. This includes a dosing and monitoring apparatus that automatically adjusts the dosing rate based on pH, total suspended solids or other parameter thresholds which are undesirable to exceed.

The embodiments of the present inventions also include methods of quantifying gross $CO_2$ removal. In particular methods are described for measuring the loss of alkalinity from a surface mixed layer of the body of water relative to the air/water $CO_2$ exchange rate, so as to quantify the efficiency of the $CO_2$ removal/storage relative to the quantity of the added alkalinity. Methods of calculating net $CO_2$ removal and accounting for uncertainty in the preceding measurements are also described.

There is an object of the present invention to provide a system, method, dosing station and controller for determining and dispensing a required amount of alkalinity to the body of water that is in contact with the atmosphere to achieve a permissible target carbon dioxide removal from the atmosphere.

According to one aspect of the invention, there is provided a computer implemented method for Carbon Dioxide Removal (CDR) from the atmosphere using a body of water that is in contact with the atmosphere, the method comprising:

(1) setting an amount of $CO_2$-reactive alkalinity to be added to the body of water, and a rate of dispensing of the amount to the body of water, the amount of $CO_2$-reactive alkalinity being less than a target amount;

(2) dispensing the amount of the $CO_2$-reactive alkalinity in the body of water at the rate of dispensing;

(3) during said dispensing, monitoring the body of water by one or more sensors, and adjusting the rate of dispensing so as to ensure measurements of said one or more sensors are within respective predetermined limits;

(4) estimating a CDR achieved by said dispensing, according to a chemical mass stoichiometry of carbon dioxide reaction with the $CO_2$-reactive alkalinity;

(5) adjusting the estimated CDR from the step (4) by taking into account a $F_{equil}$ factor, indicating a fraction of alkalized, $CO_2$-depleted water equilibrated with air, thus determining an adjusted CDR;

(6) determining a cumulative amount of the $CO_2$-reactive alkalinity that has been dispensed over time to the body of water; and (7) if the cumulative amount of alkalinity is less than a predetermined target amount of alkalinity to be dispensed to the body of water, repeating the steps (1) to (6) until the predetermined target amount of alkalinity has been dispensed; thereby removing carbon dioxide from the atmosphere.

The method further comprises:

before the step (1), setting a target CDR;

after the step (5), determining a cumulative adjusted CDR; and in the step (7), further verifying if the cumulative adjusted CDR is less than the target CDR, and repeating the steps (1) to (6) until the earlier of: the predetermined target amount of alkalinity has been dispensed or the target CDR has been achieved.

The method further comprises: (5a) further adjusting the adjusted CDR by taking into account a $F_{hback}$ factor indicating a degree of uncertainty of the adjusted target CDR, thereby determining a further adjusted CDR, the step (5a) being performed after the step (5).

In the method described above, the CDR of the step (5a) is determined as follows: CDR=(t alkalinity added×t $CO_2$ removed/t alkalinity)×($F_{equil}$−$F_{hback}$), wherein "t" is amount measured in tonnes (metric tons).

The method further comprises: (5b) further adjusting the further adjusted CDR of the step (5a) by taking into account a $CDR_{ww}$ achieved within a wastewater pipe prior to discharge to said body of water, wherein $CDR_{ww}$ is determined under assumption that unalkalized wastewater is supersaturated in $CO_2$ relative to air, the step (5b) being performed after the step (5a).

In the method described above, the CDR of the step (5b) is determined as follows: CDR=[((t alkalinity added×t $CO_2$ removed/t alkalinity)−$CDR_{ww}$)×($F_{equil}$−$F_{hback}$)]+$CDR_{ww}$ wherein "t" is amount measured in tonnes, and $F_{hback}$ is a factor, indicating a degree uncertainty of the adjusted target CDR of the step (5).

The method further comprises: (5c) further adjusting the CDR of the step (5b) by taking into account carbon dioxide emissions that occurred during production, transportation and distribution of the $CO_2$-reactive alkalinity.

In the method described above, the CDR of the step (5c) is determined as follows: $CDR_{net}$=[((t alkalinity added×t $CO_2$ removed/t alkalinity)−$CDR_{ww}$)×($F_{equil}$−$F_{hback}$)]+$CDR_{ww}$−$LCA_{emiss}$, wherein "t" is amount measured in tonnes.

In the method described above, the adjusting the rate of dispensing further comprises:

dispensing the amount of $CO_2$-reactive alkalinity to the body of water in doses, at predetermined time intervals;

measuring respective water properties by said one or more sensors, at the predetermined time intervals; and for a next dose, regulating a magnitude of the next dose as a function of two successive measurements of said one or more sensors, respective pre-defined lower bounds and pre-defined upper bounds of said one or more sensors.

In the method described above, the $CO_2$-reactive alkalinity is a metal hydroxide, for example a monovalent metal hydroxide, or a polyvalent metal hydroxide, for example magnesium hydroxide.

In the method described above, the step (5) further comprises determining the $F_{equil}$ factor by adding a chemical tracer mixed with the $CO_2$-reactive alkalinity, and monitoring a downstream concentration of the chemical tracer at specified locations in the body of water.

In the method described above, the step (5) further comprises determining the $F_{equil}$ factor using a partial carbon dioxide pressure $pCO_{2air}$ in the air above the alkalized body of water, and a partial pressure of carbon dioxide $pCO_{2ocean}$ of the alkalized body of water.

In the method described above, the step (5) comprises determining the $F_{equil}$ factor as follows: $F_{equil}$=($Gas_{ex}$−$CDR_{loss}$)/$Gas_{ex}$, where $Gas_{ex}$ is a rate of air-water gas exchange, $CDR_{loss}$ is a rate of removal of $CO_2$ undersaturated water to depths out of contact with the atmosphere, and where $GAS_{ex}$>$CDR_{loss}$.

In the method described above, the one or more sensors are capable of measuring one or more of the following characteristics of the body of water:

Temperature (T); Salinity (S); Pressure (depth); pH, a measure of $H^+$ concentration;

$pCO_2$, partial pressure of $CO_2$; TSS, total suspended solids; $NH_3$, ammonia concentration; DIC, total dissolved inorganic carbon; and TA, total alkalinity concentration.

In the method described above, the body of water is one or more of the following: seawater; the ocean; a body of water that discharges into the ocean; a wastewater discharge; a discharge of cooling water from an industrial facility; a natural or artificial reservoir of water.

According to another aspect of the invention, there is provided a system for Carbon Dioxide Removal (CDR) from the atmosphere using a body of water that is in contact with the atmosphere, the system comprising:

a dosing station, comprising:

a reservoir containing dissolved, partially dissolved or undissolved, $CO_2$-reactive alkalinity;

a dispenser for dispensing the $CO_2$-reactive alkalinity in the body of water;

a controller comprising: a processor; a memory device; computer executable instructions stored in the memory device, for execution by the processor, causing the processor to:

(1) set an amount of $CO_2$-reactive alkalinity to be added to the body of water, and a rate of dispensing of the amount of $CO_2$-reactive alkalinity to the body of water, the amount of $CO_2$-reactive alkalinity being less than a target amount;

(2) dispense the amount of the $CO_2$-reactive alkalinity in the body of water at the rate of dispensing;

(3) during dispensing, monitor the body of water by one or more sensors, and adjust the rate of dispensing so as to ensure measurements of said one or more sensors are within respective predetermined limits;

(4) estimate a CDR achieved by the dispensing, according to a chemical mass stoichiometry of carbon dioxide reaction with the $CO_2$-reactive alkalinity;

(5) adjust the estimated CDR from (4) by taking into account a $F_{equil}$ factor, indicating a fraction of alkalized, $CO_2$-depleted water equilibrated with air, thus determining an adjusted CDR;

(6) determine a cumulative amount of the $CO_2$-reactive alkalinity that has been dispensed over time to the body of water; and (7) if the cumulative amount of alkalinity is less than a predetermined target amount of alkalinity to be dispensed to the body of water, repeat the steps (1) to (6) until the predetermined target amount of alkalinity has been dispensed; thereby removing carbon dioxide from the atmosphere.

In the system described above, computer executable instructions further cause the processor to: before (1), set a target CDR; after (5), determine a cumulative adjusted CDR; and in (7), further verify if the cumulative adjusted CDR is less than the target CDR, and repeat the steps (1) to (6) until the earlier of: the predetermined target amount of alkalinity has been dispensed or the target CDR has been achieved.

The system described above further comprises a floating platform having a hull for holding the $CO_2$-reactive alkalinity, for delivering and disposing the dispensed required amount of the $CO_2$-reactive alkalinity in the body of water.

According to yet another aspect of the invention, there is provided a system for Carbon Dioxide Removal (CDR) from the atmosphere using a body of water that is in contact with the atmosphere, the system comprising:

a dosing station, comprising:

a reservoir containing dissolved, partially dissolved or undissolved, $CO_2$-reactive alkalinity;

a dispenser for dispensing, at a required rate, a required amount of the $CO_2$-reactive alkalinity in the body of water for achieving a permissible target CDR from the atmosphere;

a controller comprising: a processor; a memory device; computer executable instructions stored in the memory device, for execution by the processor, causing the processor to determine the required amount of the $CO_2$-reactive alkalinity and the permissible target CDR, comprising:

setting a target CDR;

(i) estimating an amount of the $CO_2$-reactive alkalinity to be added to the body of water for achieving the target CDR as determined by chemical mass stoichiometry of carbon dioxide reaction with the $CO_2$-reactive alkalinity;

(ii-1) adjusting the target CDR by taking into account a Fequil factor, indicating a fraction of alkalized water equilibrated with air, thus determining an adjusted target CDR and a corresponding adjusted amount of CO2-reactive alkalinity;

(iii) monitoring the body of water by one or more sensors, and further limiting the adjusted amount of the $CO_2$-reactive alkalinity and the adjusted target CDR so as to ensure measurements of said one or more sensors are within respective predetermined limits when the further adjusted amount of the $CO_2$-alkalinity is dispensed in the body of water over the given time interval, thus determining a further adjusted amount of the $CO_2$-reactive and a corresponding further adjusted target CDR;

(iv) setting the further adjusted amount of $CO_2$-reactive alkalinity as the required amount, and the further adjusted target CDR as the permissible target CDR, and determining the required rate of dispensing over the given time interval based on the permissible target CDR and the respective predetermined limits of measurements of said one or more sensors; and (v) dispensing the required amount of the $CO_2$-reactive alkalinity in the body of water at the required rate, thereby achieving the permissible target CDR from the atmosphere in the given time interval.

In the system described above, the computer executable instructions further cause the processor to: (ii-2) further adjust, before (iii), the amount of the $CO_2$-reactive alkalinity of (ii-1) by taking into account a $F_{hback}$ factor, indicating uncertainty of the adjusted target CDR.

In the system described above, the CDR of (ii-2) is determined as follows:

CDR=(t alkalinity added×t $CO_2$ removed/t alkalinity)×($F_{equil}$−$F_{hback}$), wherein "t" is amount measured in metric tonnes.

In the system described above, the system comprises a waste water pipe discharging waste water in the body of water, and wherein the computer executable instructions further cause the processor to: (ii-3) yet further adjust, before (iii), the adjusted amount of the $CO_2$-reactive alkalinity and the adjusted target CDR of (ii-1) by taking into account the CDRww achieved within the waste water pipe prior to discharge to said body of water, wherein CDRww is determined under assumption of $CO_2$ supersaturation, relative to air, in the alkalinity discharge waste water.

In the system described above, the CDR of (ii-3) is determined as follows, taking into account $CO_2$ supersaturation in the waste water, relative to air, and the CDRww that occurs within the wastewater pipe prior to discharge to said body of water:

CDR=[((t alkalinity added×t $CO_2$ removed/t alkalinity)−$CDR_{ww}$)×($F_{equil}$−$F_{hback}$)]+$CDR_{ww}$, wherein "t" is amount measured in metric tonnes, $F_{hback}$ is a factor, indicating uncertainty of the adjusted target CDR.

In the system described above, the computer executable instructions further cause the processor to: (ii-4) yet further adjust the adjusted amount of the $CO_2$-reactive alkalinity and the adjusted target CDR of (ii-1) by taking into account carbon dioxide emissions occurred during production, transportation and distribution of the $CO_2$-reactive alkalinity.

In the system described above, the CDR of (ii-4) is determined as follows:

$CDR_{net}$=[((t alkalinity added×t $CO_2$ removed/t alkalinity)−$CDR_{ww}$)×($F_{equil}$−$F_{hback}$)]+$CDR_{ww}$−$LCA_{emiss}$, wherein "t" is amount measured in metric tonnes, $F_{hback}$ is a factor, indicating uncertainty of the adjusted target CDR, CDRww achieved within the waste water pipe prior to discharge to said body of water, wherein CDRww is determined under assumption of $CO_2$ supersaturation in the alkalinity discharge waste water, and $LCA_{emiss}$ indicates carbon dioxide emissions during the production, transportation and distribution of said $CO_2$-reactive alkalinity.

In the system described above, the $CO_2$-reactive alkalinity is a metal hydroxide, for example a monovalent metal hydroxide, or a polyvalent metal hydroxide.

In the system described above, the $CO_2$-reactive alkalinity is magnesium hydroxide.

In the system described above, the $F_{equil}$ factor is determined by adding a chemical tracer mixed with the $CO_2$-reactive alkalinity, and monitoring a downstream concentration of the chemical tracer at specified locations in the body of water.

In the system described above, the $F_{equil}$ factor is further determined using a partial carbon dioxide pressure $pCO_{2air}$ in the air above the alkalized body of water, and a partial pressure of carbon dioxide $pCO_{2ocean}$ of the alkalized body of water.

In the system described above, the $F_{equil}$ factor is determined as follows: $F_{equil}$=($Gas_{ex}$−$CDR_{loss}$)/$Gas_{ex}$, where $Gas_{ex}$ is a rate of air-water gas exchange, $CDR_{loss}$ is a rate of removal of $CO_2$ undersaturated water to depths out of contact with the atmosphere, and where $Gas_{ex}$>$CDR_{loss}$.

In the system described above, the one or more sensors are capable of measuring one or more of the following characteristics of the body of water: Temperature (T); Salinity (S); Pressure (depth); pH, a measure of $H^+$ concentration; $pCO_2$, partial pressure of $CO_2$; TSS, total suspended solids; $NH_3$, ammonia concentration; DIC, total dissolved inorganic carbon; TA, total alkalinity concentration, or any other chemical, physical or biological parameter to control the rate of said $CO_2$-reactive alkalinity addition to the body of water.

In the system described above, the body of water is one or more of the following: seawater; the ocean; a body of water that discharges into the ocean; a wastewater discharge; a discharge of cooling water from an industrial facility.

The system further comprises a floating platform having a hull for holding the $CO_2$-reactive alkalinity, for delivering and disposing the dispensed required amount of the $CO_2$-reactive alkalinity in the body of water.

According to one more aspect of the invention, there is provided a method for Carbon Dioxide Removal (CDR) from the atmosphere using a body of water that is in contact with the atmosphere, the method comprising:

setting a target CDR;

(i) estimating an amount of the $CO_2$-reactive alkalinity to be added to the body of water for achieving the target CDR as determined by chemical mass stoichiometry of carbon dioxide reaction with the $CO_2$-reactive alkalinity;

(ii-1) adjusting the target CDR by taking into account a Fequil factor, indicating a fraction of alkalized water equilibrated with air, thus determining an adjusted target CDR and a corresponding adjusted amount of CO2-reactive alkalinity;

(iii) monitoring the body of water by one or more sensors, and further limiting the adjusted amount of the $CO_2$-reactive alkalinity and the adjusted target CDR so as to ensure measurements of said one or more sensors are within respective predetermined limits when the further adjusted amount of the $CO_2$-alkalinity is dispensed in the body of water over the given time interval, thus determining a further adjusted amount of the $CO_2$-reactive and a corresponding further adjusted target CDR;

(iv) setting the further adjusted amount of $CO_2$-reactive alkalinity as the required amount, and the further adjusted target CDR as the permissible target CDR, and determining the required rate of dispensing over the given time interval based on the permissible target CDR and the respective predetermined limits of measurements of said one or more sensors; and (v) dispensing the required amount of the $CO_2$-reactive alkalinity in the body of water at the required rate, thereby achieving the permissible target CDR from the atmosphere in the given time interval.

The method further comprises: (ii-2) further adjusting, before (iii), the amount of the CO2-reactive alkalinity of (ii-1) by taking into account a $F_{hback}$ factor, indicating uncertainty of the adjusted target CDR.

The method further comprises determining the CDR of (ii-2) as follows:

CDR=(t alkalinity added×t $CO_2$ removed/t alkalinity)×($F_{equil}$−$F_{hback}$), wherein "t" is amount measured in metric tonnes.

The method further comprises: (ii-3) yet further adjusting, before (iii), the adjusted amount of the $CO_2$-reactive alkalinity and the adjusted target CDR of (ii-1) by taking into account the $CDR_{ww}$ achieved within the waste water pipe prior to discharge to said body of water, wherein $CDR_{ww}$ is determined under assumption of $CO_2$ supersaturation in the alkalinity discharge waste water.

The method further comprises determining the CDR of (ii-3) as follows, taking into account $CO_2$ supersaturation in the waste water and the CDRww that occurs within the wastewater pipe prior to discharge to said body of water:

CDR=[((t alkalinity added×t $CO_2$ removed/t alkalinity)−$CDR_{ww}$)×($F_{equil}$−$F_{hback}$)]+$CDR_{ww}$ wherein "t" is amount measured in metric tonnes, $F_{hback}$ is a factor, indicating uncertainty of the adjusted target CDR.

The method further comprises: (ii-4) further adjusting the adjusted amount of the $CO_2$-reactive alkalinity and the adjusted target CDR of (ii-1) by taking into account carbon dioxide emissions occurred during production, transportation and distribution of the $CO_2$-reactive alkalinity.

The method further comprises determining the CDR of (ii-4) as follows: $CDR_{net}$=[((t alkalinity added×t $CO_2$ removed/t alkalinity)−$CDR_{ww}$)×($F_{equil}$−$F_{hback}$)]+$CDR_{ww}$−$LCA_{emiss}$, wherein "t" is amount measured in metric tonnes, $F_{hback}$ is a factor, indicating uncertainty of the adjusted target CDR, $CDR_{ww}$ achieved within the waste water pipe prior to discharge to said body of water, wherein $CDR_{ww}$ is determined under assumption of $CO_2$ supersaturation in the alkalinity discharge waste water, and $LCA_{emiss}$ indicates carbon dioxide emissions during the production, transportation and distribution of said $CO_2$-reactive alkalinity.

In the method described above, the adjusting the rate of dispensing further comprises:

dispensing the amount of $CO_2$-reactive alkalinity to the body of water in doses, at predetermined time intervals;

measuring respective water properties by said one or more sensors, at the predetermined time intervals; and for a next dose, regulating a magnitude of the next dose as a function of two successive measurements of said one or more sensors, respective pre-defined lower bounds and pre-defined upper bounds of said one or more sensors.

In the method described above, the $CO_2$-reactive alkalinity is a metal hydroxide, for example a monovalent metal hydroxide, or alternatively a polyvalent metal hydroxide.

In the method described above, the $CO_2$-reactive alkalinity is magnesium hydroxide.

The method further comprises determining the $F_{equil}$ factor by adding a chemical tracer mixed with the CO2-reactive alkalinity, and monitoring a downstream concentration of the chemical tracer at specified locations in the body of water.

The method further comprises determining the $F_{equil}$ factor using a partial carbon dioxide pressure $pCO_{2air}$, in the air above the alkalized body of water, and a partial pressure of carbon dioxide $pCO_{2ocean}$ of the alkalized body of water.

The method further comprises determining the $F_{equil}$ factor as follows: $F_{equil}$=($Gas_{ex}$−$CDR_{loss}$)/$Gas_{ex}$, where $Gas_{ex}$ is a rate of air-water gas exchange, $CDR_{loss}$ is a rate of removal of $CO_2$ undersaturated water to depths out of contact with the atmosphere, and where $Gas_{ex}$>$CDR_{loss}$.

In the methods described above, the one or more sensors are capable of measuring one or more of the following characteristics of the body of water: Temperature (T); Salinity (S), Pressure (depth); pH, a measure of $H^+$ concentration; $pCO_2$, partial pressure of $CO_2$; TSS, total suspended solids; $NH_3$, ammonia concentration in a gas; DIC, total dissolved inorganic carbon; and TA, total alkalinity concentration.

In the methods described above, the body of water is one or more of the following:

seawater; the ocean; a body of water that discharges into the ocean; a wastewater discharge; a discharge of cooling water from an industrial facility.

According to one more aspect of the invention, there is provided a dosing station, comprising:

a reservoir containing dissolved, partially dissolved or undissolved, $CO_2$-reactive alkalinity;

a dispenser for dispensing the $CO_2$-reactive alkalinity in the body of water;

a controller comprising: a processor; a memory device; computer executable instructions stored in the memory device, for execution by the processor, causing the processor to:

(1) set an amount of $CO_2$-reactive alkalinity to be added to the body of water, and a rate of dispensing of the amount of $CO_2$-reactive alkalinity to the body of water, the amount of $CO_2$-reactive alkalinity being less than a target amount;

(2) dispense the amount of the $CO_2$-reactive alkalinity in the body of water at the rate of dispensing;

(3) during dispensing, monitor the body of water by one or more sensors, and adjust the rate of dispensing so as to ensure measurements of said one or more sensors are within respective predetermined limits;

(4) estimate a CDR achieved by the dispensing, according to a chemical mass stoichiometry of carbon dioxide reaction with the $CO_2$-reactive alkalinity;

(5) adjust the estimated CDR from (4) by taking into account a $F_{equil}$ factor, indicating a fraction of alkalized, $CO_2$-depleted water equilibrated with air, thus determining an adjusted CDR;

(6) determine a cumulative amount of the $CO_2$-reactive alkalinity that has been dispensed over time to the body of water; and (7) if the cumulative amount of alkalinity is less than a predetermined target amount of alkalinity to be dispensed to the body of water, repeat the steps (1) to (6) until the predetermined target amount of alkalinity has been dispensed;

thereby removing carbon dioxide from the atmosphere.

In the dosing station described above, computer executable instructions further cause the processor to: before (1), set a target CDR; after (5), determine a cumulative adjusted CDR; and in (7), further verify if the cumulative adjusted CDR is less than the target CDR, and repeat the steps (1) to (6) until the earlier of: the predetermined target amount of alkalinity has been dispensed or the target CDR has been achieved.

According to yet one more aspect of the invention, there is provided a controller for a dosing station, for determining a required amount of alkalinity for dispensing in a body of water in contact with the atmosphere, for Carbon Dioxide Removal (CDR) from the atmosphere, the controller comprising: a processor; a memory device; computer executable instructions stored in the memory device, for execution by the processor, causing the processor to:

(1) set an amount of $CO_2$-reactive alkalinity to be added to the body of water, and a rate of dispensing of the amount of $CO_2$-reactive alkalinity to the body of water, the amount of $CO_2$-reactive alkalinity being less than a target amount;

(2) dispense the amount of the $CO_2$-reactive alkalinity in the body of water at the rate of dispensing;

(3) during dispensing, monitor the body of water by one or more sensors, and adjust the rate of dispensing so as to ensure measurements of said one or more sensors are within respective predetermined limits;

(4) estimate a CDR achieved by the dispensing, according to a chemical mass stoichiometry of carbon dioxide reaction with the $CO_2$-reactive alkalinity;

(5) adjust the estimated CDR from (4) by taking into account a $F_{equil}$ factor, indicating a fraction of alkalized, $CO_2$-depleted water equilibrated with air, thus determining an adjusted CDR;

(6) determine a cumulative amount of the $CO_2$-reactive alkalinity that has been dispensed over time to the body of water; and (7) if the cumulative amount of alkalinity is less than a predetermined target amount of alkalinity to be dispensed to the body of water, repeat the steps (1) to (6) until the predetermined target amount of alkalinity has been dispensed;

Thus, the improved methods, system, a dosing station and a controller for removing carbon dioxide from the atmosphere using a body of water that is in contact with the atmosphere have been provided.

BRIEF DESCRIPTION OF THE DRAWINGS

The accompanying drawings, which constitute a part of the specification, illustrate specific embodiments of the invention which, together with the detailed description of the specific embodiments, serve to explain the principles of the invention.

FIG. 12 illustrates a table, maintained at a controller of a dosing station, indicating identification data, including locations and types of the sensors of FIG. 11, as well as time-varying data relevant to measured water properties, for use in an embodiment of the present invention;

FIG. 15 illustrates a master macro-level decision table, for use in a global controller of a multi-site dosing system engaging multiple geographically distributed dosing stations, in accordance with an embodiment of the present invention;

REFERENCE NUMERALS

Figure 1:
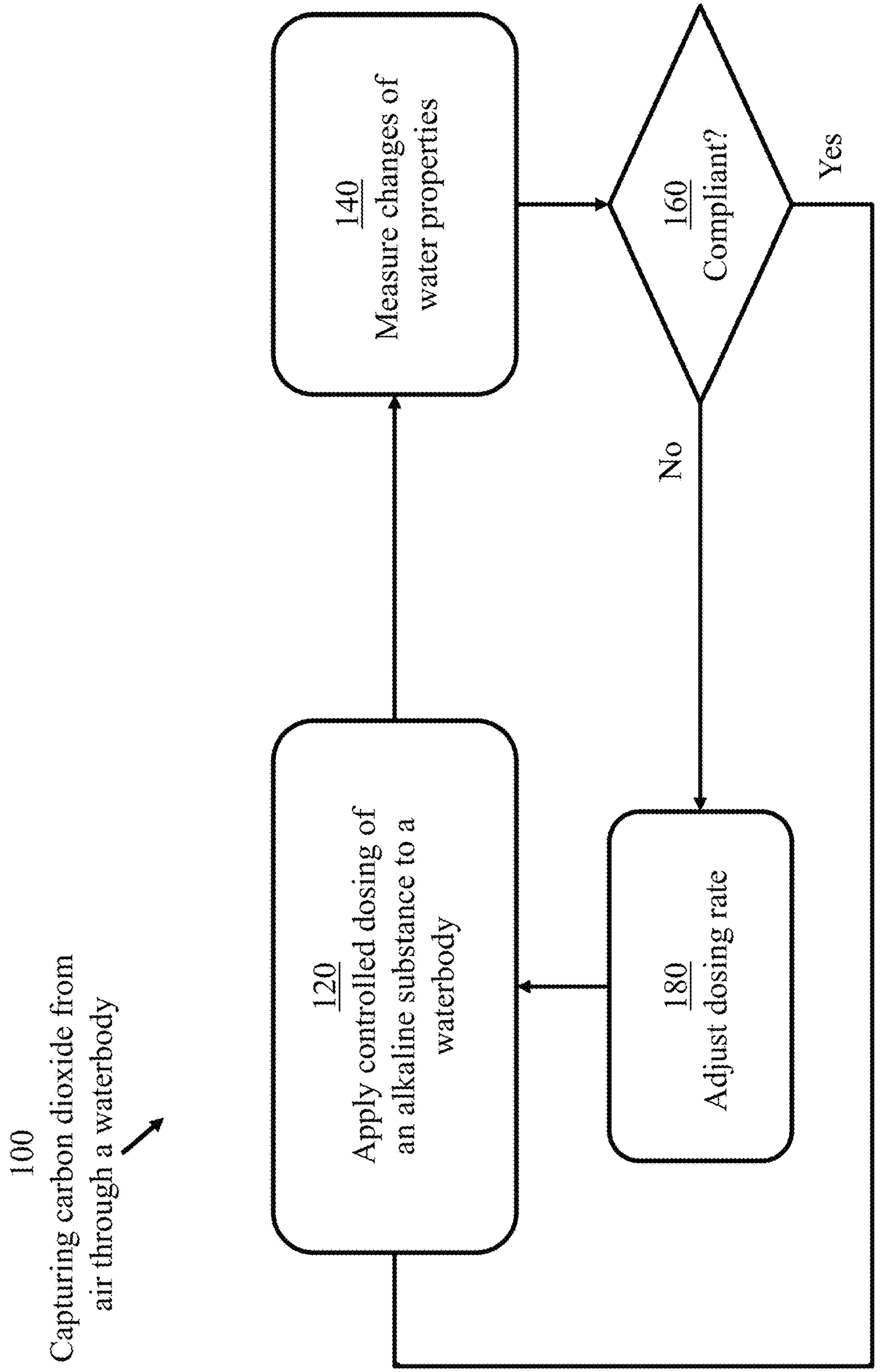
FIG. 1 illustrates a scheme for removing carbon dioxide ($CO_2$) from air using a waterbody in accordance with an embodiment of the present invention.

- 100: Removing carbon dioxide ($CO_2$) from air using a body of water
- 120: Process of applying controlled dosing of an alkaline substance to the body of water
- 140: Process of measuring changes to water properties resulting from said dosing
- 160: Process of ensuring compliance with mandated or desired regulations
- 180: Process of adjusting the dosing rate where necessary
- 200: Chemical interactions relevant to $CO_2$ exchange between water and adjacent air
- 210: Air-ocean $CO_2$-saturation equilibrium prior to alkalinity treatment
- 220: Imbalance of CO2 saturation in air and water following alkalinity treatment
- 230: Migration of CO2 from air to water due to the imbalance
- 300: An overview of a realization of process 100
- 320: A portion of the waterbody surrounding a point of application of alkalinity
- 340: A dosing station for dosing an alkaline substance
- 360: One of a plurality of sensors employed to detect effect of dosing
- 400: Exemplary water parameters to be monitored
- 420: A vector of selected water parameters
- 500: A representative arrangement for dosing comprising a dosing station mechanically coupled to a discharge pipe and communicatively coupled to sensors and external devices including external computing devices
- 520: A container for holding selected alkaline substances which may be mixed with raw water
- 522: Alkaline substance
- 524: An agitator
- 526: A pipe
- 530: A pump
- 531: Mechanical coupling of the pump to container 520 and to a discharge pipe 538
- 532: Electric coupling of the pump to an electronic controller
- 538: The discharge pipe

540: A dosing controller

560: Communication channels, wireless or otherwise, to sensors and other devices

600: An overview of a system for quantitively relating carbon-dioxide removal (CDR) to amount of applied alkalinity, processed raw water, characteristics of raw water, and surrounding physical conditions

620: A combination of encoded mathematical models and acquired experimental data

622: Cumulative weight of alkaline substance

624: Encoded operational and environmental constraints

632: Characterizing data of raw water

634: Tracked cumulative volume of raw water

640: Measured or calculated CDR

700: A schematic of a first dosing mechanism

710: A container for holding supplied alkaline substance which may be mixed with raw water

712: A dispensing compartment for holding a measured quantity of content of container 710

720: A selected alkaline substance

736: A sensor of properties of content of the dispensing compartment 712

738: An upper door

739: A lower door for releasing content of dispensing compartment into the waterbody

747: A weight sensor

761: A dual communication path from sensor 747 to a controller

762: A dual communication path from sensor 736 to the controller

800: A schematic of a second dosing mechanism

810: A pipe transferring raw waste water to a container 520

812: A sensor (inlet sensor) of raw waste water

814: Electronic circuitry coupled to inlet sensor 812

860: Communication channels, wireless or otherwise, to sensors (812, 882) and other devices

882: A sensor (outlet sensor) of altered waste water due to mixing with alkaline substance 522

884: Electronic circuitry coupled to outlet sensor 882

890: A pipe transferring altered waste water to the waterbody

900: A schematic of a third dosing mechanism

902: A waterbody, or a body of water

912: A sensor (inlet sensor) of raw water extracted from waterbody 902

930: A first pump for drawing raw water from the waterbody

931: Mechanical coupling of first pump 930 to a pipe 935, directing raw water to pump 930

932: Electrical coupling of first pump 930 to controller 540

960: Communication channels, wireless or wired, to sensors 912 and 982, and to other external devices

1000: A schematic of a fourth dosing mechanism

1100: A hierarchy of sensors communicatively coupled to controller 540

1110: A type-A sensor configured to detect water-property changes in the vicinity of a dosing station

1120: A type-B sensor configured to detect lower levels of water-property changes at a predefined distance from the dosing station

1130: A type-C sensor configured to detect significantly lower levels of water-property changes at a predefined larger distance from the dosing station; basically, to measure the spatial reach of dosing

1200: A table of data relevant to different sensor types

1210: A sensor identifier (may be a vector of quantified properties); with $\Sigma$ sensor types, $\Sigma>1$; the number of sensors may significantly exceed $\Sigma$ since several sensors of a specific type may be placed at different locations

1220: Coordinates of each installed sensor at a given site; sensors placed at equal radial distances, but different angular displacements, from a dosing point may report significantly different readings due to varying water currents

1230: Specified water-characterizing parameters of interest

1300: Outline of a method for measuring advection latency through a water-flow medium

1320: A process of applying a pilot dose of a selected alkalinity source

1340: Concurrently reporting to a controller, through wired or wireless (including "Bluetooth (registered trademark)") communication channels, indications of a start and end of a dosing step

1360: At a selected sensor, concurrently performing two processes 1362 and 1364

1362: Detecting a (significant) water-quality change attributed to the selected alkalinity source

1364: Reporting the start and end of a detection interval (if any) to the controller

1380: Repeating the sequence of processes 1320, 1340, and 1360 a predetermined number of times (based on known rules of statistical significance) to enable calculating a reliable estimate of the advection latency of the water-flow medium

1400: Details of controller 540

1410: A hardware processor which may comprise multiple processing units operating concurrently and independently, or in a pipeline

1420: A network interface enabling communications with external controllers

1430: A sensors' interface enabling communications with sensors associated with a dosing station

1440: A pump interface (electrical coupling)

1450: Software modules including encoded dose-control algorithms

1460: Software modules including encoded chemical equations

1470: A memory device storing pre-computed, or experimental, data needed for executing the software modules 1450 and 1460

1480: A work data-memory for holding intermediate execution data

1500: A master macro-level decision table

1510: Alkalinity source

1520: Application or experimentation site

1530: Computed net CDR for a specific alkalinity source and a specific site

1600: Variation of CDR with acidity level, expressed as a ratio of CDR units per alkaline-substance unit versus pH levels

1700: Variation of calculated CDR with weight of alkaline substance according to five methods

1710: CDR versus alkalinity added, according to calculation 1 (equation 3)

1720: CDR versus alkalinity added, according to calculation 2 (equation 9)

1730: CDR versus alkalinity added, according to calculation 3 (equation 10)

1740: CDR versus alkalinity added, according to calculation 4 (equation 11)

1750: CDR versus alkalinity added, according to calculation 5 (equation 14)
1780: Vertical line illustrating limitation of the amount of CO2-alkalinity imposed by sensor measurements
1800: Variation of water carbon-dioxide with weight of applied alkaline substance
1900: Water-property monitoring
1920: Instream (independent) water sensors
1940: An acidity sensor
1960: A sensor of partial pressure of carbon dioxide
1980: A sensor of total suspended solids
2000: Variation of total CO2 removed with salinity
2010: $pCO_{2before}$ before adding alkalinity
2020: $pCO_{2after}$ after adding alkalinity
2030: Mixing line illustrating change of salinity before adding $CO_2$-reactive alkalinity
2040: Mixing line illustrating change of salinity after adding $CO_2$-reactive alkalinity
2100: A method of site-specific evaluation of CDR (processes 2110 to 2195)
2200: A system having a wastewater pipe for discharging treated waste water into the ocean and an arrangement for measuring water properties within the pipe and in the ocean in the vicinity of the outlet of the pipe
2300: Variation of Water-water pH with dissolved alkaline substance added to the waste water
2400: variation of relative weight (grams per litre) of total suspended solids with relative weight of particulate alkaline substance
2500: Variation of rate of consumption of $CO_2$ with dissolved alkaline substance added to the waste water
2600: Dosing control based on adhering to a single reference value of a designated parameter (or based on a vector of parameters)
2610: Monitoring instants (instants of processing sensors signals)
2620: Reference value of a parameter of interest
2630: Value of the parameter based on a sensor's reading (2630A refers to a value of the parameter above the reference value, 2630B refers to a value of the parameter below the reference value)
2700: Dosing control based on adhering to a reference interval of permissible values of the parameter
2720: A lower bound of the permissible interval
2730: Width of the permissible interval
2740: An upper bound of the permissible interval
2800: The kernel of the dose-control method of the present invention based on criterion 2700 (which degenerates to criterion 2600 when the width 2730 of the permissible interval is set to equal zero)
2900: Application of method 2800 to periodic dosing according to criterion 2600 (a single reference value) with constant values of dose increments and decrements
2910: Reference value of a selected parameter
2920: A single measurement of a parameter
2940: Indication of an increment or a decrement of a respective dose
2941: Magnitude of an increment or a decrement (arbitrary units)
2942: Dose magnitude after an increment or a decrement
3000: Application of method 2800 to periodic dosing according to criterion 2700 (a reference interval) with constant values of dose increments and decrements
3010: Lower bound of an interval of permissible values of a parameter
3020: The interval of permissible values of a parameter
3030: Upper bound of the interval of permissible values of a parameter
3100: Application of method 2800 to periodic dosing according to criterion 2600 (a single reference value) with adaptive values of dose increments and decrements
3200: Application of method 2800 to periodic dosing according to criterion 2700 (a reference interval) with adaptive values of dose increments and decrements
3300: a procedure for adjusting dose amount observing a single-reference value
3400: a procedure for adjusting dose amount observing a reference interval of permissible values
3500: Dosing periodicity where inter-dose interval equals a known advection latency
3520: Quantity of added alkaline substance
3580: Value of parameter
3600: Dosing periodicity where inter-dose interval exceeds the known advection latency
3700: Dosing periodicity where the inter-dose interval is half the known advection latency
3800: Dosing periodicity where the inter-dose interval is a small fraction of the known advection latency
3900: Determining CDR forecast
4000: Selecting a site for application of a specific alkaline substance

Notation $\Omega$: A current value of a parameter representing one of water properties
$\Omega^*$: A target value of a parameter
$\Omega_L$: Lower bound of a reference interval defining permissible values of a parameter
$\Omega_H$: Upper bound of the reference interval
$\Omega_j$, $j>0$: Values of a parameter at successive spaced time instants $t_0$, $t_1$, $t_2$, . . .
$\eta_0$: A previous value of $\Omega$
$\eta_1$: A current value of $\Omega$
$\beta$: A nominal magnitude of an increment or decrement of a dose
$\Delta$: Current magnitude of an increment or decrement of a dose
$\Phi$: A current amount of a periodically applied dose of an alkaline substance
$\delta$: Advection delay in a water medium

DETAILED DESCRIPTION

The general objective of the invention is to improve methods and apparatus to conduct carbon dioxide removal (CDR) from the atmosphere or other sources of excess $CO_2$ through the addition of a $CO_2$-reactive chemical base or alkalinity to a large body of water such as the ocean. It is known that various chemical bases such as metal oxides, hydroxides, carbonates and silicates can react with and consume $CO_2$, forming solid or dissolved metal carbonates and/or bicarbonates. Indeed, as a result of such natural geochemical reactions, dissolved metal bicarbonates in seawater form the largest carbon reservoir on the Earth's surface. It is therefore of interest to promote or increase such reactions so as to reduce the $CO_2$ burden in the atmosphere.

In one embodiment of the invention $CO_2$-reactive metal hydroxide, for example $Mg(OH)_2$, is added to the surface ocean so as to consume some of the surface ocean's dissolved $CO_2$ and induce $CO_2$ undersaturation relative to air.

Exposure to air of this undersaturated water then forces, via air-to-sea $CO_2$ diffusion, removal of $CO_2$ from air.

In another embodiment example $Mg(OH)_2$ is first added to an existing, permitted, outfall of industrial or municipal wastewater that is ultimately discharged to the ocean. Note that other types of alkalinity other than or in addition to $Mg(OH)_2$ can be used including other metal hydroxides or oxides such as $Ca(OH)_2$, CaO, KOH, MgO and NaOH as well as soluble metal carbonates such as $MgCO_3$ and $Na_2CO_3$. Metal here refers to elements contained in the alkali metals or alkaline earth metals, groups IA and IIA, of the periodic table. Also, other discharges to the ocean can be considered for alkalinity addition including cooling water discharges from power plants, natural discharges such as rivers and streams as well as artificial discharge points from land or from floating or submerged platforms. Discharging onto water bodies other than the ocean for the purpose of performing CDR can also be considered, including to lakes, rivers, and natural or unnatural reservoirs or ponds.

When $CO_2$-reactive alkalinity is added to water, some or all of the dissolved $CO_2$ contained in the water is consumed and transformed to bicarbonate and carbonate ions.

This consumption of dissolved $CO_2$ and hence the reduction in its concentration results in either i) an undersaturation in dissolved $CO_2$ relative to air or ii) a reduction in dissolved $CO_2$ supersaturation relative to air. Thus, if or when such alkalized water contacts the atmosphere either i) a negative air-water $CO_2$ concentration gradient is created, or ii) a reduction in a positive air-water $CO_2$ concentration gradient is produced. Because of the gradient in $CO_2$ concentration so created either i) air $CO_2$ is drawn in and removed for air or ii) the natural diffusion of $CO_2$ from the water to air is reduced. In either case the burden of atmospheric $CO_2$ is desirably reduced through i) $CO_2$ uptake and storage by the water or ii) a reduction in $CO_2$ emissions from the water to air.

It is desirable to measure the quantity of $CO_2$ removed from or emissions avoided to the atmosphere. This is determined by either i) measuring the increase in dissolved carbon concentration in the water following the alkalized water's $CO_2$ uptake from air or ii) the maintenance of a dissolved carbon concentration above what it would otherwise be in the absence alkalization and thus without the loss of $CO_2$ from the water. However, such measurements are difficult if not impossible to do due to a rapid horizontal and vertical spread and dilution of the alkalinity added and $CO_2$ depletion effected in the surface ocean relative to the slow air-water $CO_2$ gas exchange (months). Such measurements would require extensive geographic and temporal coverage as the alkalized, $CO_2$-depleted water spread out over time and because of the extensive dilution of that water with ambient seawater, the measurement would have to be conducted with a precision that is higher than current direct analysis methods can achieve. Therefore, the present invention offers new methods and procedures for measuring or estimating the CDR achieved, and a dosing station therefor.

FIG. 1 illustrates a scheme 100 for removing carbon dioxide ($CO_2$) from air using a waterbody. The scheme is based on implementing a process 120 of applying controlled dosing of an alkaline substance to the waterbody, a process 140 of measuring changes to water properties resulting from said dosing, a process 160 of ensuring compliance with mandated or desired regulations, and a process 180 of adjusting the dosing rate where necessary.

Figure 2:
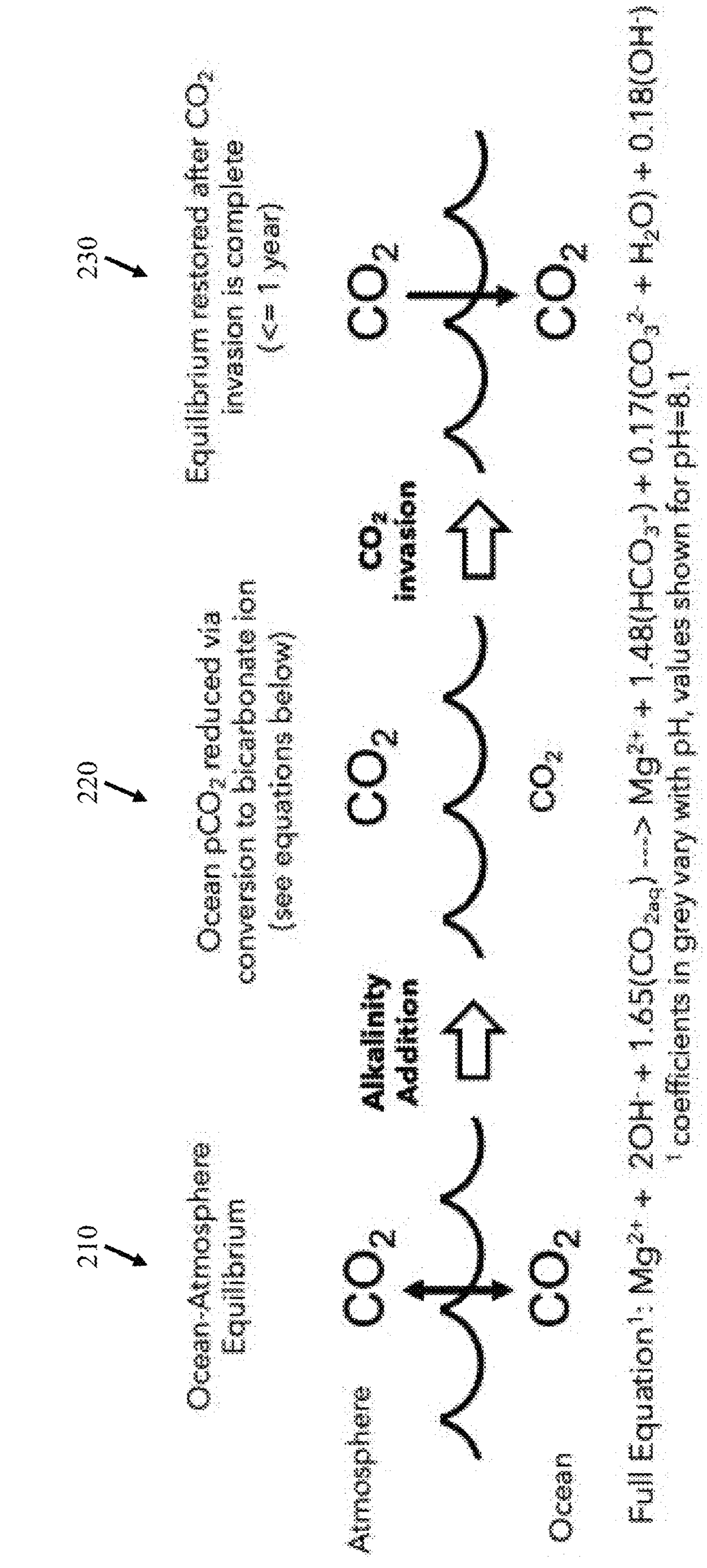
FIG. 2 illustrates chemical interactions relevant to carbon dioxide exchange between water and adjacent air.

FIG. 2 illustrates chemical interactions 200 relevant to carbon dioxide exchange between water and adjacent air. Starting with air-ocean $CO_2$-saturation equilibrium prior to alkalinity treatment (reference 210), adding an alkaline substance to the water results in an imbalance of CO2 saturation in air and water (reference 220). Gradually, migration of CO2 from air to water, due to the imbalance, results in removing an amount of CO2 from the air (reference 230).

Figure 3:
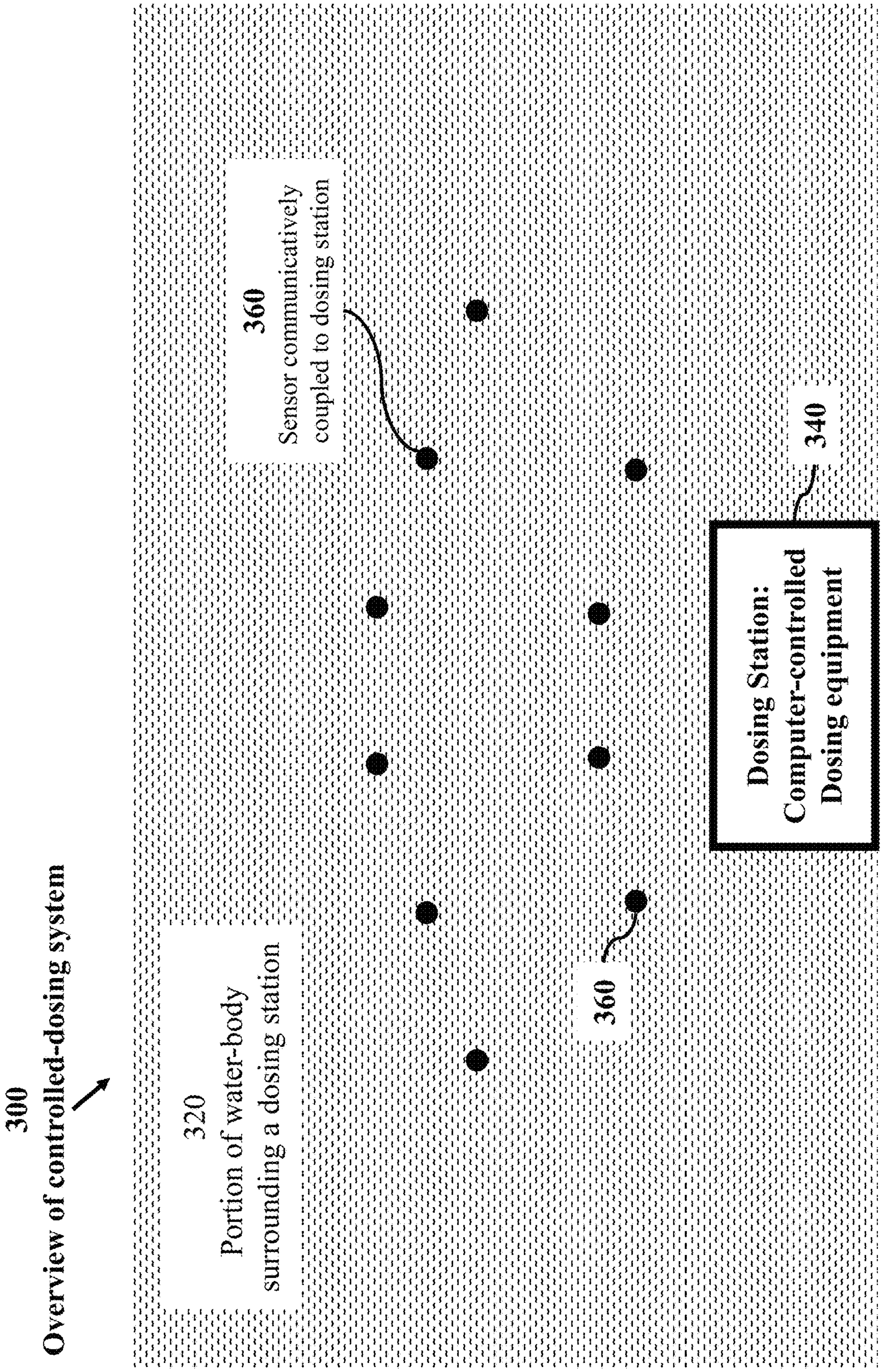
FIG. 3 is an overview of a realization of the scheme of FIG. 1, employing a controlled dosing station and a plurality of sensors, in accordance with an embodiment of the present invention.

FIG. 3 is an overview 300 of a realization of the scheme of FIG. 1, where a dosing station 340 is configured to release regulated amounts of alkaline substance into a water body (a portion 320 of which is illustrated) and at least one sensor 360 is used to detect specific changes of the properties of the water in the vicinity of the dosing station. Generally, a multiplicity of sensors may be placed in the water at selected monitoring points.

Figure 4:
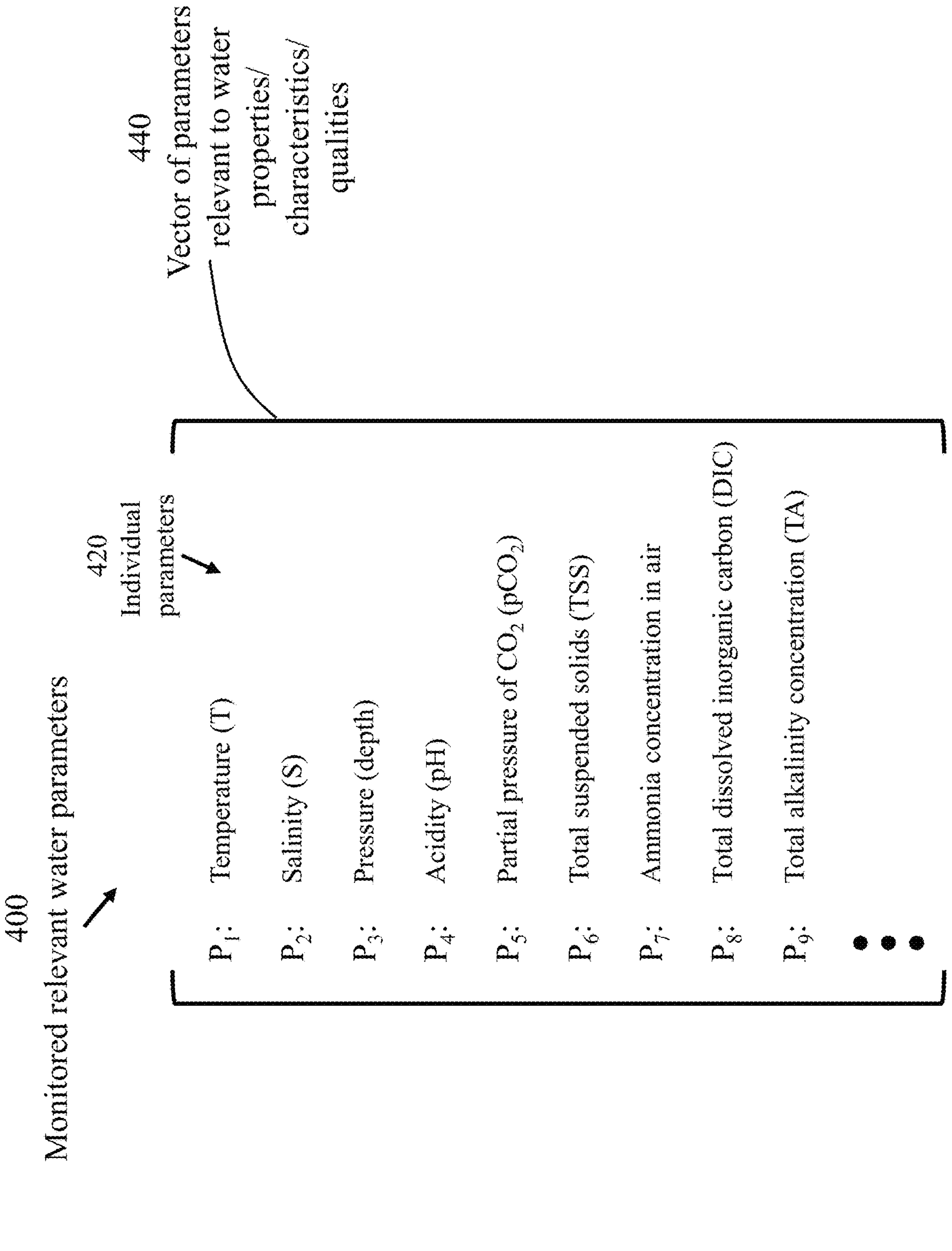
FIG. 4 illustrates exemplary parameters characterizing properties of water prior to, during, and following a dosing process, for use in an embodiment of the present invention.

FIG. 4 illustrates exemplary parameters 400 characterizing properties of water of the waterbody prior to, during, and following a dosing process.

Figure 5:
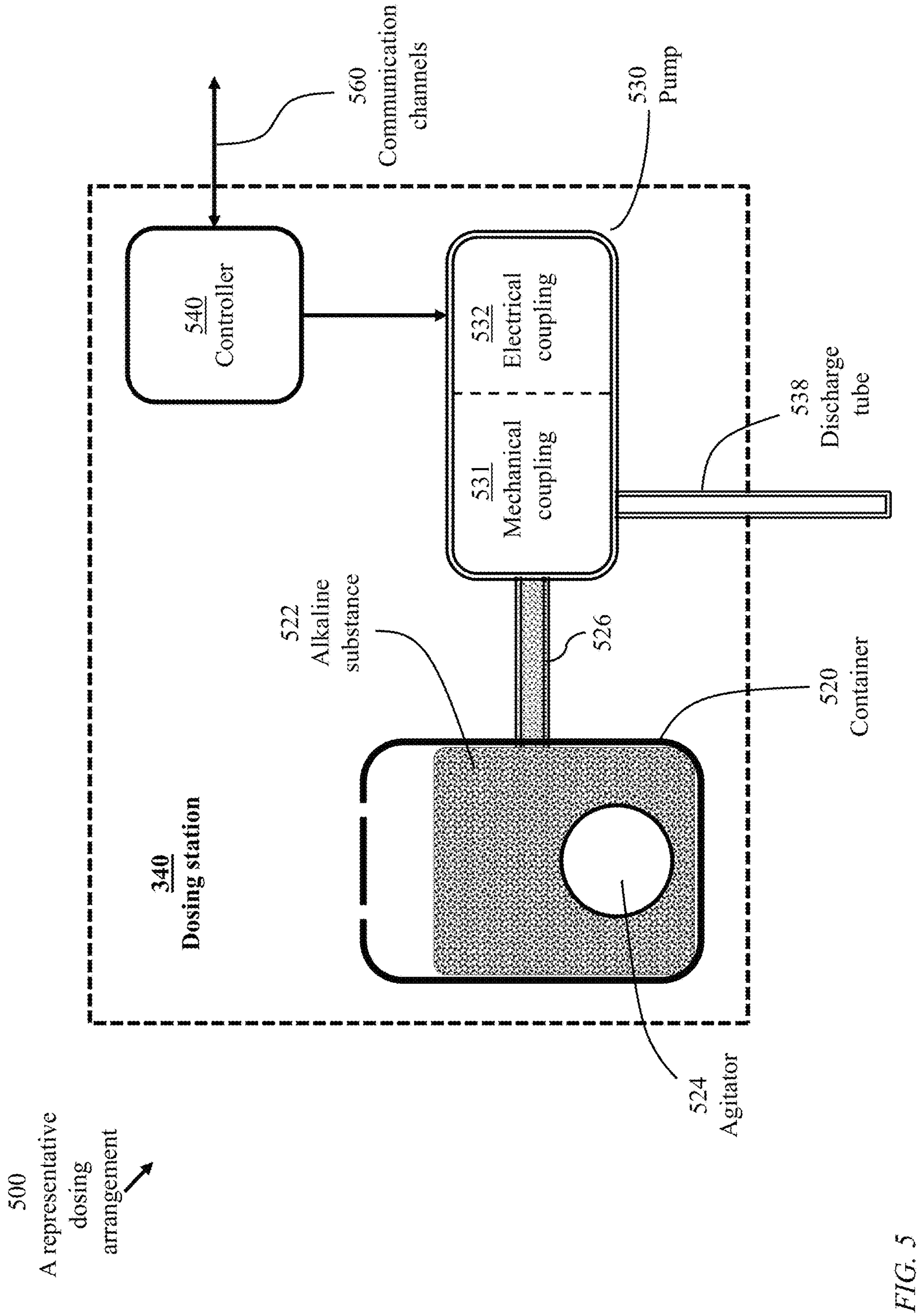
FIG. 5 illustrates a generic system for dosing comprising a dosing station mechanically coupled to a discharge pipe and communicatively coupled to sensors and external devices including computing facilities, in accordance with an embodiment of the present invention.

FIG. 5 illustrates a generic system 500 for dosing the alkalinity to be added to the body of water comprising a dosing station 340 mechanically coupled to a discharge pipe 538 and communicatively coupled to sensors and external devices. The external devices may include computing facilities for performing relevant analytical studies. The system 500 comprises a container, or reservoir 520 for holding a selected alkaline substance 522, which may be mixed with raw water. The container may include an agitator 524.

A pump 530 is mechanically coupled to the container 520 (reference 531), through a direct pipe 526, for example, to extract doses of the content of the container to be released in the waterbody through a discharge pipe 538.

A dosing controller 540 is configured to receive signals from a plurality of sensors and process contents of the signal to adaptively regulate the release of the alkaline substance in the water.

The pump 530 may be electrically coupled to the controller 540 (reference 532) to receive control signals. The pump 530 may also be only communicatively coupled to the controller 540. Controller 540 communicates with the sensors, and possibly with computing facilities, through communication channels 560.

Figure 6:
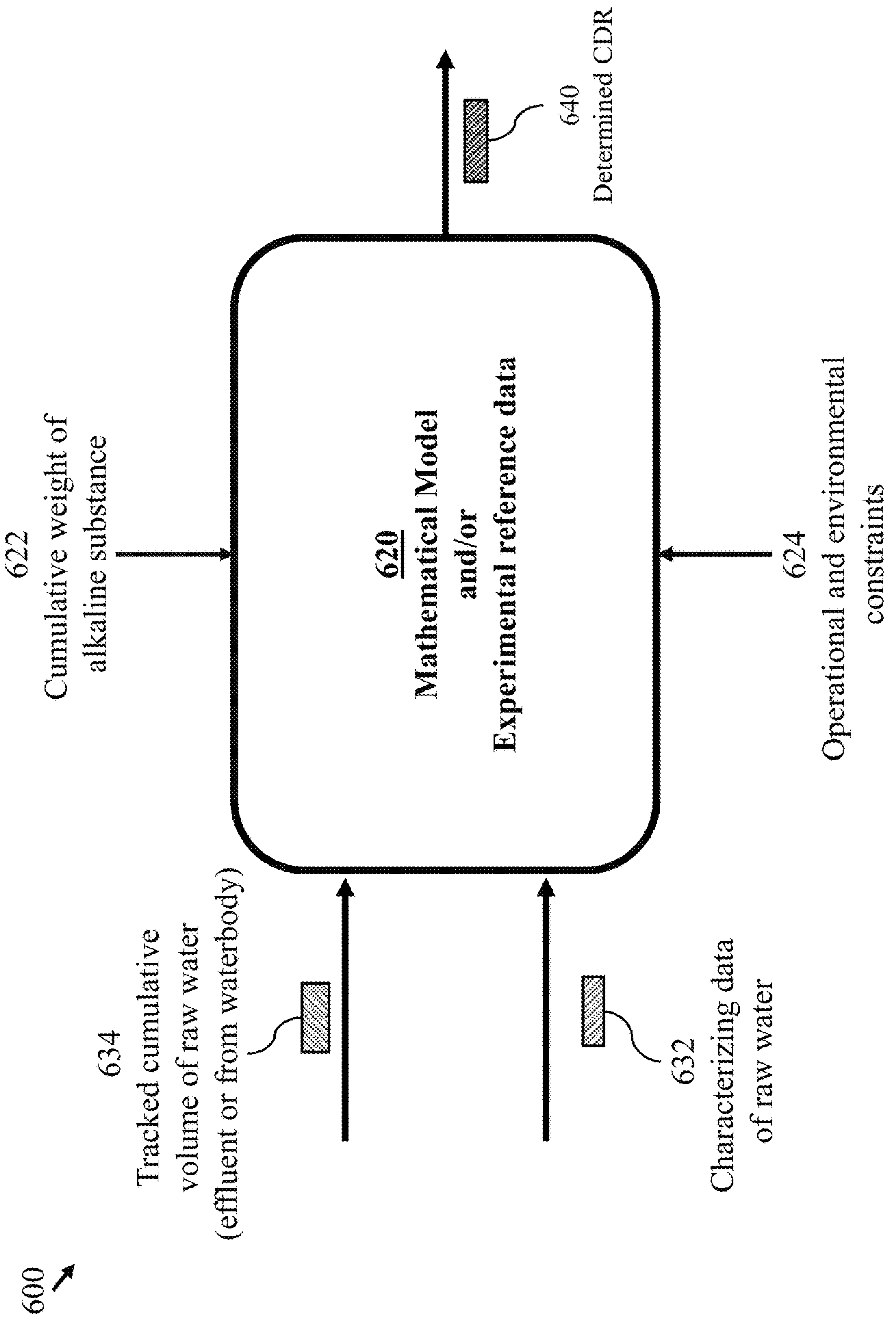
FIG. 6 is an overview of a process of quantitively relating carbon-dioxide removal (CDR) to a number of factors including characteristics of raw water, amount of transient processing, if any, amount of applied alkalinity, surrounding physical conditions, etc., in accordance with an embodiment of the present invention.

FIG. 6 is an overview 600 of a process of quantitively relating estimated carbon-dioxide removal (CDR) to a number of factors including characteristics of raw water, amount of transient processing, if any, amount of applied alkalinity, surrounding physical conditions, etc. An apparatus 620 for estimating CDR may be based on a combination of mathematical models and acquired experimental data. The amount of CDR may be a function of (1) cumulative weight 622 of applied alkaline substance, (2) characteristics 632 of the raw water, (3) cumulative volume 634 of the raw water mixed with the alkaline substance prior to release in the waterbody, and (4) operational and environmental constraints 624.

Figure 7:
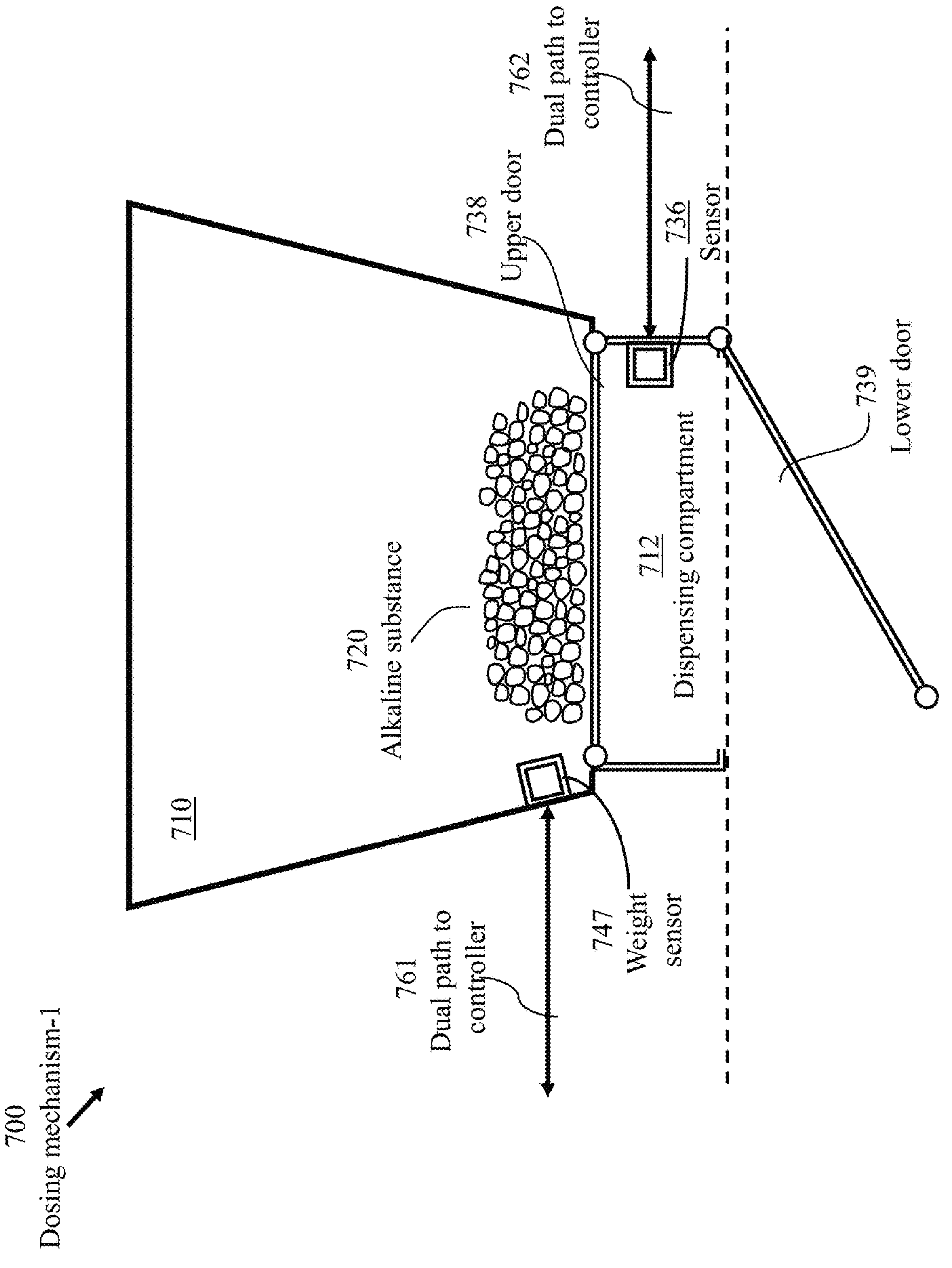
FIG. 7 is a schematic of a first dosing mechanism based on transient raw water treatment in a dispensing compartment and direct release to a waterbody.

FIG. 7 is a schematic 700 of a first dosing mechanism based on transient raw water treatment in a dispensing compartment and direct release to a body of water. The mechanism comprises a container 710 for holding supplied alkaline substance 720, which may be mixed with raw water, and a dispensing compartment 712 for holding a measured quantity of the content of container 710. A sensor 736 detects properties of content of the dispensing compartment 712 and a sensor 747 indicates weight of material in container 710. An upper door 738 and a lower door 739 of the compartment 712 are controlled using a servomechanism to regulate releasing the content of dispensing compartment into the body of water. A dual communication channel 761 from sensor 747 to a controller and a dual communication channel 762 from sensor 736 to the controller are provided. The communication channels may be wireless channels (including "Bluetooth" channels for relatively short distances).

Figure 8:
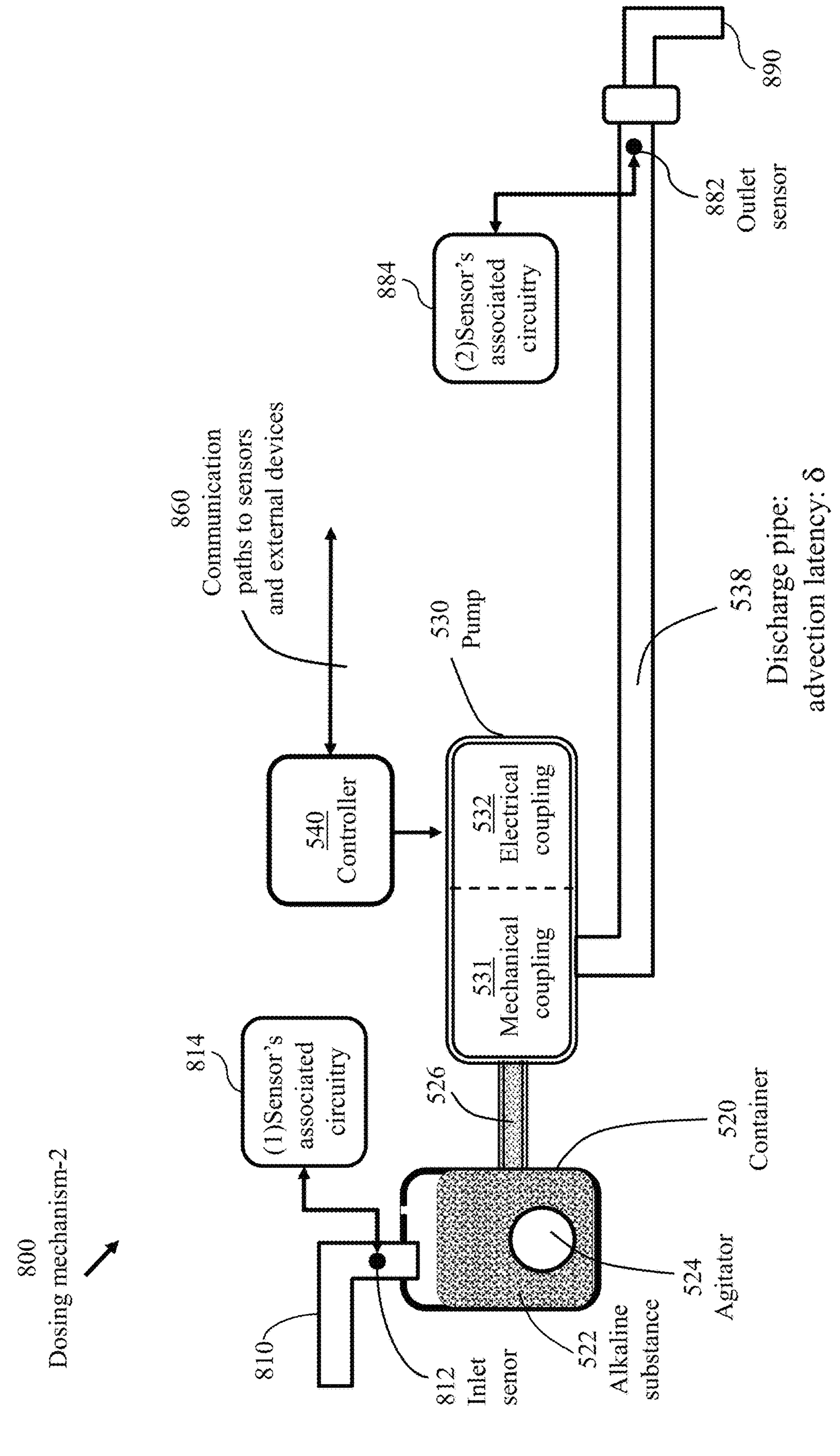
FIG. 8 is a schematic of a second dosing mechanism based on transient treatment of directly supplied raw water in a container and a pipe prior to release to a waterbody, in accordance with an embodiment of the present invention.

FIG. 8 is a schematic 800 of a second dosing mechanism based on transient treatment of directly supplied raw water (such as waste water) in a container 520, through a pipe 810, prior to release to the body of water. An inlet sensor 812 (which may include multiple specialized sensor units) detects designated properties of the raw water. Inlet sensor 812 is communicatively coupled to electronic circuitry 814 for partial processing of signals from the sensor.

A pump 530 is mechanically coupled to the container 520 (reference 531), through a direct pipe 526 to extract doses of the content of the container to be released in the body of water through a discharge pipe 538.

An outlet sensor detects specified properties of treated water, which is the raw water mixed with the alkaline substance 522 in container 522 and transferred through discharge pipe 538. Outlet sensor 882 is communicatively coupled to electronic circuitry 884 for partial processing of signals from the outlet sensor. A pipe 890 transfers the treated water to the body of water. Controller 540 has communication channels 860, wireless or otherwise, to sensors and to other devices.

Figure 9:
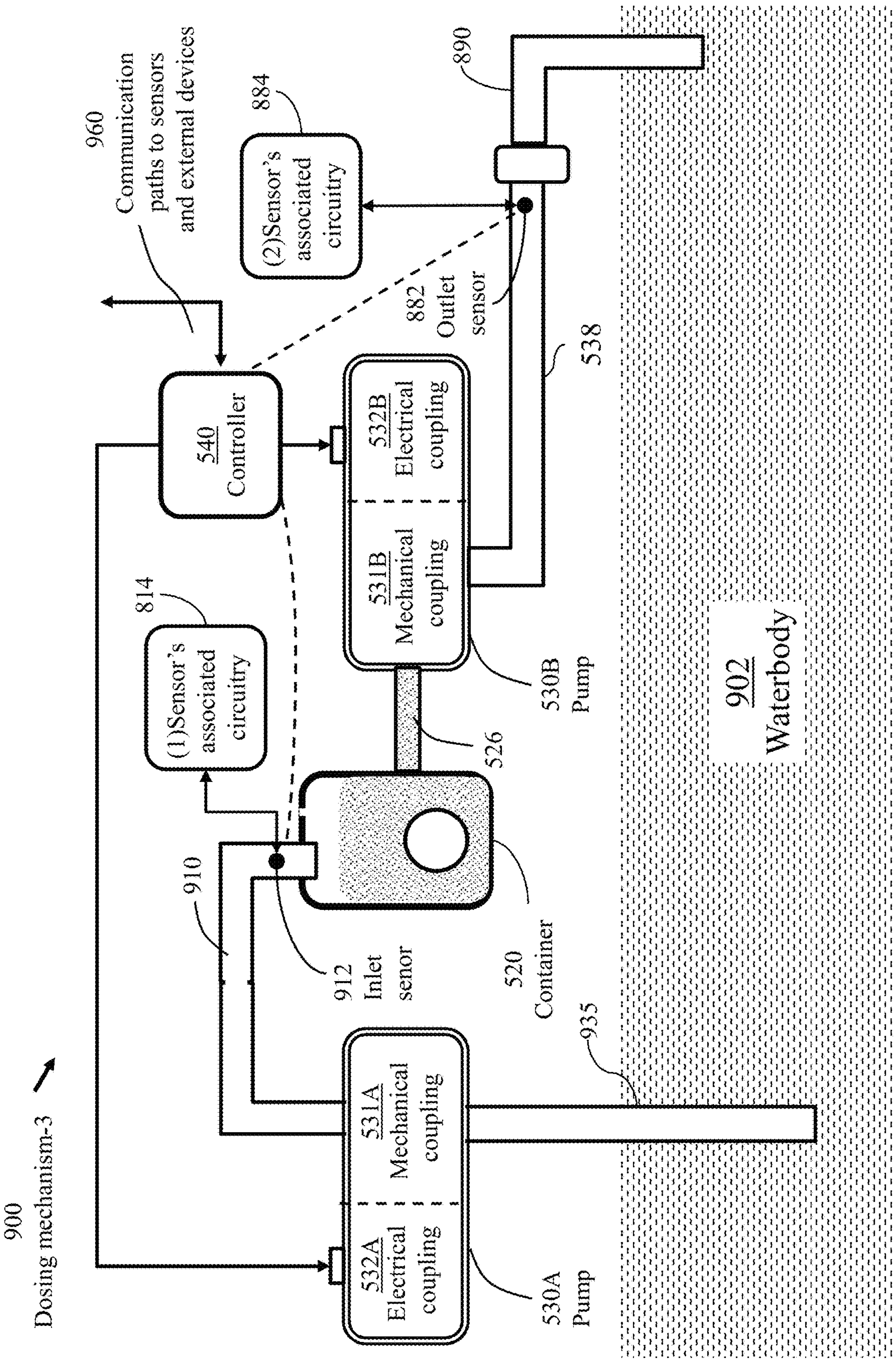
FIG. 9 is a schematic of a third dosing mechanism based on transient treatment of raw water, pumped from a waterbody, in a container and a pipe prior to release to a waterbody, in accordance with an embodiment of the present invention.

FIG. 9 is a schematic 900 of a third dosing mechanism based on transient treatment of raw water, pumped from the body of water 902, in a container 520 prior to release to the body of water.

A first pump 530A draws raw water from the waterbody 902. Pump 530A is mechanically coupled (reference 531A) to a pipe 935 and a pipe 910. Pump 530A is electrically coupled (reference 532A) to controller 540. A second pump 530B is mechanically coupled to the container 520 (reference 531B), through a direct pipe 526 to extract doses of the content of the container to be released in the waterbody through a discharge pipe 538. Pump 530B is electrically coupled (reference 532B) to controller 540.

An inlet sensor 912 (which may include multiple specialized sensor units) detects designated properties of the raw water. Inlet sensor 912 is communicatively coupled to electronic circuitry 814 (as in the mechanism of FIG. 8) for electronic processing of signals from inlet sensor 912. An outlet sensor 882 (which may include multiple specialized sensor units) detects designated properties of the partially treated water in container 520. Outlet sensor 882 is communicatively coupled to electronic circuitry 884 for electronically processing signals from outlet sensor 882. Controller 540 is communicatively coupled to external devices, through communication paths 960) in addition to the aforementioned sensors and pumps.

Figure 10:
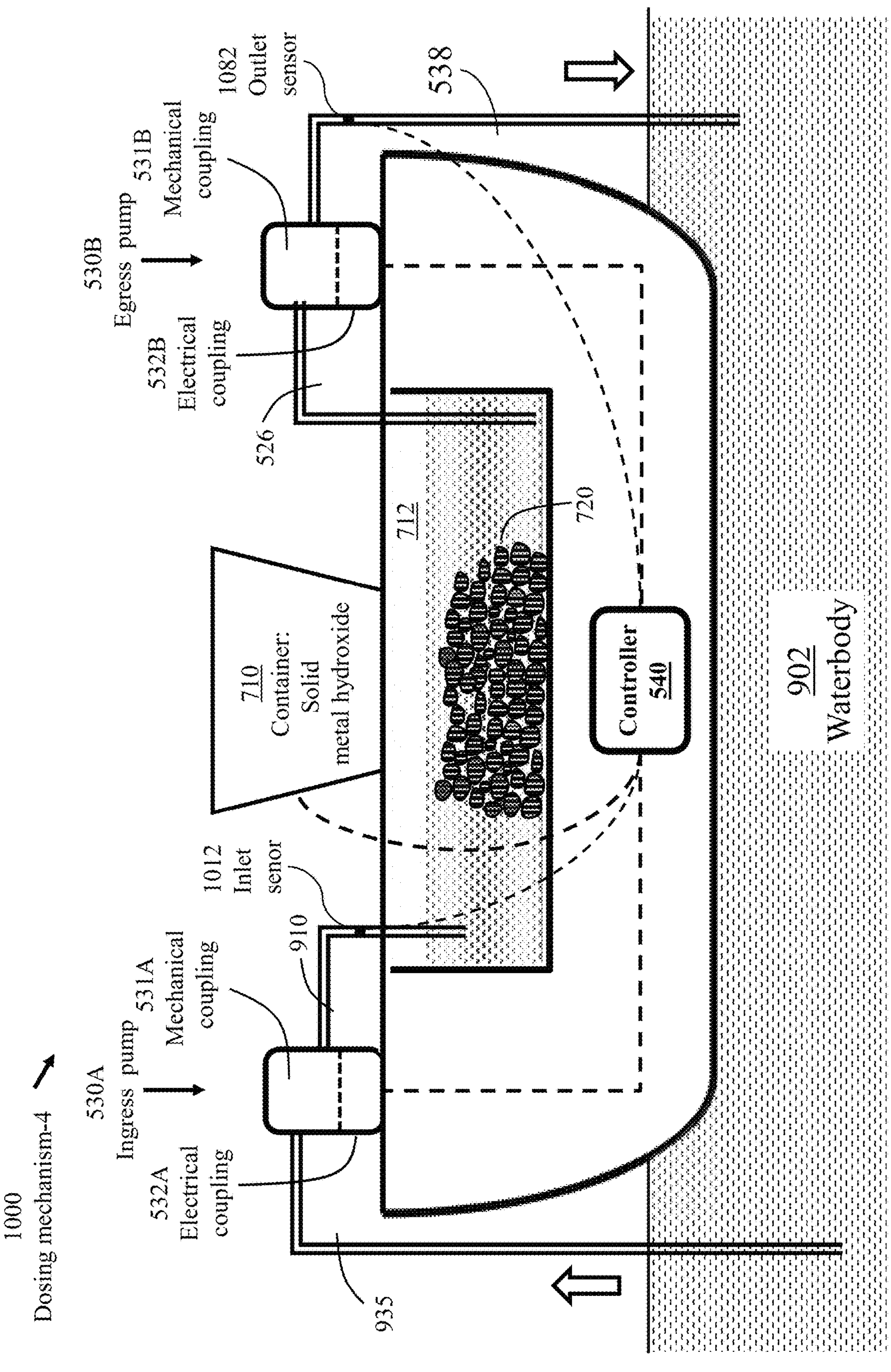
FIG. 10 is a schematic of a specific implementation of a fourth dosing mechanism combining the first dosing mechanism and the third dosing mechanism, in accordance with an embodiment of the present invention.

FIG. 10 is a schematic 1000 of a specific implementation of a fourth dosing mechanism, combining features of the first dosing mechanism 700 and the third dosing mechanism 900, based on transient treatment of raw water, pumped from a waterbody 902, in compartment 712 prior to release to the waterbody 902.

A first pump 530A draws raw water from the waterbody 902. Pump 530A is mechanically coupled (reference 531A) to a pipe 935 and a pipe 910. Pump 530A is electrically coupled (reference 532A) to controller 540. A second pump 530B is mechanically coupled to compartment 712 (reference 531B), through a direct pipe 1026 to extract doses of the content of compartment 1026 to be released in the waterbody through a discharge pipe 538.

An inlet sensor 1012 (which may include multiple specialized sensor units) detects designated properties of the raw water extracted from the waterbody 902. Inlet sensor 1012 is communicatively coupled to electronic circuitry (not illustrated) for electronic processing of signals from inlet sensor 1012. An outlet sensor 1082 (which may include multiple specialized sensor units) detects designated properties of the partially treated water. Outlet sensor 1082 is communicatively coupled to electronic circuitry (not illustrated) for electronic processing of signals from outlet sensor 1082.

Controller 540 is communicatively coupled to a servomechanism which regulates releasing the content of container 710, holding supplied alkaline substance 720, to dispensing compartment 712. Thus, controller 540 is communicatively coupled to sensors 1012, 1082, pump 530A, pump 530B, and said servomechanism. Additionally, controller 540 may be communicatively coupled to external computing devices.

Figure 11:
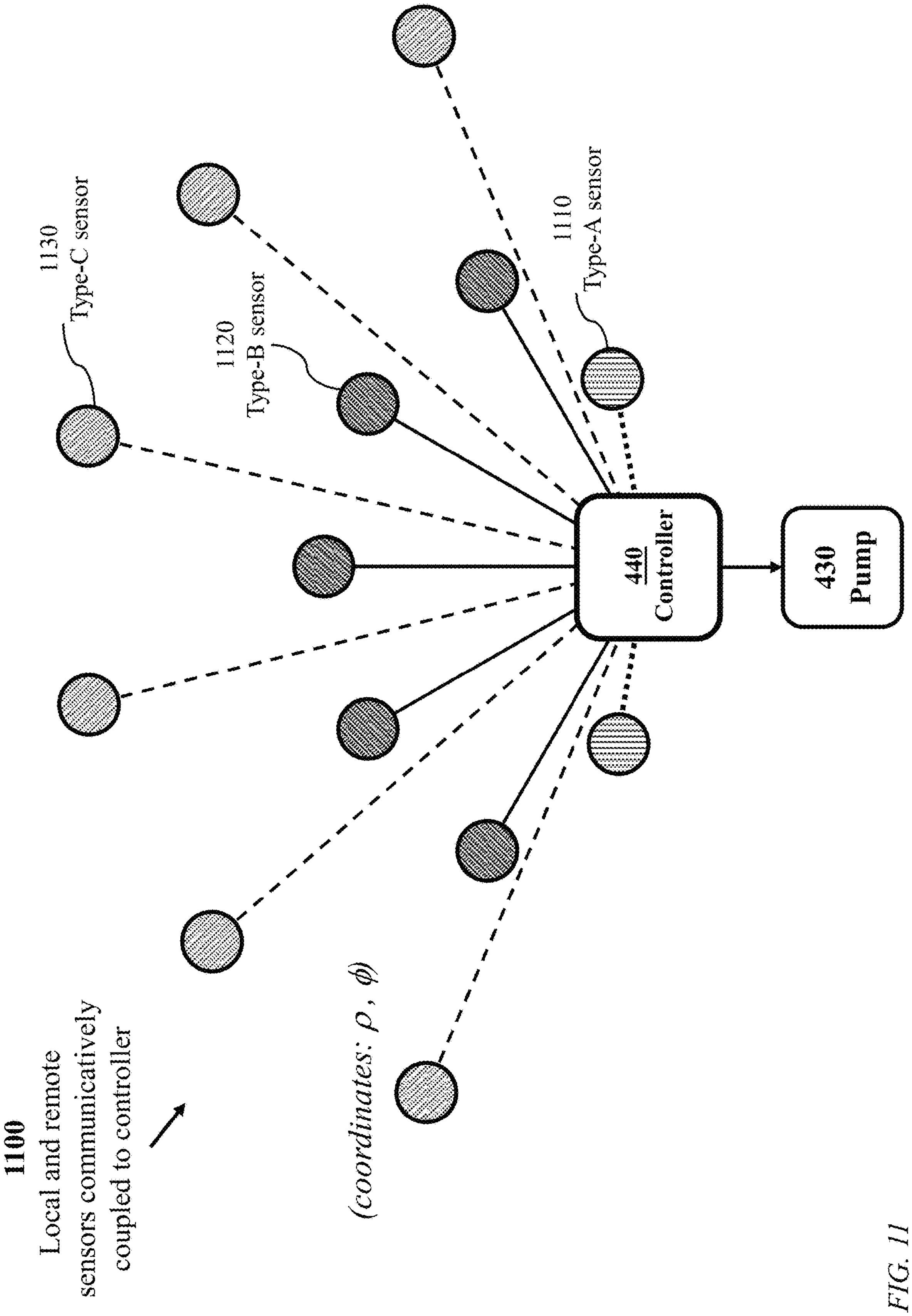
FIG. 11 illustrates a hierarchy of sensors communicatively coupled to a controller of the dosing station of FIG. 5.

FIG. 11 illustrates a hierarchy 1100 of sensors communicatively coupled to a controller 540 of the dosing station of FIG. 5. The sensors may have different configurations depending on their intended proximity to a point of release of alkaline substance into a respective waterbody. A type-A sensor 1110 is configured to detect water-property changes in the vicinity of a dosing station. A type-B sensor 1120 is configured to detect lower levels of water-property changes at a predefined distance from the dosing station. A type-C sensor 1130 is configured to detect significantly lower levels of water-property changes at a predefined larger distance from the dosing station; basically, to measure the spatial reach of dosing.

FIG. 12 illustrates a table 1200, maintained at a controller of a dosing station, indicating identification data, including locations and types of the sensors of FIG. 11, as well as time-varying data relevant to measured water properties.

For each of a number, $\Sigma$, $\Sigma>1$, of sensors, the table indicates a sensor identifier 1210 (may be a vector of quantified properties), location coordinates 1220, and respective properties 1230 to be detected (a subset of properties $P_1$ to $P_9$ in the illustrated example.

A sensor identifier 1210 may comprise a serial number and an indication of a respective sensor type determined from a list of available sensor types. Location Coordinates 1220 of an installed sensor at a given site may be planer polar coordinates ($\rho$, $\phi$), $\rho$ being a radial distance from a point of dosing and $\phi$ being an angular displacement from a predefine direction. A depth dimension with respect to a (calm) water surface may be considered. Sensors placed at equal radial distances, but different angular displacements, from a dosing point may report significantly different readings due to varying water currents. Specified water-characterizing parameters 1230 of interest may vary according to coordinates of installed sensors.

Figure 13:
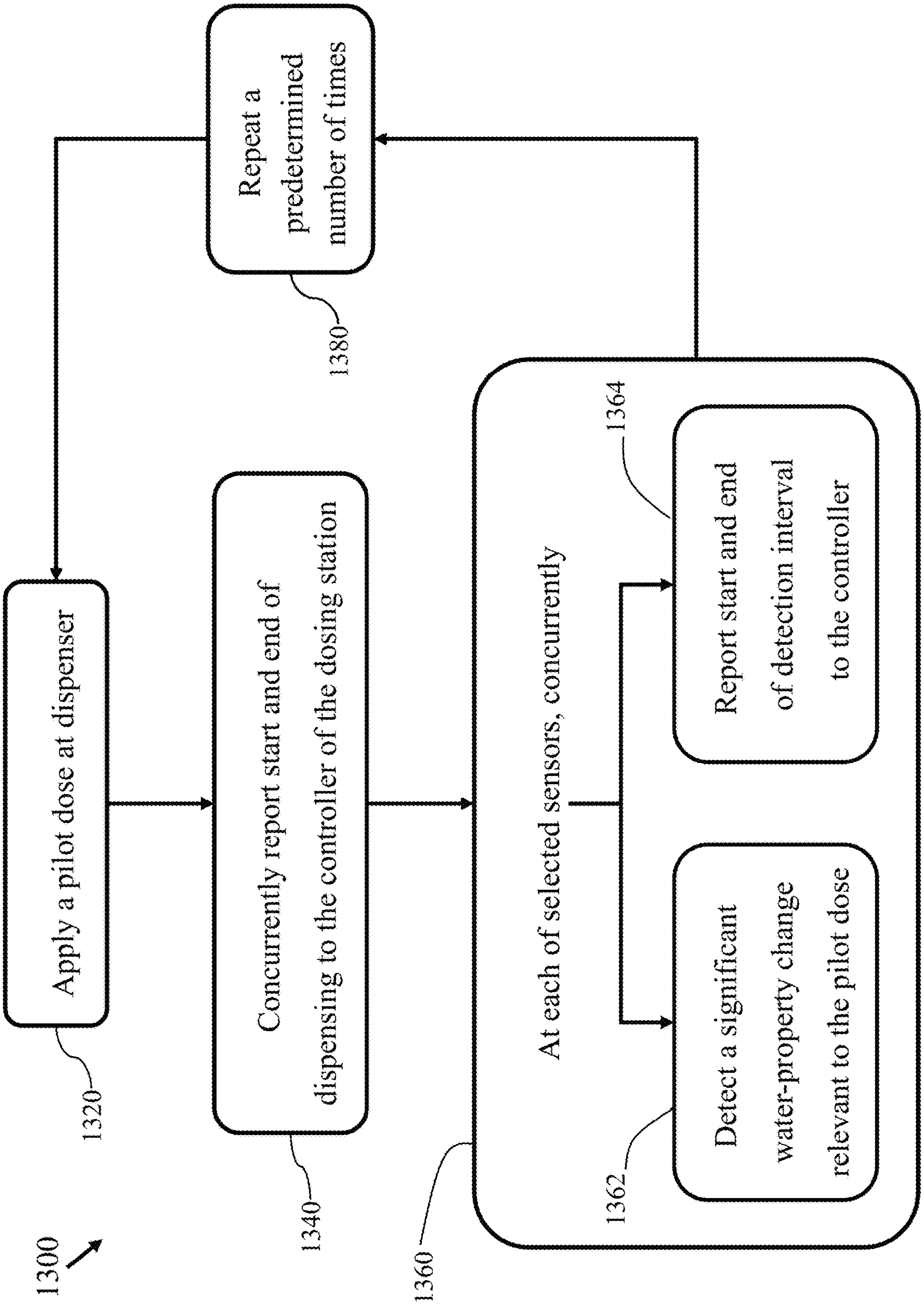
FIG. 13 illustrates a method for measuring advection latency, through a water-flow medium, in accordance with an embodiment of the present invention.

FIG. 13 illustrates a method 1300 for measuring advection latency, through a water-flow medium. Process 1320 applies a pilot dose of a selected alkalinity source. Process 1340 concurrently reports to a controller, through wired or wireless (including "Bluetooth" wireless) communication channels, indications of a start and end of a dosing step.

At a selected sensor, processes 1360 concurrently perform two processes 1362 and 1364.

Process 1362 detects (significant) water-quality changes that are attributed to the selected alkalinity source. Process 1364 reports the start and end of a detection interval (if any) to the controller. The sequence of processes 1320, 1340, and 1360 are repeated a predetermined number of times (based on known rules of statistical significance) to enable calculating a reliable estimate of the advection latency of the water-flow medium (action 1380).

Figure 14:
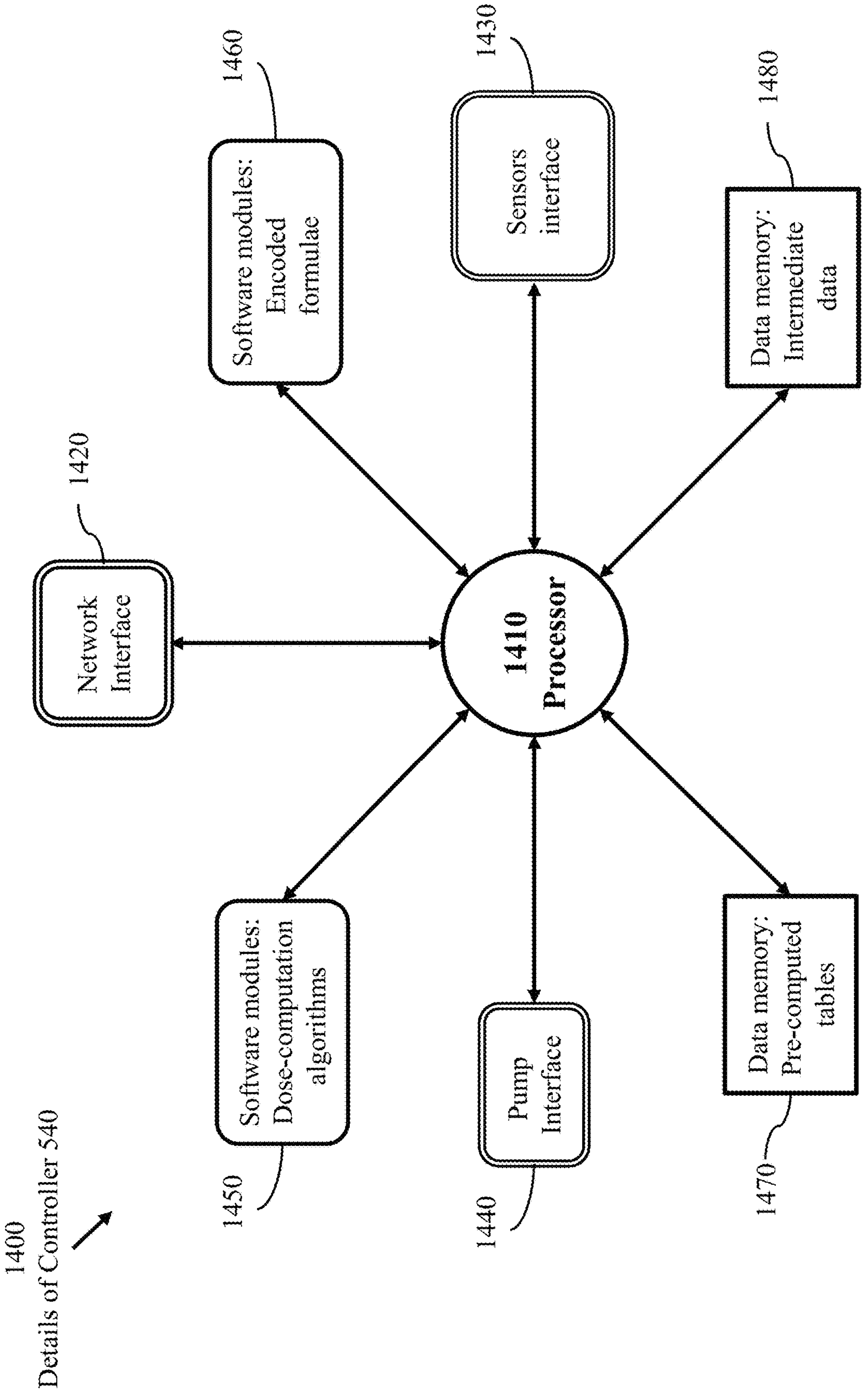
FIG. 14 illustrates an exemplary dosing controller for use in the dosing station of FIG. 5.

FIG. 14 illustrates components 1400 of an exemplary dosing controller for use in the dosing station 340 of FIG. 5. A hardware processor 1410 is coupled to a network interface 1420, a sensors' interface 1430, a pump interface 1440, a memory devices 1450 holding encoded dose-control algorithms according to various models of FIG. 17 (shown in more detail below) for calculating CDR versus the amount of alkalinity added to the body of water, a memory device 1460 holding encoded chemical analytical expressions, a memory device 1470 storing operational data, and a memory device 1480 holding intermediate processed data. Hardware processor 1410 may comprise multiple processing units operating concurrently and independently or in a pipeline discipline.

Network interface is configured to communicate with external controllers. Sensors' interface 1430 is configured to communicate with sensors associated with a dosing station. Pump interface 1440 is configured to generate electrical signals that controls specific operations of a dosing pump. The operational data stored in the memory device 1470 comprise pre-computed, or experimental, data needed for executing software modules stored in memory devices 1450 and 1460.

FIG. 15 illustrates a master macro-level decision table 1500 for use in a global controller (not illustrated) of a multi-site dosing system engaging multiple geographically distributed dosing stations. For each alkalinity-source type 1510 of a set of N available alkalinity-source types, N>1, and each application or experimentation dosing site 1520, a computed realizable CDR 1530 is entered in the table to facilitate decision making in a multi-site dosing project.

Figure 16:
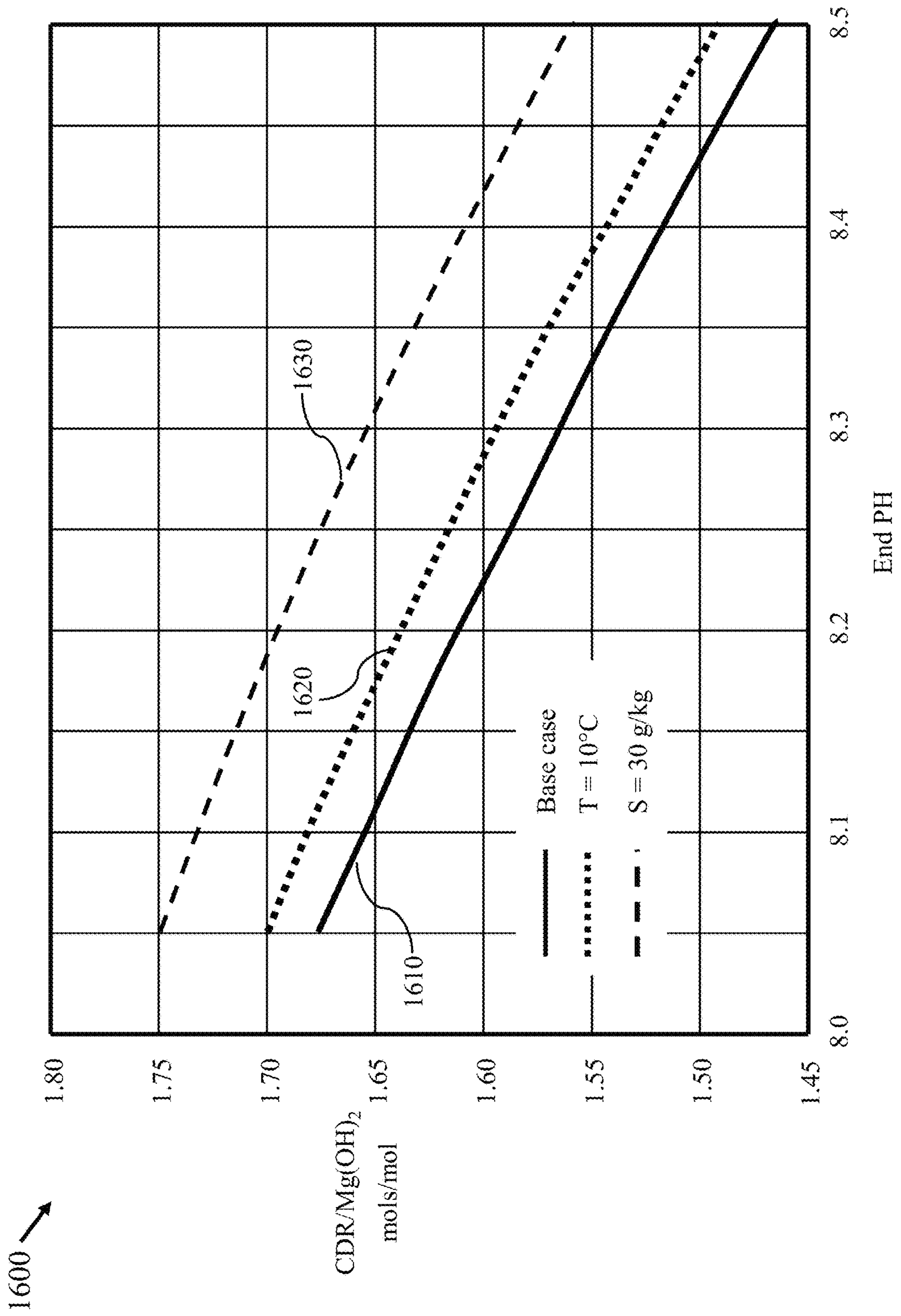
FIG. 16 illustrates variation of CDR with acidity level, expressed as a ratio of CDR units per alkaline-substance unit versus pH levels, for use in an embodiment of the present invention.

FIG. 16 illustrates variation of CDR with acidity level, expressed as a ratio of CDR units per alkaline-substance unit versus pH levels. Examples of sensitivity of CDR/Mg(OH)2 to pH, salinity (S) and temperature (T) are depicted. A base case corresponds to T=20° C., S=35 o/oo, pressure=10 dbar.

Figure 17:
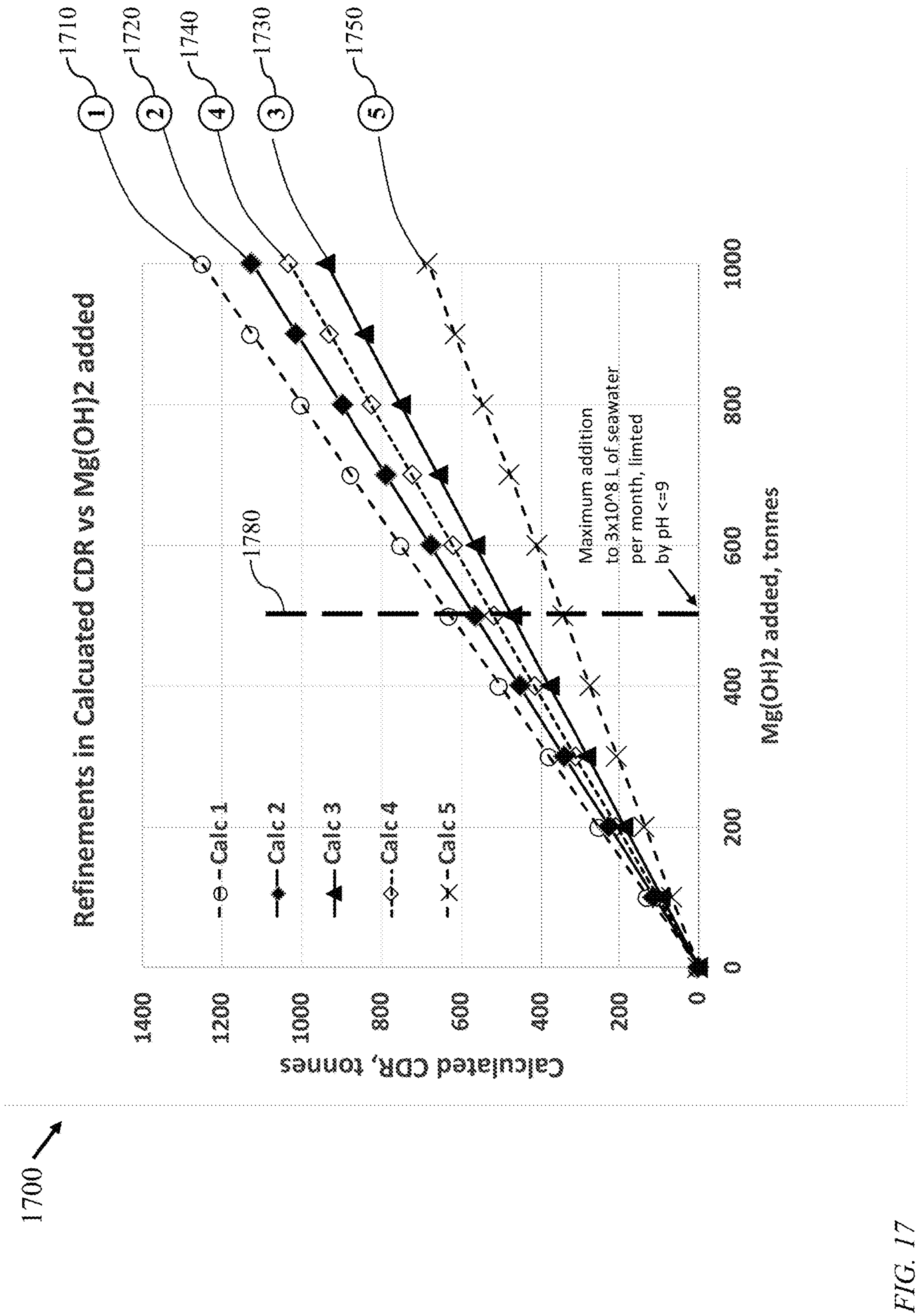
FIG. 17 illustrates variation of calculated CDR with weight of alkaline substance according to five approximation methods, for use in an embodiment of the present invention.

FIG. 17 illustrates a dependence of CDR versus a weight (amount) of alkaline substance added to the body of water according to five approximation methods/models. The figure depicts progressive refinement of the calculation of CDR as a function of mass of $Mg(OH)_2$ added to the surface mixed layer of the ocean.

The addition of Mg(OH)2 to seawater and hence the calculated CDR can be limited by the desire to stay within specified seawater chemical parameters. In the illustrated case, the rate at which Mg(OH)2 can be uniformly added over a month to $3\times10^8$ L ($10^7$ L/day) of well-mixed seawater in equilibrium with air is approximately 500 tonnes/month (17 tonnes/day) if a pH of 9 is not to be exceeded.

Figure 18:
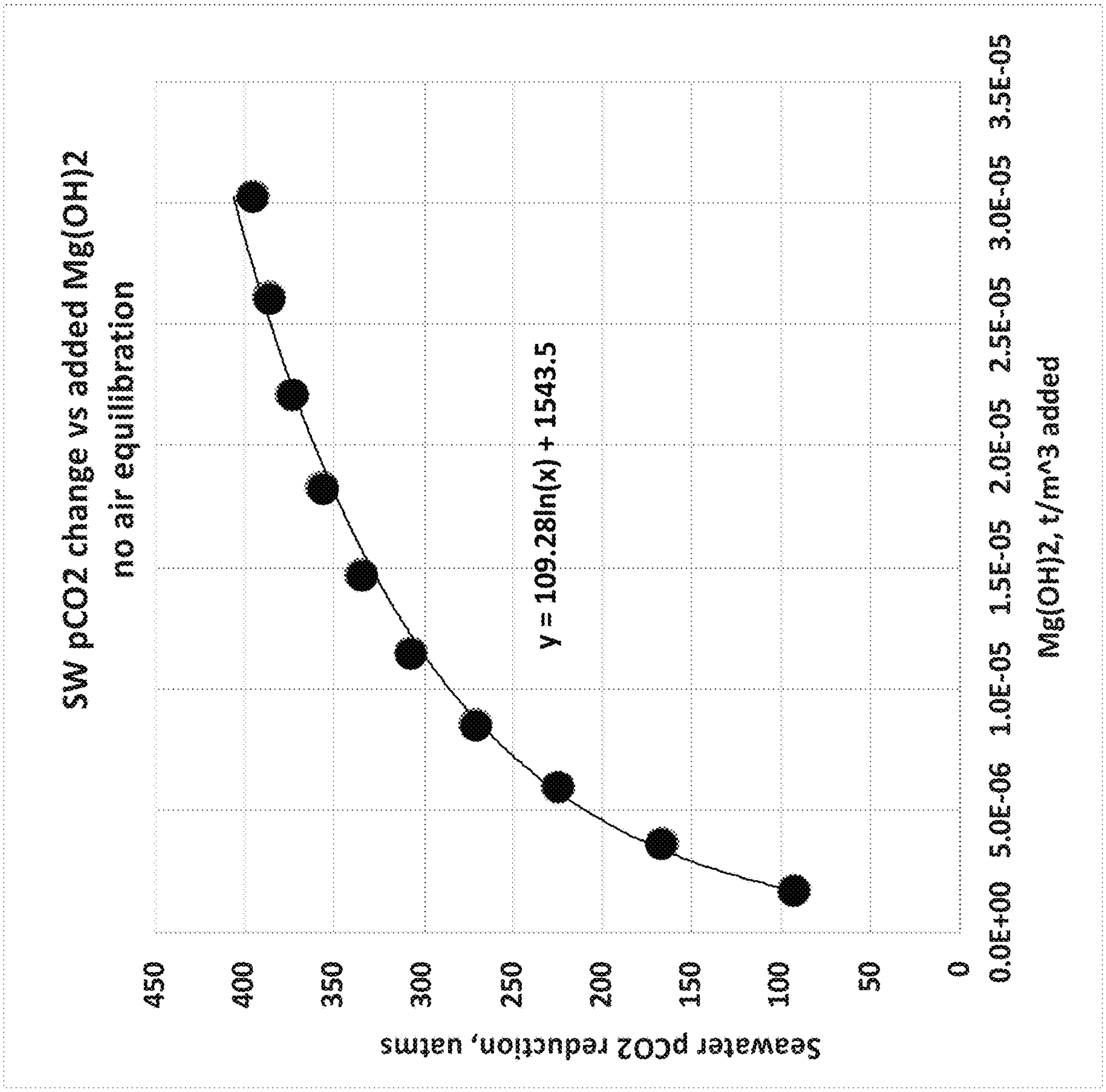
FIG. 18 illustrates variation of seawater carbon-dioxide with weight of applied alkaline substance, for use in an embodiment of the present invention.

FIG. 18 illustrates a dependence of seawater carbon-dioxide versus weight (amount) of applied alkaline substance.

An initial estimate of the potential gross CDR effect by a given mass of alkalinity added to a water body such as the ocean is determined by the chemical mass stoichiometry of the $CO_2$ reaction with that alkalinity. For example, in molar units at pH<6 the approximate reaction is $Mg(OH)_2$+$2CO_2$-->Mg+++$2HCO_{3-}$. By applying the mol weights of the respective compounds, 1.51 tonnes (metric tons) of $CO_2$ is then calculated to be removed per tonne of Mg(OH)2. Thus, an initial calculation of CDR for a given addition of a given mass of $Mg(OH)_2$ to the water body is:

$$\text{CDR}=t\text{ alkalinity added}\times1.51t\ CO_2\text{ removed}/t\text{ alkalinity} \quad (1)$$

where t=metric tons (tonnes).

However, the pH of many water bodies is significantly higher than in the preceding example, and this significantly modifies the preceding reaction in that carbonate ion is also produced in this case. Because carbonate ions are divalent they require twice the $Mg^{2+}$ to charge balance as does HCO3−. For example, the mean pH of the surface ocean is approximately 8.1 and therefore the molar reaction is:

$$Mg^{2+}+2OH^-+A(CO_{2aq})\text{--->}Mg^{2+}+B(HCO_3^-)+C(CO_3^{2-}+H_2O)+D(OH^-) \quad (2)$$

where A=B+C and B+(2×C)+D=2. At an equilibrium seawater pH of 8.1 at 20° C. and at shallow depth (near sea surface pressure), A=1.65 mols of $CO_2$ per mol of $Mg(OH)_2$, and B, C and D are 1.48, 0.17 and 0.18 moles/mole, respectively. The molar ratio A decreases with increasing seawater pH. For example, at pH=8.3 the ratio drops to 1.56 (FIG. 16).

This molar ratio can be converted to a mass ratio. For example, at pH=8.1, 1.65 mols $CO_2$/mol $Mg(OH)_2$)×44(wt./mol $CO_2$)/58.3(wt./mol $Mg(OH)_2$)=1.25 t $CO_2$ removed/t $Mg(OH)_2$. Thus, the CDR calculation in typical seawater becomes:

$$\text{CDR}=t\text{ alkalinity added}\times1.25t\ CO_2\text{ removed}/t\ Mg(OH)_2 \quad (3)$$

An example of the use of this equation in calculating CDR as a function of mass of $Mg(OH)_2$ added to the ocean is shown as "Calc1" 1710 in FIG. 17. In FIG. 17:

Calc1 1710 graph uses equation 3 above;

Calc2 1720 graph modifies Calc 1 by incorporating $F_{equil}$=0.90 (equation 9 below);

Calc3 1730 graph includes an $F_{hback}$ factor=0.15 in this example (equation 10 below);

Calc4 1740 graph include a $CDR_{ww}$ factor, in this example=30% of the CDR in Calc 1 (equation 11 below); and Calc5 1750 graph includes an $LCA_{emiss}$ factor, in this example=0.35 tonnes $CO_2$ emitted/tonne $Mg(OH)_2$ added to the ocean (equation 14 below).

Further refinement/limitation of the amount of magnesium hydroxide permitted to the added to the body of water, and a corresponding reduced CDR has been determined by also considering measurement from sensors, for example pH, temperature, salinity and pressure in the body of water. Namely, a vertical line 1780 in FIG. 17 illustrates a maximum amount of magnesium hydroxide that is permitted to be added to the body of water of predetermined volume per month, to keep pH<9, which in turn defines corresponding permissible CDRs according to Calc1, Calc2, Calc3, Calc4 and Calc5, designated as 1710, 1720, 1730, 1740 and 1750 graphs accordingly, corresponding to respective maximum permitted amounts of magnesium hydroxide.

In this application, we'll refer to the maximum permitted amount of magnesium hydroxide as "required amount of $CO_2$-reactive alkalinity" or "target amount of $CO_2$-reactive alkalinity", and to corresponding permissible CDRs as "permissible target CDRs" or "target CDR".

The above graphs Calc1, Calc2, Calc3, Calc4 and Calc5 (1710, 1720, 1730, 1740 and 1750) determine the amount of magnesium hydroxide to be added to the body of water, under different progressively improved calculation models 1710, 1720, 1730, 1740 and 1750, to achieve respective Carbon Dioxide Removal (CDR) from the atmosphere corresponding to the above models.

The tonnes/tonne ratio will also vary among different sources of alkalinity used depending on the valence and mol weight of the alkalinity. For example, the equivalent to the above 1.25 ratio for $Mg(OH)_2$ is 1.82 tonnes CDR/tonne NaOH, and 0.98 tonne CDR/tonne $Ca(OH)_2$ in typical seawater.

Under circumstances where the source alkalinity is chemically impure or unknown, the ratio can be empirically determined by adding a given mass of alkalinity to a known volume of air-equilibrated, stirred water or seawater. After full dissolution of the alkalinity and with re-equilibration with air, the increase in the solution's DIC concentration times the volume of solution divided by the mass of alkalinity added can provide a direct measure of mass CDR/mass alkalinity at the pH, salinity, temperature and pressure of the test solution. Indeed, experimental 2 L scale seawater testing showed that under rapid stirring of 1 mM $Mg(OH)_2$ in seawater, approximately 50% of the theoretical carbon uptake per mass alkalinity added is achieved the first day following alkalization, and 99% of the theoretical yield, 1.25 t $CO_2$ removed/t $Mg(OH)_2$, was achieved after about 20 days. Thus, by knowing the tonnes CDR per tonne of alkalinity, the potential CDR achieved by a given mass alkalinity addition to a water body can be determine by multiplying the tonnes alkalinity added by the preceding tonnes CDR/tonne alkalinity.

However, using Calc1 1710 of FIG. 17 of CDR has been further improved to consider a vertical dispersal of the alkalized, $CO_2$-depleted water in a water body such as the ocean. Here, the natural movement of such water away from the surface ocean reduces the time allowed to equilibrate with air. Furthermore, the alkalinity added may be in particulate form and may not fully dissolve before it sinks from surface waters. Note it is preferable that the $CO_2$-reactive alkalinity be added to the surface mixed layer of a water body so as to maximize the degree of: i) alkalinity dissolution, ii) dissolved $CO_2$ depletion achieved and iii) equilibration with air. Even if alkalinity is added to surface waters, the alkalized water or alkaline particles may rapidly sink prior dissolution or equilibration with air, thus degrading realized CDR per alkalinity mass added. Once removed from the surface mixed layer away from contact with air, potentially little or no CDR will be effected until that parcel, with fully dissolved alkalinity, returns to the surface, which in the ocean could take as long as a millennium depending of currents and hydrography. Thus, for nearer-term accounting of CDR, the vertical transport of alkalized water relative the air-water $CO_2$ gas exchange rate must be taken into consideration at a given location where the alkalinity is added.

In the case of magnesium hydroxide, the dissolution of solid $Mg(OH)_2$ occurs on timescales of hours-to-days, the reaction of dissolved $Mg(OH)_2$ with dissolved $CO_2$ occurs nearly instantaneously, air-sea $CO_2$, equilibration (CDR) occurs on timescales of weeks to months, while advection of surface seawater to depth out of contact with the atmosphere can occur in minutes to months. For example, global model output for $CO_2$ equilibration timescales indicates a global mean value of about 4 months, a standard deviation of about 3.5 months, and only a small fraction of areas in offshore waters where the value exceeded about 12 months.

Methods of measuring the fraction of alkalized water that has equilibrated with air, $F_{equil}$, include differencing the rate of air-sea gas exchange ($Gas_{ex}$, mols $CO_2$ $m^{-2}$ $day^{-1}$) and the rate of removal of $CO_2$ undersaturated water to depths out of contact with the atmosphere ($CDR_{loss}$, mols $CO_2$ $m^{-2}$ $day^{-1}$), divided by the $Gas_{ex}$:

$$F_{equil}=(Gas_{ex}-CDR_{loss})/Gas_{ex} \quad (4)$$

when $Gas_{ex}>CDR_{loss}$. For example, if alkalinity addition occurs in shallow, well mixed coastal or nearshore waters, $CDR_{loss}$ can be near zero, meaning nearly all of the alkalized water will eventually equilibrate with the atmosphere and $F_{equil}$ will be near 1. At the other extreme, rapid removal of surface seawater (high $CDR_{loss}$ values) relative to $Gas_{ex}$ could drive $F_{equil}$ to near zero.

$Gas_{ex}$ can be determined by this equation:

$$Gas_{ex}=K\times(pCO_{2air}-pCO_{2ocean,t}) \quad (5)$$

where K is a gas exchange coefficient, $pCO_{2air}$ is the mean $pCO_2$ in the air above the location of the alkalized water and $pCO_{2ocean}$ is the $pCO_2$ of the alkalized water in contact with air at time t. FIG. 18 provides a modeled example of the reduction of $pCO_{2ocean}$ (relative to an initial $pCO_2$ of 420 uatms) in response to added of alkalinity in the absence of air-sea gas exchange. More specifically, FIG. 18 illustrates the reduction of seawater $pCO_2$ (=420 uatms initially) with the addition of $Mg(OH)_2$ in units of tonnes per $m^3$ of seawater in the absence of air-sea $CO_2$ equilibration, Thus, when $pCO_{2ocean}$ is initially equal to or less than $pCO_{2air}$, the difference between air and ocean $pCO_2$ will increase with increasing presence of $Mg(OH)_2$ and thus $Gas_{ex}$ will proportionally increase. K can be estimated from wind speed, or other methods known in the art.

$Gas_{ex}$ can also be measured by eddy covariance in the air above the alkalized ocean wherein high-frequency wind and scalar atmospheric data ($CO_2$, energy, and momentum) can yield values of vertical $CO_2$ flux across the air/sea boundary.

$CDR_{loss}$ may be measured via the downstream monitoring of the concentration of a chemical tracer that is either naturally present in wastewater or other discharge water or that is artificially added, for example Rhodamine or Fluorescein or other tracers known in the art and homogeneously mixed with the alkalinity prior to addition to the ocean. After addition to the ocean, the concentration of the tracer will decline over time and distance from the ocean discharge point due to dilution with unamended seawater. Its presence at whatever concentration at a point and time in the ocean following release denotes that some fraction of the wastewater+alkalinity has penetrated to a given location at a given time.

Thus, by measuring any increase above background in concentrations of the tracer over time in waters within and below the ocean surface mixed layer (water in contact with the atmosphere) and integrating over the volume of the respective volume affected, the fraction of tracer lost from the mixed layer, $f_t$ can be determined:

$$f_t=Rhod_{subsurf,t}/(Rhod_{surf,t}+Rhod_{subsurf,t}) \quad (6)$$

where $Rhod_{surf,t}$ is the volume-integrated quantity of Rhodamine in the ocean surface mixed layer at time t and $Rhod_{subsurf,t}$ is the volume-integrated quantity of Rhodamine in the subsurface ocean at time t. $CDR_{loss,t}$ can then be determined:

$$CDR_{loss,t,}=f_1\times\text{tonnes } Mg(OH)_2 \text{ added}\times(\text{tonnes CDR/tonne } Mg(OH)_2 \text{ added}) \quad (7)$$

As previously described, tonnes CDR/tonne $Mg(OH)_2$ added can equal 1.25 in typical seawater.

Another option for $F_{equil}$ estimation is based solely on the $CDR_{loss,t}$ term above. That is, over a time length sufficient to equilibrate the majority of the surface seawater with the air following alkalinization, e.g., 3 months, $F_{equil}$ is simply the mean fraction of the alkalized $CO_2$-undersaturated seawater in the surface layer during t:

$$F_{equil}=1-(0.5\times f_t) \quad (8)$$

where $0.5\times f_t$ is used to represent the mean f during time t (not at time=t), assuming a linear increase in f between 0 at t=0 and a larger fraction at t>>0, e.g. 3 months.

$Gas_{ex}$, $CDR_{loss}$ and thus $F_{equil}$ can also be estimated or predicted via computer models of ocean chemistry and physics (known in the art). Models reliant on a suite of regional ocean observations (e.g., turbulence rates and density gradients) can utilize certain assumptions to estimate $Gas_{ex}$ and $CDR_{loss}$ and thus $F_{equil}$ in the ocean region alkalized.

It is also possible to predict the fraction of air equilibration using computer models of ocean physics and air-sea gas exchange as affected by measured or prescribed wind, thermal, salinity and geostrophic forcings. Such models can be used to predict the distribution and surface ocean residence time of a mass of alkalinity add at a given point in the ocean over a set time period.

Finally, the accuracy and precision of the preceding models can be validated or adjusted and improved, and uncertainties of prediction reduced by comparison to the measurements described above. Use of models whose accuracy and precision are thus improved can reduce uncertainty in $F_{equil}$ estimation and thus uncertainty in the CDR calculation.

By whatever method $F_{equil}$ is measured or estimated, it can be inserted into equation (3) to provide a more accurate estimate of CDR:

$$CDR=(t\text{ alkalinity added}\times t\ CO_2\text{ removed}/t\text{ alkalinity})\times F_{equil} \tag{9}$$

where in this case, t=tonnes.

An example of the effect of calculation on CDR according to the equation (9) is shown as the Calc2 1720 graph in FIG. 17.

The embodiments of the invention provide an additional refinement to the CDR calculation by considering the uncertainty of the preceding CDR estimate and then reducing the CDR value accordingly to provide a more conservative and more certain estimate:

$$CDR=(t\text{ alkalinity added}\times t\ CO_2\text{ removed}/t\text{ alkalinity})\times(F_{equil}-F_{hback}). \tag{10}$$

For example, if the 95% confidence level of the preceding CDR estimate is +/−15%, a reduction factor of 0.15 can be introduced into the calculation to provide great certainty of the resulting estimate. The $F_{hback}$ calculated for a given alkalinity discharge may be reduced or increased following the discharge if the uncertainty in the initial calculation is reduced or increased by the use of more direct measurement or more accurate modeling of the alkalinity release following its discharge to a water body (Calc3, 1730 of FIG. 17).

Figure 19:
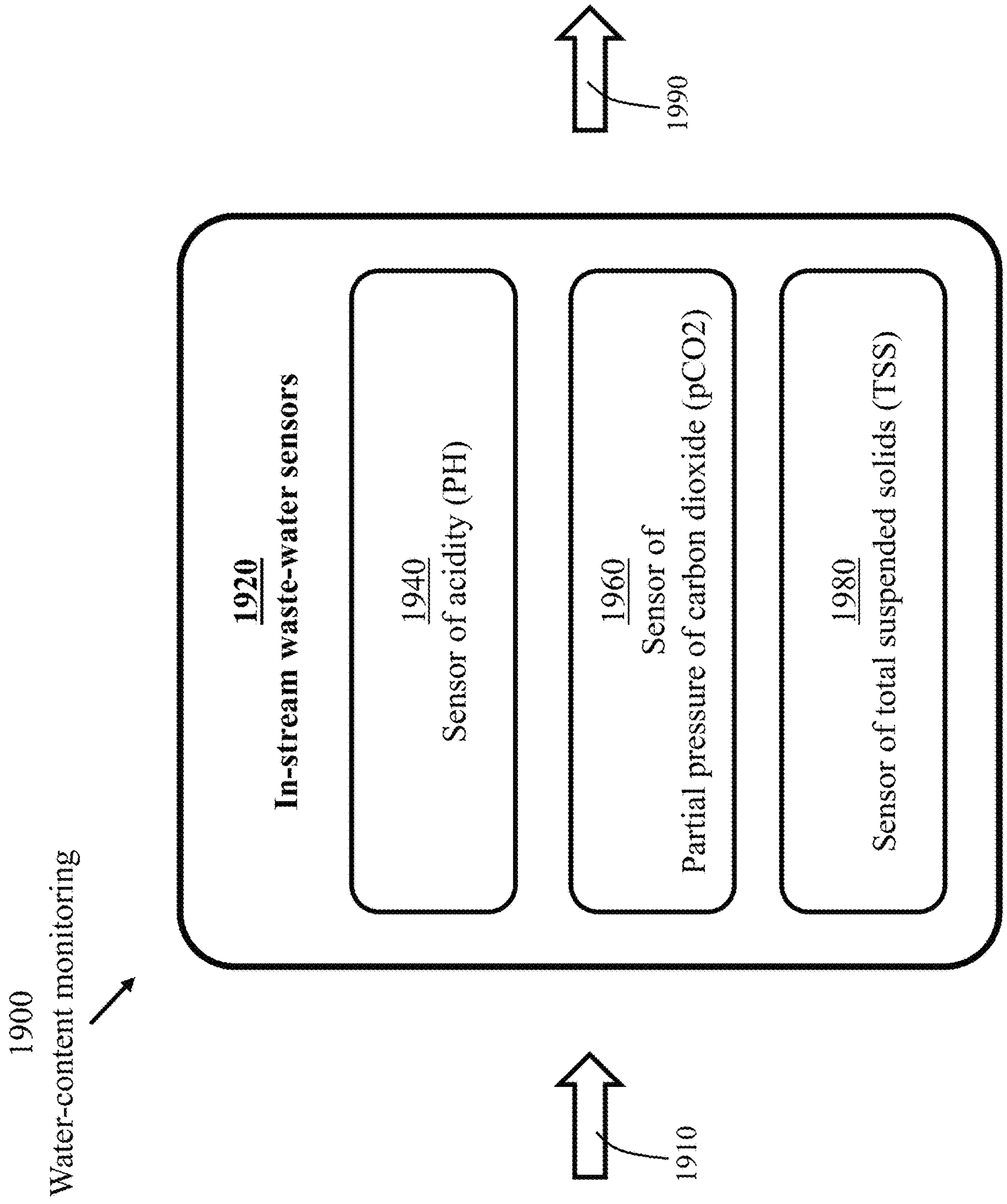
FIG. 19 illustrates exemplary sensor types for instream water-property monitoring.

FIG. 19 illustrates an exemplary device 1900 for instream water-property monitoring comprising a set 1920 of independent sensors of different types. Set 1920 may include an acidity or pH sensor 1940, a sensor 1960 of partial pressure of carbon dioxide, and a sensor 1980 of total suspended solids (TSS).

Embodiments with Waste Water Pipe

A further refinement offered by the invention is consideration of any CDR effected prior to the addition alkalinity to a water body. For example, in the case of the use municipal wastewater discharge as a vehicle for alkalinity addition to the surface ocean, the high biomass loading and biological metabolism characteristic of these waste streams means that they are very highly supersaturated in $CO_2$ relative to air. Thus, by adding alkalinity to these streams there is significant potential for $CO_2$ removal to occur in the delivery pipe before the alkalized wastewater is delivered to the ocean. Because this respired $CO_2$ represents $CO_2$ that was recently removed from the atmosphere by biological activity (e.g., plant photosynthesis), any removal and storage of this carbon can be considered CDR.

$CDR_{ww}$ denotes the tonnes of CDR that occurs in the wastewater or other pipeline carrying supersaturated $CO_2$ (relative to air) prior to discharge to the ocean.

Thus, when and where $CO_2$ supersaturation is present in the alkalinity discharge water, the CDR calculation can be refined by adding the $CDR_{ww}$ term:

$$CDR=[((t\text{ alkalinity added}\times t\ CO_2\text{ removed}/t\text{ alkalinity})-CDR_{ww})\times(F_{equil}-F_{hback})]+CDR_{ww}\text{ where }t=\text{tonnes}. \tag{11}$$

That is, the quantity of CDR achieved prior to discharge ($CDR_{ww}$) to the water body or ocean can be added to the CDR calculated in eq. (9), but where the quantity of CDR effected in the water body is proportionately reduced to reflect that some $CO_2$-reactive alkalinity has been consumed prior to discharge. This calculation assumes that all the $CO_2$ consumed prior to discharge to the ocean or water body would otherwise have been emitted to the atmosphere and therefore $CDR_{ww}$ in this example is not subject to corrections involving $F_{equil}$ and $F_{hback}$ in the case of $CO_2$-reactive alkalinity discharge to the ocean or water body. An example of this effect of the inclusion of $CDR_{ww}$ on the CDR calculation is shown in Calc4 1740 in FIG. 17. Otherwise, if $CDR_{ww}$ is subject to the same $F_{equil}$ and $F_{hback}$ factors as applied to the CDR occurring in the water body, then no discernment of $CDR_{ww}$ is required and the calculation of total CDR to this point is as shown in equation (10).

$CDR_{ww}$ can be directly measured by differencing: i) the wastewater $CO_2$ partial pressure ($pCO_2$) prior to or upstream of the addition of alkalinity to the wastewater stream, and ii) the $pCO_2$ following alkalinity addition to the wastewater measured at or near the point of discharge to the ocean. This $pCO_2$ decline together with its measured duration and affected wastewater discharge rate can be used to calculate tonnes of $CO_2$ removed from the waste stream. Specifically:

$$CDR_{ww}(\text{tonnes})=(WW\ pCO_{2pre}-WW\ pCO_{2post})\times\text{Sol. Constant}\times\text{WW rate}\times\text{time} \tag{12}$$

where Sol. Constant is the temperature- and salinity-sensitive solubility coefficient for $CO_2$ in wastewater, in this case in units of tonnes $CO_2$ $\mu atm^{-1}$ $m^{-3}$. WW rate is the discharge rate of wastewater, in $m^3$/hr, measured using conventional methods and averaged over the duration of the alkalinity addition, and "time" in equation (12) is the duration of the alkalinity addition, in hours. WW $pCO_{2pre}$ is the wastewater $pCO_2$ prior to alkalinity addition (in μatm), measured upstream of the alkalinity addition. WW $pCO_{2post}$ is the wastewater $pCO_2$ after alkalinity addition (in μatm), measured at or near the point of discharge to the ocean.

Using conventional methods, WW $pCO_{2pre}$ and WW $pCO_{2post}$ are either measured directly in the wastewater stream or by lowering a sampling tube into the flowing pipe and directly pumping effluent (using, for example, a peristaltic pump) into an above-ground reservoir containing the $pCO_2$ probe. In this way the wastewater is contacted by the probe before being pumped back into the wastewater pipe, as illustrates in FIG. 19 showing in-stream wastewater sensor box 60 that is used both upstream and downstream of alkalinity addition. Conversely, $pCO_2$ can be measured in a volume of gas equilibrated with the wastewater stream, for example in the gas headspace above the wastewater flowing in the pipe.

Both WW $pCO_{2pre}$ and $pCO_{2post}$ are measured continuously or at least on an hourly basis. To account for any temporal change in upstream, unalkalized WW $pCO_{2pre}$ before and during the course of alkalization, $pCO_2$ of the wastewater upstream of the alkalinity addition point before and during alkalization is also monitored. Differencing upstream and end-pipe $pCO_2$ prior to commencing alkalization measures changes in $pCO_2$ between upstream and the discharge point due to non-alkalization processes, such as $CO_2$ leakage from the pipe to the atmosphere or dilution of the wastewater stream from, for example, storm drain runoff.

Other options for measuring WW $pCO_{2post}$ are as follows.

Option 1, where no second access point is available, a piece of tubing connected to the above-ground Sensor Box is deployed into the pipe from the single access point and directed downstream. The tubing length determines the distance relative to the $Mg(OH)_2$ addition point.

Option 2, a sensor package attached to a wire is sent down the pipe to the end of the system. This sensor (our "artificial fish") internally logs $pCO_2$ measurements (and other ancillary data channels that are feasible) as it travels down the pipe, propelled by the flow of effluent. The length of wire tether released determines where the effluent is being sensed.

Option 3, a piece of tubing (as in option 1) or sensor package (as in option 2) are inserted into the wastewater stream from the pipe's endpoint (i.e. where the effluent exits into the ocean).

Figure 20:
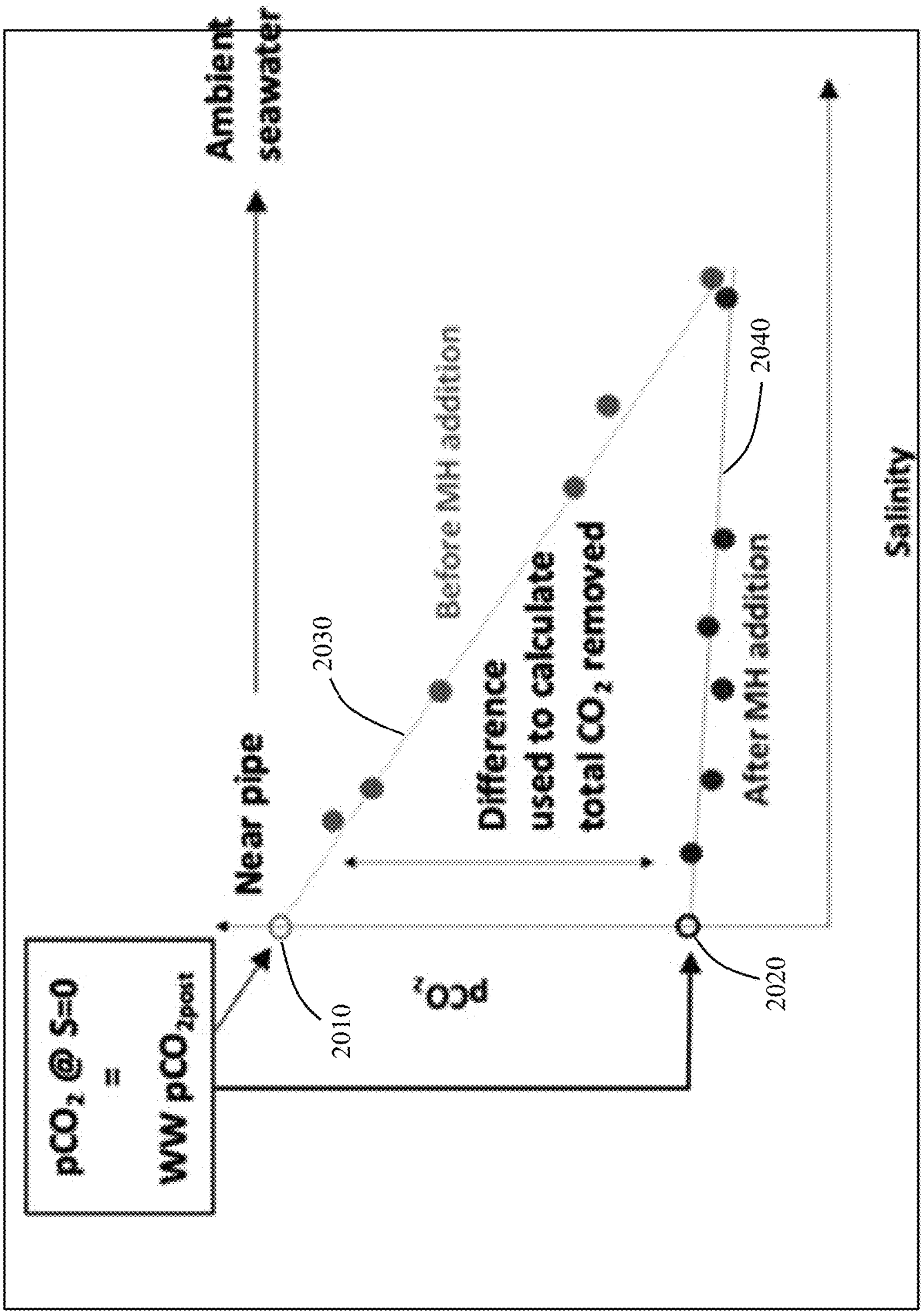
FIG. 20 illustrates the use of a salinity mixing line to determine the pCO2 in wastewater, effect of alkalinity addition on wastewater pCO2 and hence determination of wastewater CDR.

At sites where direct in-pipe measurement of WW $pCO_{2post}$ at or near the final discharge point to the ocean is not feasible, this value can be estimated using marine measurement surveys near the point of discharge. Because wastewater typically has a much lower salinity than seawater, a 'mixing line and extrapolation' method for calculating WW $pCO_{2post}$ at wastewater salinity is illustrated in FIG. 20, which is based on using data graphing and extrapolation to determine wastewater discharge $pCO_2$ and background ocean $pCO_2$ with alkalinity addition 2040 and without alkalinity addition 2030. In FIG. 20, MH denotes magnesium hydroxide.

Measurement of seawater $pCO_2$ and salinity throughout and outside the effluent plume may yield co-variability along a 'mixing line(s)' 2030, 2040 illustrating change of salinity versus distance in the vicinity of the discharge point from the waste water pipe to the body of water. Mixing lines 2030 and 2040 correspond to the pre-alkalinity addition (2030) and post-alkalinity addition (2040), and extrapolating the mixing lines 2030 and 2040 to the y-axis (i.e. zero-salinity), yields the respective WW $pCO_{2post}$, 2010 and 2020, to be referred to as $pCO_{2before}$ (2010) and $pCO_{2after}$ (2020). Additionally, at the salinity of wastewater, here zero, the difference between the "before MH ($Mg(OH)_2$) addition" $pCO_2$ 2010 and the $pCO_2$ "after MH ($Mg(OH)_2$) addition" 2020 can be used to calculate $CDR_{ww}$:

$$CDR_{ww}=(pCO_{2before}-pCO_{2after})\times C\times \text{total alkalized WW discharge volume } (m^3) \quad (13)$$

where C is a T- and S-sensitive solubility constant in this case in units of tonnes $CO_2/(\text{uatm}\times m^3)$. Thus, it has been used as a comparative 'marine-based' estimate for the $CDR_{ww}$ term that is otherwise measured more directly in the discharge pipe as described above.

A further refinement offered in the CDR calculation in eq. (11) is the subtraction of the $CO_2$ emissions emitted in the production, transportation and distribution of the alkalinity mass used in the CDR, thus allowing the calculation of the net CDR achieved, $CDR_{net}$. We designate the quantity of $CO_2$ emitted as life cycle analysis $CO_2$ emissions, $LCA_{emiss}$ in units of tonnes of $CO_2$. This term is then inserted into the calculation of CDR as follows:

$$CDR_{net}=[(\text{alk mass added}\times CO_2\text{ removed/alk mass}-CDR_{ww})\times(F_{equil}-F_{hback})]+CDR_{ww}-LCA_{emiss} \quad (14)$$

For example, if the use of 1,000 t of $Mg(OH)_2$ for CDR results in 200*t* $CO_2$ emitted in its production, 100 t $CO_2$ emitted in its transportation and 50 t $CO_2$ emitted in its distribution, then 350 t $CO_2$ must be subtracted from the previously calculated CDR to yield a $CDR_{net}$ value. An example of the effect of the $LCA_{emiss}$ on the CDR calculation is shown in Calc5 1750 in FIG. 17.

While the preceding describes the calculation of $CDR_{net}$ that can be achieved for a given addition of alkalinity, for example $Mg(OH)_2$, to a water body, the rate at which the alkalinity can be added to a volume of water can be limited by the chemical or physical effects of such addition such that the effects do not exceed desired or permitted limits. For example, if the alkalinity is to be added to $10^7$ L of well-mixed, air-equilibrated seawater per day, a maximum of about 17 tonnes of $Mg(OH)_2$ per day can be added to that volume so as to keep pH at or below a desired pH of 9. This limit is shown by the vertical line 1780 in FIG. 17.

Figure 41:
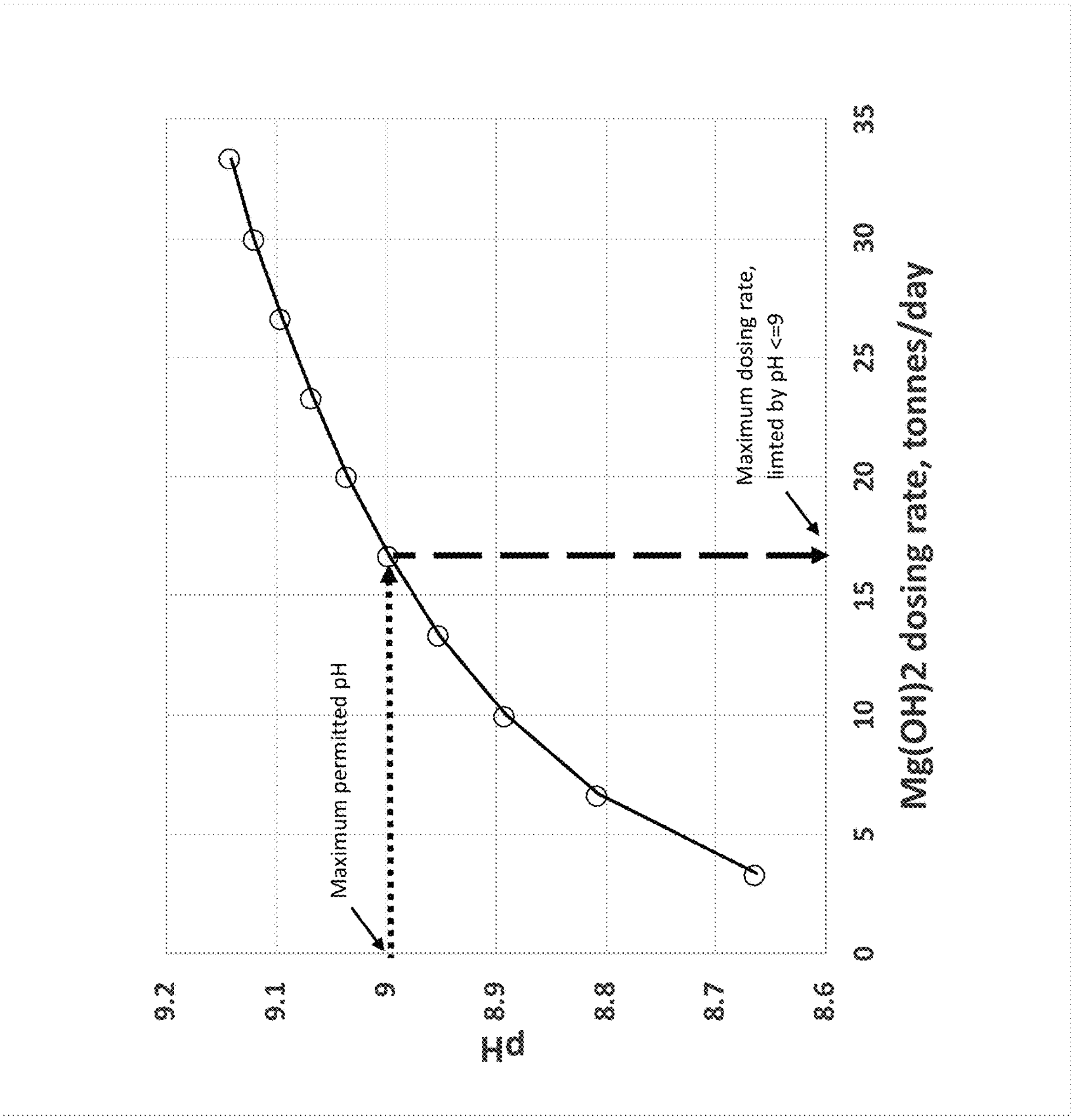
FIG. 41 relates pH to dosing rate.

The effect of dosing rate on pH and vice versa in the above noted example is shown in FIG. 41. As seen from FIG. 41, if pH is equal to pH=9, the dosing rate of alkalinity addition is about 17 tonnes/day.

Similarly, other physical or chemical limits such as total suspended solids (TSS) may further limit the dosing rate below that allowed by pH. Increasing the volume of water per day into which alkalinity is added provides further dilution of the alkalinity added, decreasing the effects on chemical or physical parameters, thus allowing greater alkalinity addition rates than in the case of the treatment of smaller volumes of water.

The dosing station 340 has been exploited in two modes of operation. In the first mode of operation of the dosing station 340, to be referred to as "inverse" mode of operation, we set a target CDR (for example, set by governmental or environmental authorities), and then determine a corresponding amount of alkalinity to be added to the body of water to achieve the target CDR, according to the models 1720, 1730, 1740 and 1750 of FIG. 17.

The target CDR may be further limited to a permissible target CDR under limitations imposed by water sensor measurements 1110, 1120, 1130, as shown by the vertical line 1780 in FIG. 17, which accordingly limit the amount of the added alkalinity.

Thus, in the first mode of operation, we solve a so called "inverse" problem of how much alkalinity needs to be added (which is not known upfront) to achieve the target CDR.

Figure 42:
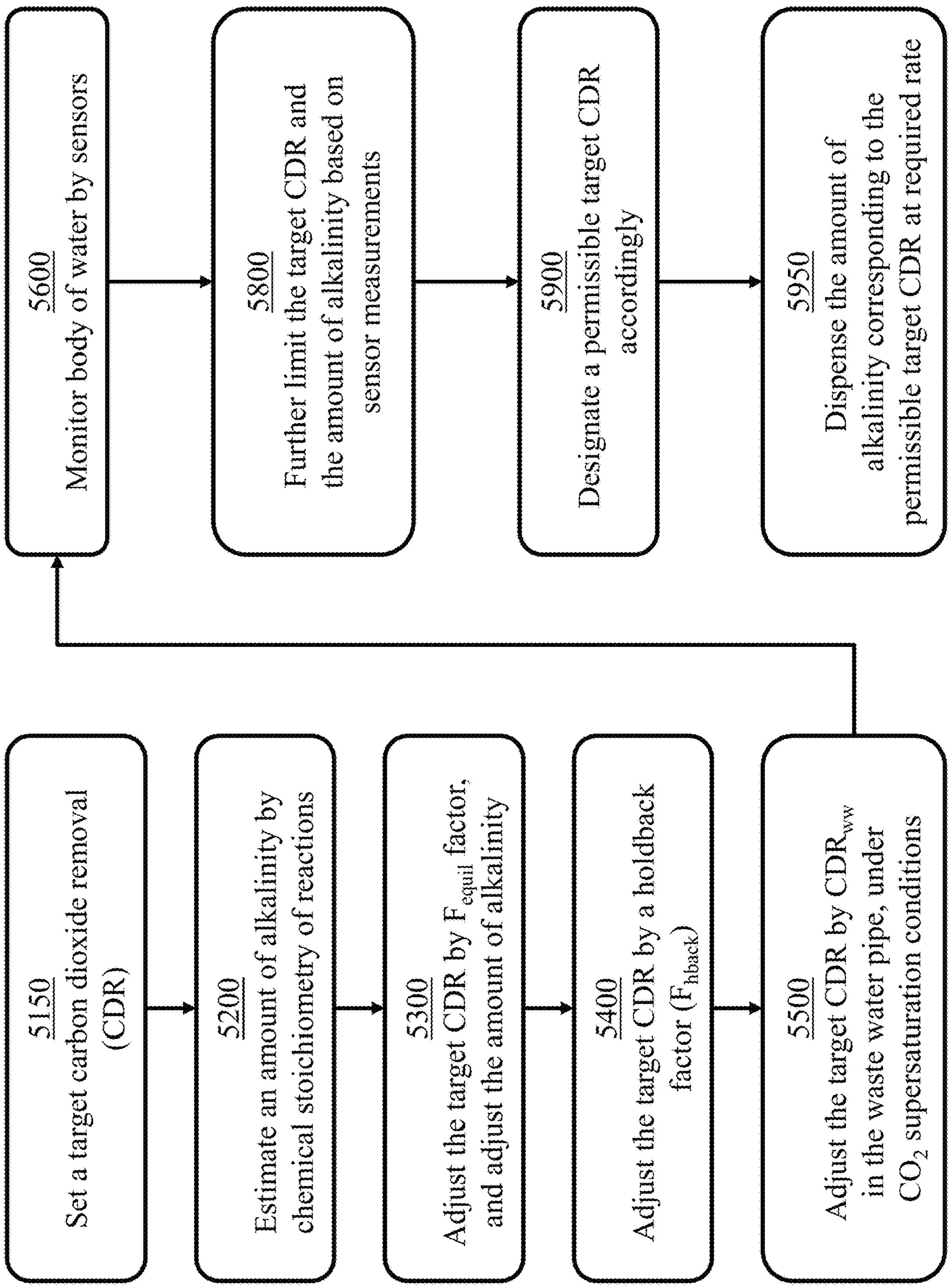
FIG. 42 illustrates a direct mode of operation of the dosing station 340.

The first mode of operation of the dosing station 340 is illustrated in more detail in the flow-chart 5000 of FIG. 42.

Upon Start, a target CDR is set (box 5150), followed by estimating an amount of alkalinity to be dispensed to the body of water for achieving the target CDR, according to chemical stoichiometry of carbon dioxide reaction with $CO_2$-reactive alkalinity (box 5200). Then the procedure 5000 adjusts the target CDR by taking into account a $F_{equil}$ factor, indicating a fraction of alkalized water that has equilibrated with air, thus determining an adjusted target CDR and an adjusted amount of $CO_2$-reactive alkalinity (step 5300). Further, the procedure 5000 further adjusts the adjusted CDR and the adjusted amount of $CO_2$-reactive alkalinity by taking into account a holdback $F_{hback}$ factor, indicating uncertainty of the adjusted target CDR (box 5400). Then, the procedure 5000 yet further adjusts the CDR and the amount of alkalinity from the step 5400 by taking into account $CDR_{ww}$ achieved within the waste water pipe prior to discharge to said body of water, wherein $CDR_{ww}$ is determined under assumption of $CO_2$ supersaturation in the alkalinity discharge waste water (box 5500). The procedure keeps monitoring the body of water by sensors (box 5600), and limit the rate at which the alkalinity is added to the water body and hence the rate at which the adjusted target CDR is achieve so as to ensure sensor measurements are within predetermined limits (box 5800), thereby determining a permissible target CDR that can be achieved in a given time span (box 5900). The procedure 5000 sends instructions to the processor 1410 to cause the dispenser 700 to dispense the amount of alkalinity determined in the step 5800 in the body of water at a required rate that is determined by sensor measurements (box 5950).

In the second mode of operation of the dosing station 340, to be referred to as a "direct" mode of operation, we keep dispensing alkalinity to the body of water, and calculate corresponding CDR achieved during each dispensing cycle according to the models 1720, 1730, 1740 and 1750 of FIG. 17. We also calculate a cumulative amount of added alkalinity after a number of dispensing cycles, and a corresponding cumulative CDR, and terminate the method when a predetermined target amount of alkalinity has been added, and/or when additionally a target amount of CDR has been achieved.

Figure 43:
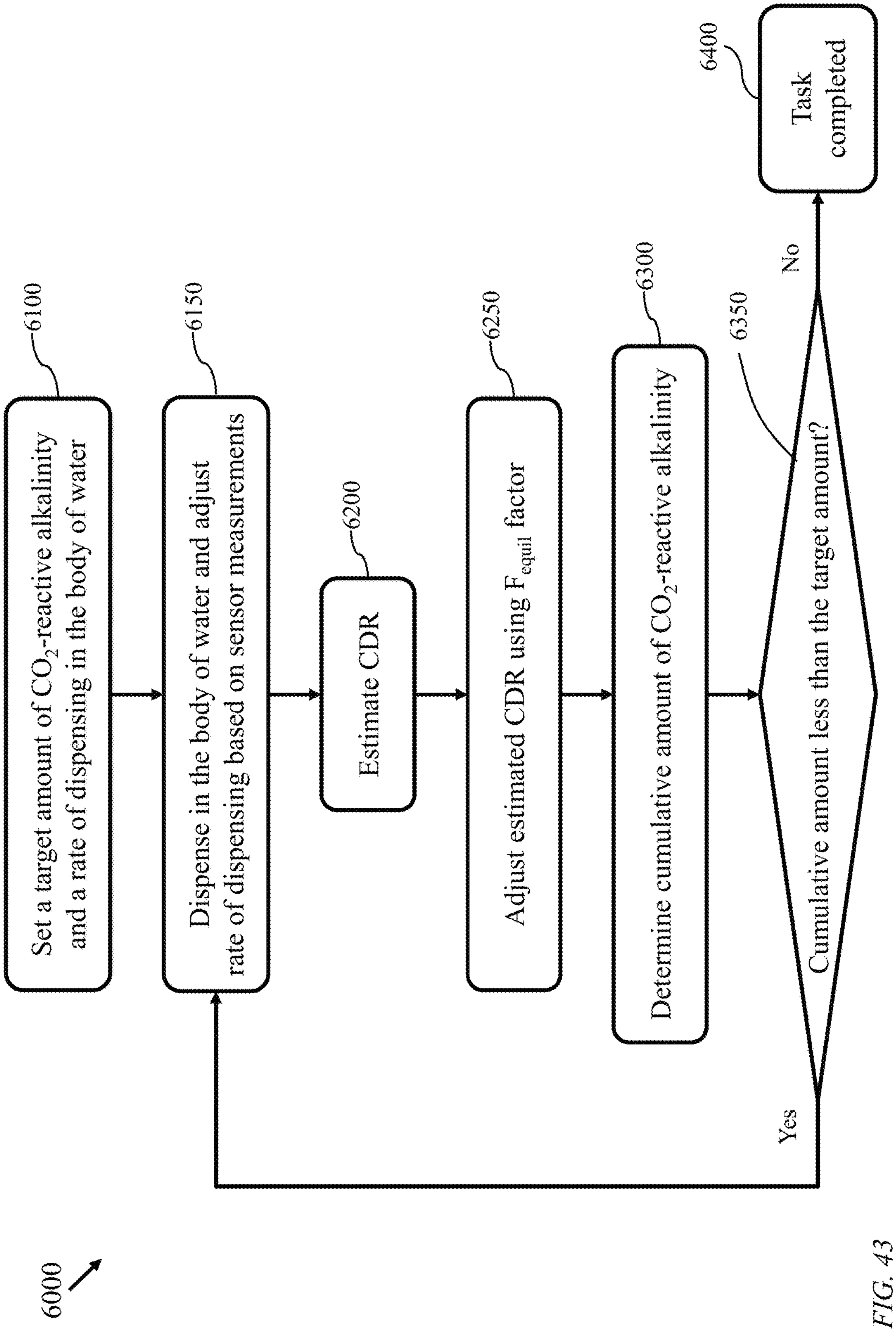
FIG. 43 illustrates an inverse mode of operation of the dosing station 340.

The second mode of operation of the dosing station 340 is illustrated in more detail in flow-chart 6000 of FIG. 43.

Upon start, the procedure 6000 sets an amount of $CO_2$-reactive alkalinity to be added to the body of water, and a rate of dispensing of the amount to the body of water, the amount of $CO_2$-reactive alkalinity being less than the target amount (box 6100). Then the procedure 6000 causes the processor 1410 to dispense the amount of the $CO_2$-reactive alkalinity in the body of water at the rate of dispensing, and during the dispensing, monitoring the body of water by one or more sensors, and adjusting the rate of dispensing so as to ensure measurements of said one or more sensors are within respective predetermined limits (box 6150). Further, the procedure 6000 causes the processor 1410 to estimate the CDR achieved by the dispensed amount of $CO_2$-reactive alkalinity, according to a chemical stoichiometry of carbon dioxide reaction with the $CO_2$-reactive alkalinity (box 6200), further followed by adjusting the estimated CDR by taking into account a $F_{equil}$ factor, indicating a fraction of alkalized, $CO_2$-depleted water that has equilibrated with air, thus determining an adjusted CDR (box 6250). Also the procedure 6000 keeps track of a cumulative amount of the $CO_2$-reactive alkalinity that has been added to the body of water (box 6300), and if the cumulative amount of alkalinity is less than a predetermined target amount of alkalinity to be dispensed to the body of water (exit No from box 6350), the procedure 6000 returns back to the step 6100, thereby repeating the procedure for the next amount of added alkalinity, until the target amount of alkalinity has been dispensed (exit Yes from box 6350), followed by termination of the procedure (box 6400).

Alkalinity Selection Process

For a given alkalinity discharge site it is necessary to identify and characterize one or more sources of alkalinity that are safe and cost-effective to use. Specifically, it is necessary to determine the potential CDR performance of a given source, the economic and environmental desirability of that use and the size or capacity of source. This evaluation begins by obtaining representative samples of various alkalinity sources and characterizing the particle size distribution, moisture content and elemental and chemical constituents present in the material. Those materials thus identified as having sufficient alkalinity are further tests by submerging each in a volume of water or seawater (e.g. 30 mg/L) where increases in solution pH, total dissolved inorganic carbon (DIC) and/or dissolved alkalinity over time are measured. This then provides a measure of expected potential CDR once released into a body of water like the ocean. Especially, this measures the ratio of potential CDR/t (dry or wet weight) alkaline material added (the OAE Ratio). Together with the increase in pH, DIC and/or alkalinity measured, the releases of other dissolved elements or compounds accompanying dissolved alkalinity (such as trace metals, chlorine, sulfur or organic compounds, etc.) release are also measured so as to predict any undesirable chemical effects to the body of water into which the alkalinity is to be released and to thus determine the rate at which the alkaline material can be desirably and safely added to the body of water. Where discharges to a body of water are regulated by a maximum allowable concentration of one or more elements or compounds, the preceding concentrations experimentally released per mass of alkalinity added to a given volume of freshwater or seawater can be used to determine the maximum alkalinity dosing rate allowed to a body of water so as not to exceed permitted element or compound concentrations in the receiving water body.

Figure 21:
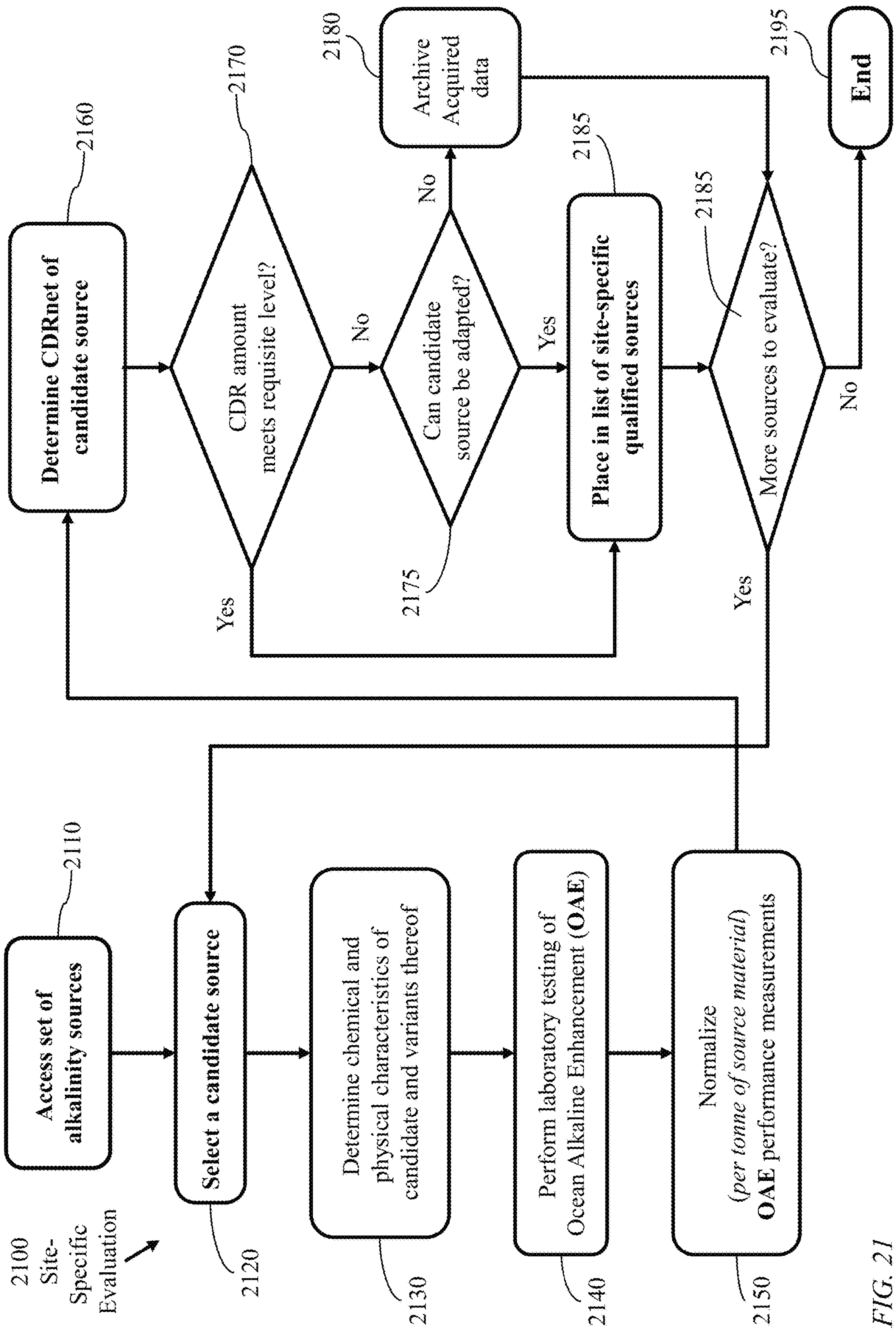
FIG. 21 illustrates a method of site-specific evaluation of CDR processes using different alkaline substances for populating the master macro-level decision table of FIG. 15, in accordance with an embodiment of the present invention.

FIG. 21 illustrates the alkalinity selection method. In particular, FIG. 21 illustrates a method 2100 of site-specific estimation of realizable CDR (carbon-dioxide removal) amounts for different alkaline substances. The results are used to populate the master macro-level decision table of FIG. 15.

Process 2110 accesses information relevant to designated sources of alkalinity. Process 2120 selects a candidate source. Process 2130 determines chemical and physical characteristics of the candidate source and of variations of the candidate source, if any. Process 2140 performs laboratory testing of potential Ocean Alkaline enhancement (OAE). Process 210 normalizes OAE measurements. Process 2160 determines realizable CDR ($CDR_{net}$) of the candidate alkalinity source. Process 2170 determines whether $CDR_{net}$ meets an acceptable level. If $CDR_{net}$ is acceptable, an identifier of the candidate alkalinity source is entered in a list of site-specific qualified sources. If $CDR_{net}$ is not acceptable, an attempt is made to adapt the candidate source to meet the acceptable level. If adaptation is feasible, an identifier of the candidate alkalinity source together with a description of an adaptation action are entered in the list of site-specific qualified sources. If adaptation is not feasible, an identifier of the candidate alkalinity source is archived for further follow-up if needed.

If further alkalinity resources may be considered, process 2185 revisits process 2120 resulting in activating processes 2130 to 2185. Otherwise, the site-specific evaluation is considered to be complete.

Alkalinity Dosing Station

For the present embodiment, the process of adding or dosing alkalinity at a specific rate to the wastewater stream or any discharge to the ocean is done using a Dosing Station 340 of FIG. 5. The Dosing Station 340 has a large container, or reservoir 520, containing a slurry of dissolved and particulate $Mg(OH)_2$ and a dosing pump. Importantly, the dosing rate of the pump is controlled by downstream chemical measurements to ensure the alkalinity addition does not violate the chemical concentrations desired or permitted in the wastewater or the receiving body of water. Accordingly, one or more chemical measurements made within the pipe, described below, are used to control the dosing rate either manually or by computer via electronic feedback loops.

The dosing station 340 has a controller 540 (shown in more detail in FIG. 14) having a hardware processor 1410, memory devices 1450, 1460, 1470 and 1480 storing computer executable instructions for execution by the processor 1410, to control the dosing station 340 in accordance with computational models of FIG. 17, as will be described in more detail below.

Such chemical measurements include, but are not limited to:

- Temperature (T), salinity (S) and pressure (depth)—Routinely directly measured, spot or continuously using a conductivity, temperature and depth (CTD) sensor, which are required for determining chemical conditions and carbon system concentrations.
- pH—Routinely directly measured, spot or continuously. When measured alongside either $pCO_2$, dissolve inorganic carbon (DIC), or total alkalinity (TA), all four parameters can be estimated. Also, pH is commonly measured to ensure permitted wastewater levels are not violated. As discussed later, seawater pH is also needed to calculate ocean carbon removal.
- $pCO_2$—The partial pressure of $CO_2$, $pCO_2$, is spot or continuously directly measured with specialized sensors, or via water sampling and analysis. It can also be calculated from any pair of directly measured: pH, DIC, TA when temperature, salinity and pressure are known. This parameter is needed for determining seawater $CO_2$ partial pressure relative to air and hence air-sea $CO_2$ flux rate. As discussed later, reduction of $pCO_2$ in a closed system (no equilibration with air) such as in a wastewater pipe via alkalinity addition provides a direct measure of $CDR_{ww}$. Units: µatm or ppm.
- TSS—total suspended solids, determined by filtration of water samples or via calibrated transmissometer or other device that can sense changes in particle concentration in the wastewater discharge. Elevations above background provide a measure of undissolved $Mg(OH)_2$. Units: mg/L.
- $NH_3$—Ammonia concentration in a gas, such as air that is equilibrated with the wastewater stream can be determined by an ammonia gas sensor that is positioned in the gas headspace above the wastewater. Elevations in $NH_3$ concentration above a desired maximum level can then be used to reduce $Mg(OH)_2$ delivery (reduce pH) that effects $NH_3$ concentration.
- DIC—total dissolved inorganic carbon ($HCO_3^-$+$CO_3^{2-}$+$CO_2$) concentration can be directly measured via laboratory analysis of water samples (effluent or seawater), typically with high precision (≤0.2% uncertainty). DIC can also be less precisely calculated using any 2 of the following 3 core parameters pH, $pCO_2$ and total alkalinity when temperature, salinity and pressure are known. Units: µM or µmoles/kg of solution.
- TA—total alkalinity concentration is a measure of a solution's ability to neutralize acid, and, when unequilibrated with air, the solution's ability to absorb and store $CO_2$. It is most precisely measured by laboratory analysis of water samples (effluent or seawater). Like DIC, TA can be less precisely calculated from any 2 of the following three parameters: pH, $pCO_2$, DIC. Elevation above background provides a direct measure of the degree of ocean alkalization, but not necessarily CDR. Units: µM or µmoles/kg of solution.

Using the preceding measurements alone to control dosing rate requires that any other elemental or chemical concentration released by the alkaline material used stays within its permitted level at the dosing rate allowed by those chemical parameters being monitored. Whether or not the concentration maxima of these unmonitored chemical constituents are violated can be determined from elemental or chemical releases per unit mass of alkaline material determined during the Alkalinity Selection activity (above). For example, if a total aluminum concentration is not to exceed 3 mg/L and Alkalinity Selection testing shows that an alkaline material releases 300 mg $L^{-1}$ $g^{-1}$ $hr^{-1}$, then the dosing rate of the material must not exceed 0.01 g $L^{-1}$ $hr^{-1}$ regardless of if higher rates of dosing are allowed by the chemical parameters being monitored during dosing.

Figure 22:
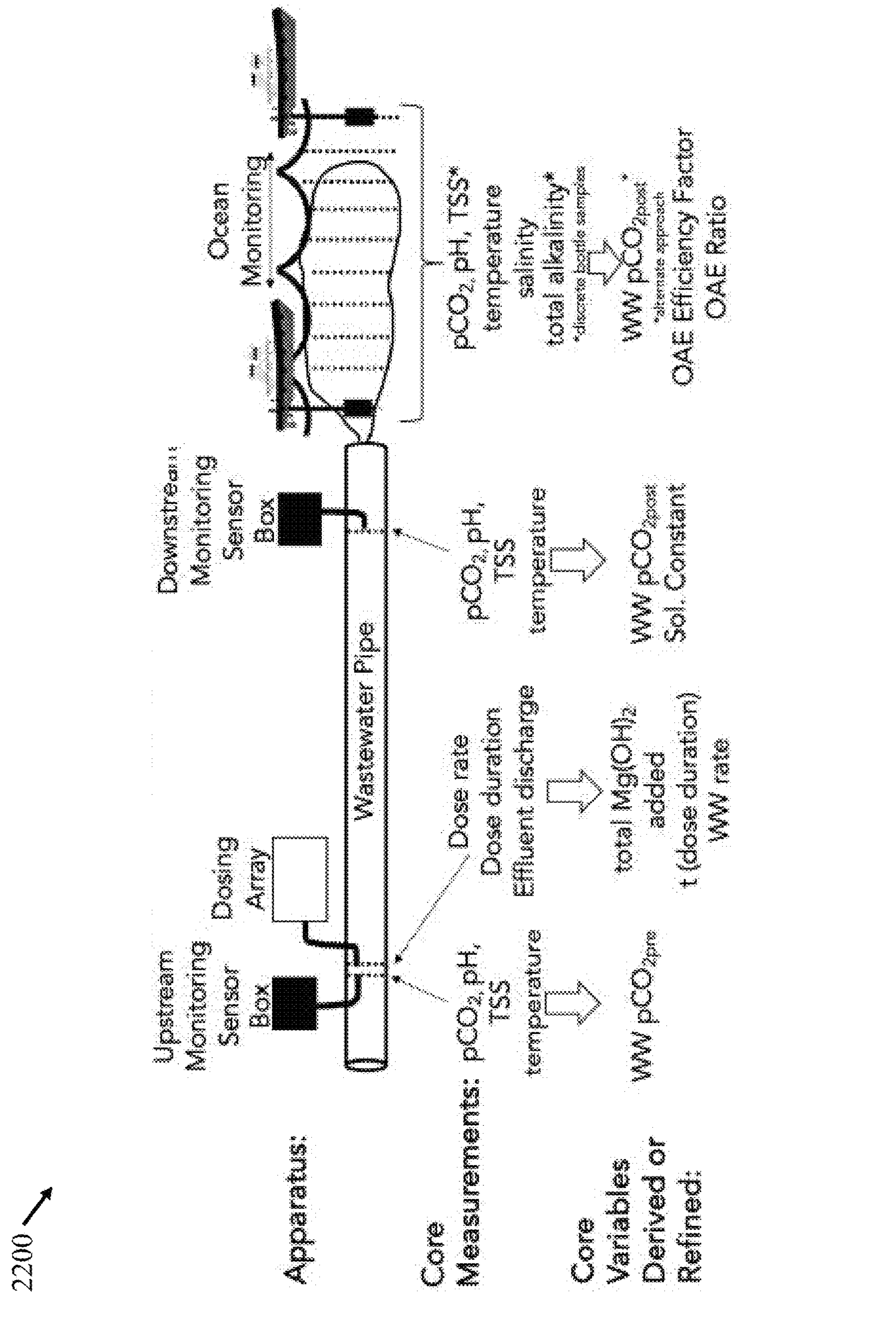
FIG. 22 illustrates an end-to-end system having a waste-water pipe discharged into the ocean, and associated parameters used to measure chemical effects of alkalinity addition and to control dosing of the added alkalinity, in accordance with an embodiment of the present invention.

FIG. 22 illustrates an end-to-end system having a wastewater pipe discharged into the ocean, and associated parameters used to measure chemical effects of alkalinity addition and to control dosing of the added alkalinity.

In FIG. 22, pH, TSS and/or $NH_3$ (not shown) sensors can be positioned in or above the wastewater stream at some point downstream of the point of alkalinity addition. If these sensors detect a chemical concentration that exceeds a predetermined, undesirable level, a signal is sent to the alkalinity dosing pump controller to reduce or stop the flow of $Mg(OH)_2$ into the wastewater. Conversely, if one or more of the sensors detect a reduction in concentration below a pre-set level, for example below an undesirable level, a signal is sent to the alkalinity pump controller to commence pumping or increase pumping rate. This way, the addition rate of $Mg(OH)_2$ to the wastewater is controlled so as to maximize alkalinity delivery while avoiding undesirable chemical conditions.

Furthermore, by also positioning one or more chemical sensors upstream of the alkalinity dosing point, the difference in downstream minus upstream chemistry provides direct measurement and quantification of the absolute chemistry change effected by the dosing at the point in the pipe where downstream chemical sensors are present. These differences can then be used to measure the quantity of an element or compound that has been added to that downstream measurement point in the pipe.

Figure 23:
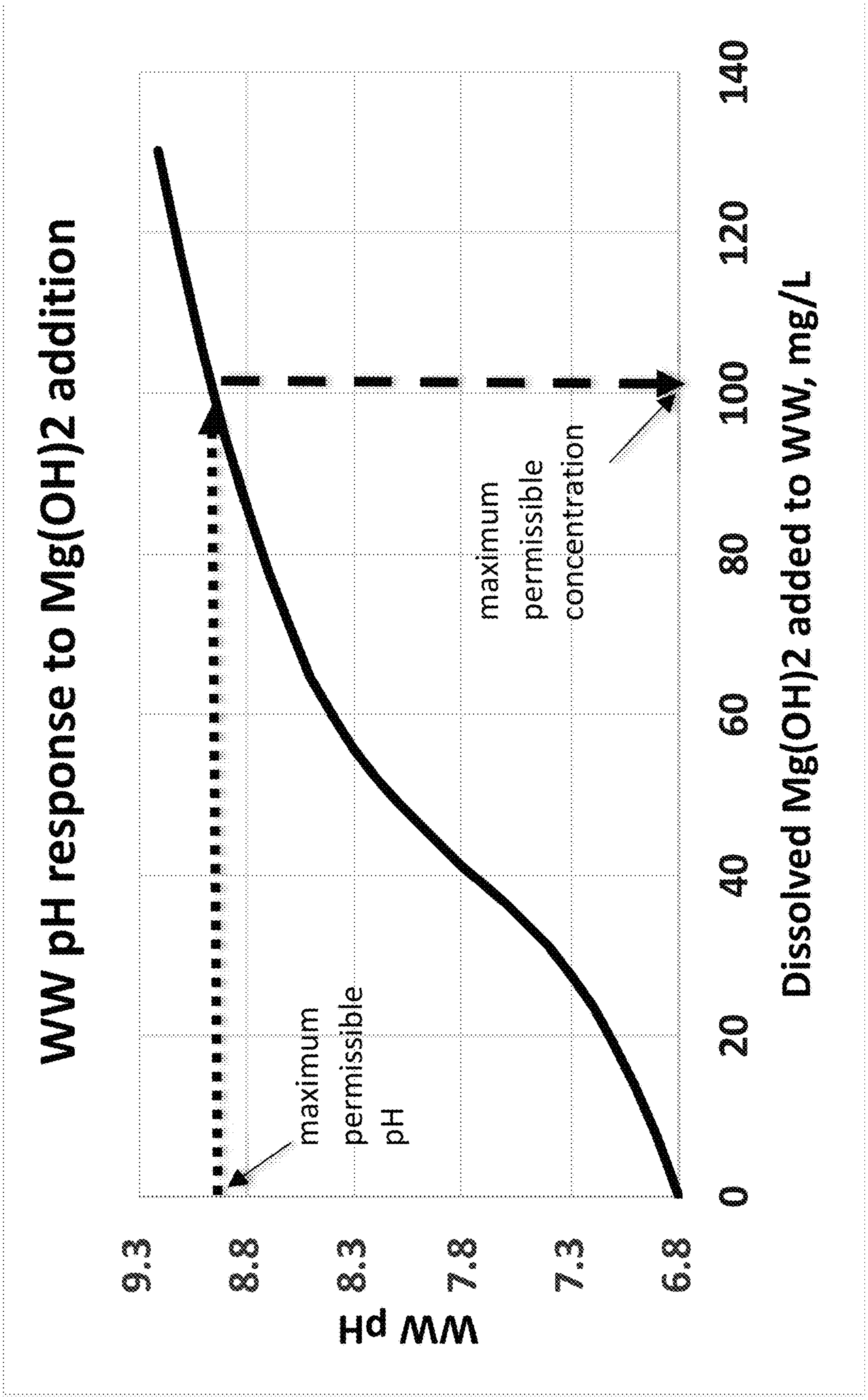
FIG. 23 illustrates variation of waste-water pH with dissolved alkaline substance added to the waste water, for use in an embodiment of the present invention.
Figure 24:
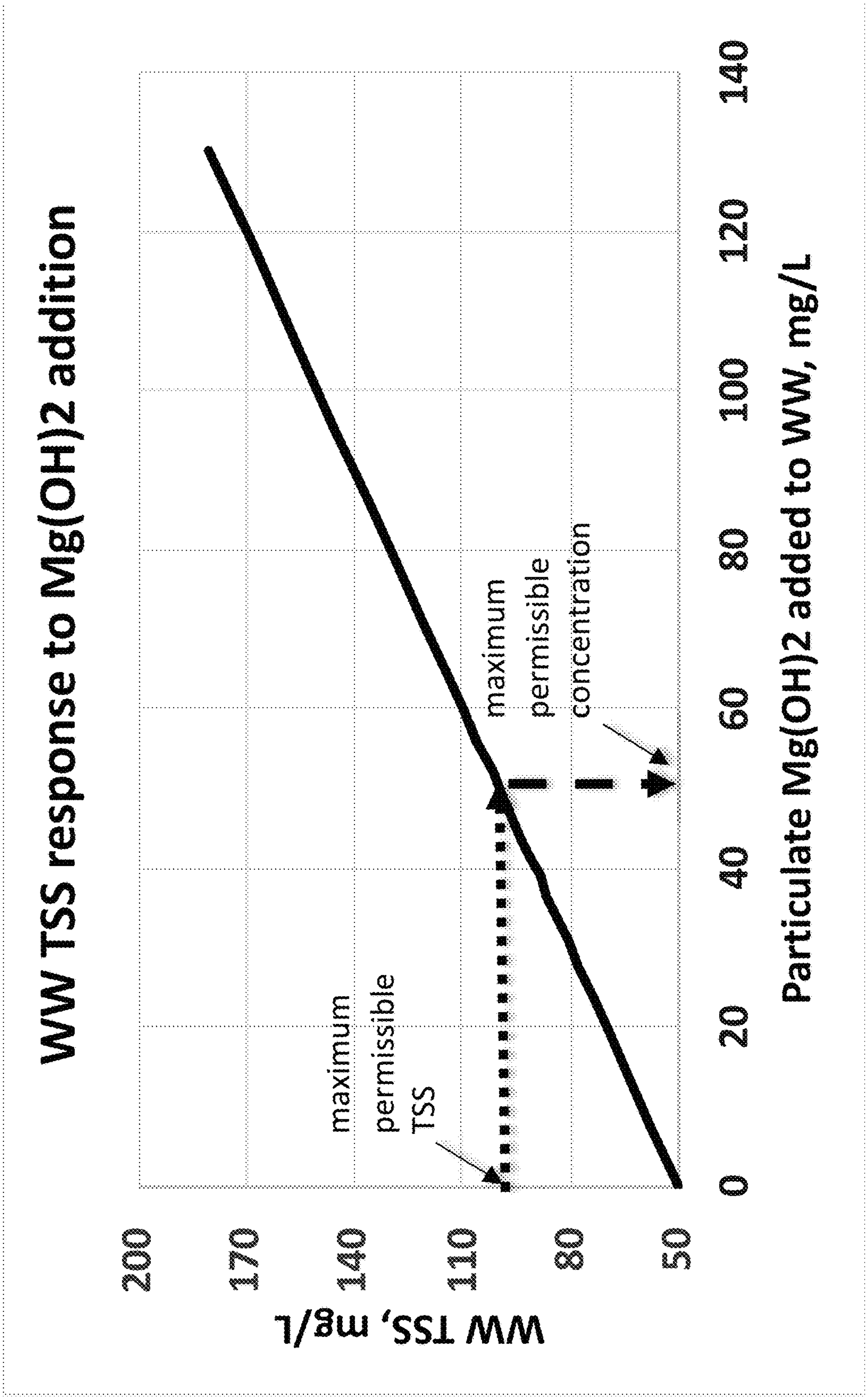
FIG. 24 illustrates variation of relative weight (grams per litre) of total suspended solids (TSS) with relative weight of particulate alkaline substance, for use in an embodiment of the present invention.
Figure 25:
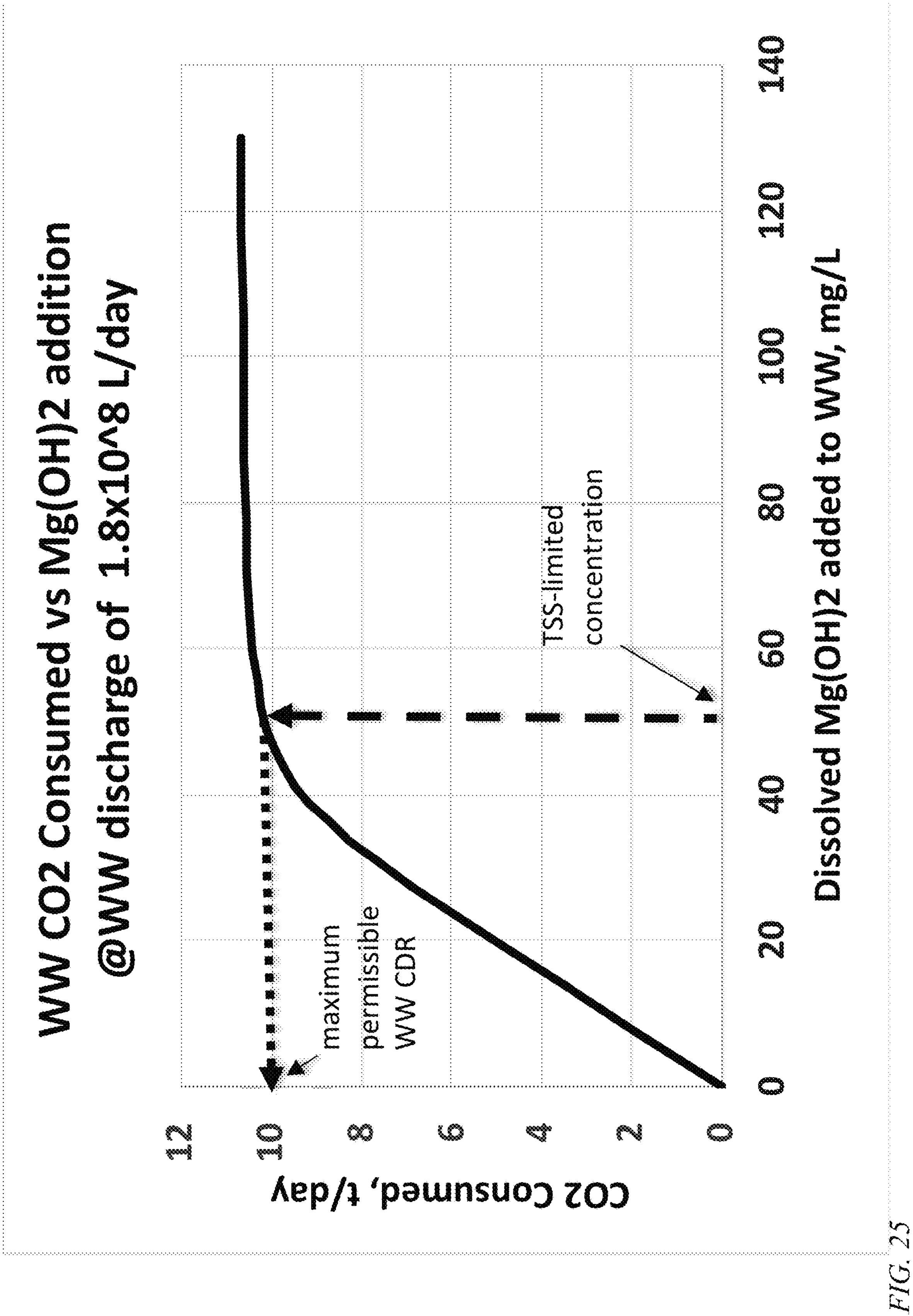
FIG. 25 illustrates variation of rate of consumption of Co2 with dissolved alkaline substance added to the waste water, for use in an embodiment of the present invention.

For example, a wastewater discharge with an upstream alkalinity of 8 mM, a $pCO_2$ of 38,000 uatms, a pH of 6.8 and a TSS of 50 mg/L, the downstream response of pH, TSS and $CO_2$ removal to the addition of dissolved or particulate $Mg(OH)_2$ is shown in FIG. 23, FIG. 24, and FIG. 25, respectively. Namely, FIG. 23 shows a graph 40*a* illustrating a response of pH to the addition of dissolved or particulate $Mg(OH)_2$; FIG. 24 shows a graph illustrating a response of total suspended solids (TSS) to the addition of dissolved or particulate $Mg(OH)_2$; and FIG. 25 shows a graph 40*c* illustrating a response of $CO_2$ removal to the addition of dissolved or particulate $Mg(OH)_2$.

FIG. 23, FIG. 24, and FIG. 25 illustrate response of wastewater pH, TSS and CDR to Mg(OH)2 concentration in wastewater under respective conditions. Limits to pH, TSS and thus Mg(OH)2 concentration and wastewater CDR are described in the specification.

FIG. 23 illustrates variation of waste-water pH with dissolved alkaline substance added to the wastewater.

FIG. 24 illustrates variation of relative concentration (grams per litre) of total suspended solids (TSS) with relative concentration of particulate alkaline substance.

FIG. 25 illustrates variation of rate of consumption of $CO_2$ with dissolved alkaline substance added to the wastewater.

FIG. 23, FIG. 24, and FIG. 25 assume a maximum permissible pH of 9, a maximum dissolved $Mg(OH)_2$ dosing rate of about 100 mg/L of wastewater. On the other hand, assuming a maximum allowable TSS of 100 mg/L, an allowable addition of particulate $Mg(OH)_2$ of only 50 mg/L of wastewater is indicated.

Thus, in the example of FIG. 23, FIG. 24, and FIG. 25, particulate $Mg(OH)_2$ dosing is controlled by TSS at the delivery rate of 50 mg/L of wastewater. The actual rate of dosing in grams/minute is then adjusted to stay below a TSS less than or equal to 50 mg/L of wastewater. The preceding assumes that the dosing is then not further limited by the concentration of elements or compounds released from the alkalinity added, as identified in the Alkalinity Selection activity (above).

Assuming a constant wastewater flow rate of $1.8\times10^8$ L/day, the quantity of $CO_2$ removed from the wastewater as a function of dissolved $Mg(OH)_2$ added to the above wastewater stream is shown in FIG. 25. If the allowable addition of $Mg(OH)_2$ is limited by TSS to 50 mg/L of wastewater, then a maximum $CO_2$ removal rate would be about 10 tonnes $CO_2$/day. FIG. 25 also shows that higher rates of $Mg(OH)_2$ addition would not yield significantly greater wastewater $CO_2$ removal because all $CO_2$ has been removed with an addition of about 50 mg $Mg(OH)_2$/L or more in this example. However, as previously discussed discharging excess $Mg(OH)_2$ or other $CO_2$-reactive alkalinity here can still effect CDR once the excess alkalinity reaches the surface ocean or other water body, in turn creating $CO_2$ undersaturation and either reducing emissions from or producing an air sink in the water body.

Figure 26:
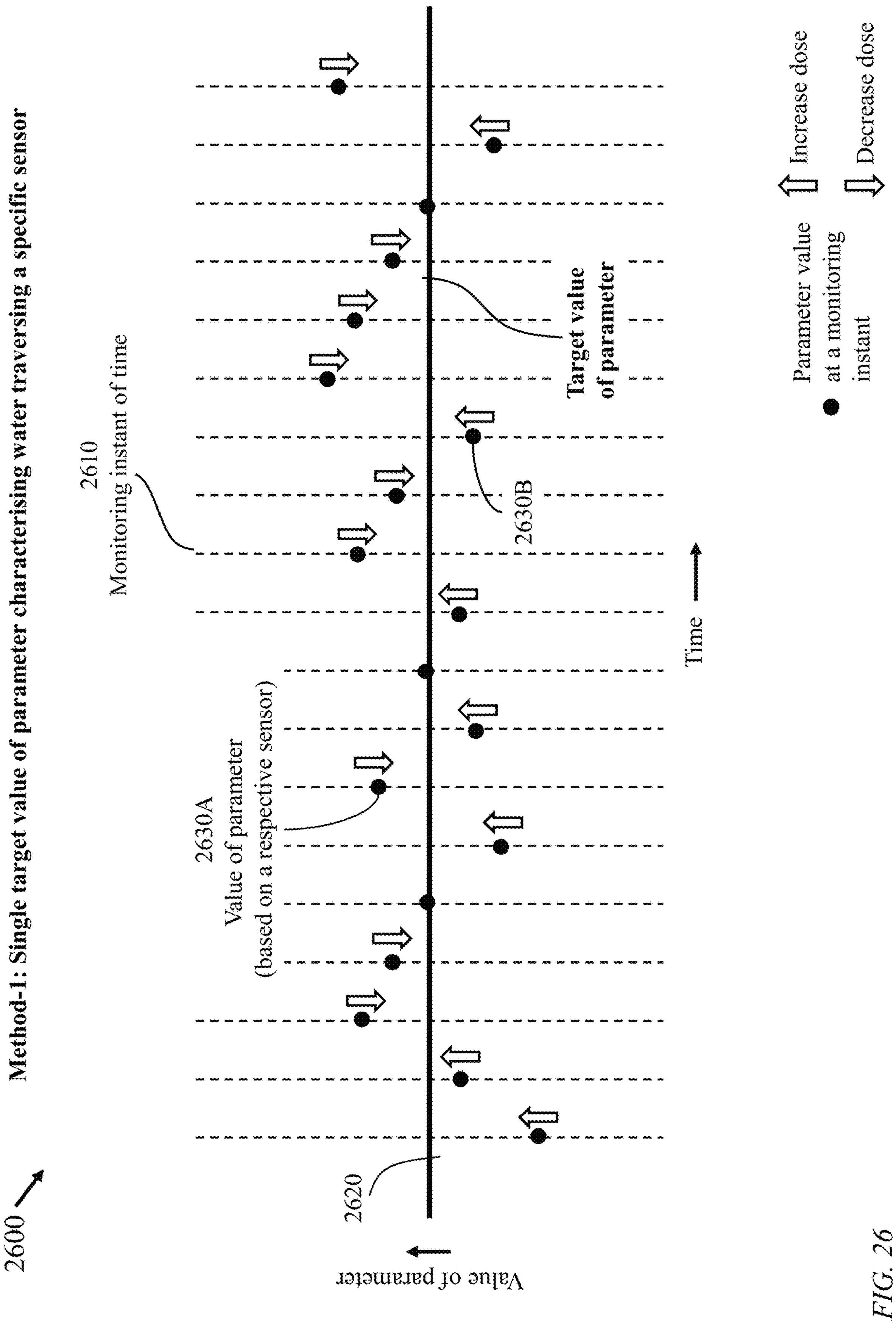
FIG. 26 illustrates a criterion of dosing control based on adhering to a single reference value of each designated parameter.

FIG. 26 illustrates a first criterion 2600 of dosing control based on adhering to a single reference value 2620 of each designated processed-water parameter (or a vector of parameters). The processed water is monitored at instants 2610 where sensors' signals are acquired and processed at a controller. The value 2630 of a tracked parameter, based on sensors' input, is recorded. In FIG. 26, reference 2630A corresponds to a value of the parameter above the reference value 2620 while reference 2630B corresponds to a value of the parameter below the reference value 2620.

Figure 27:
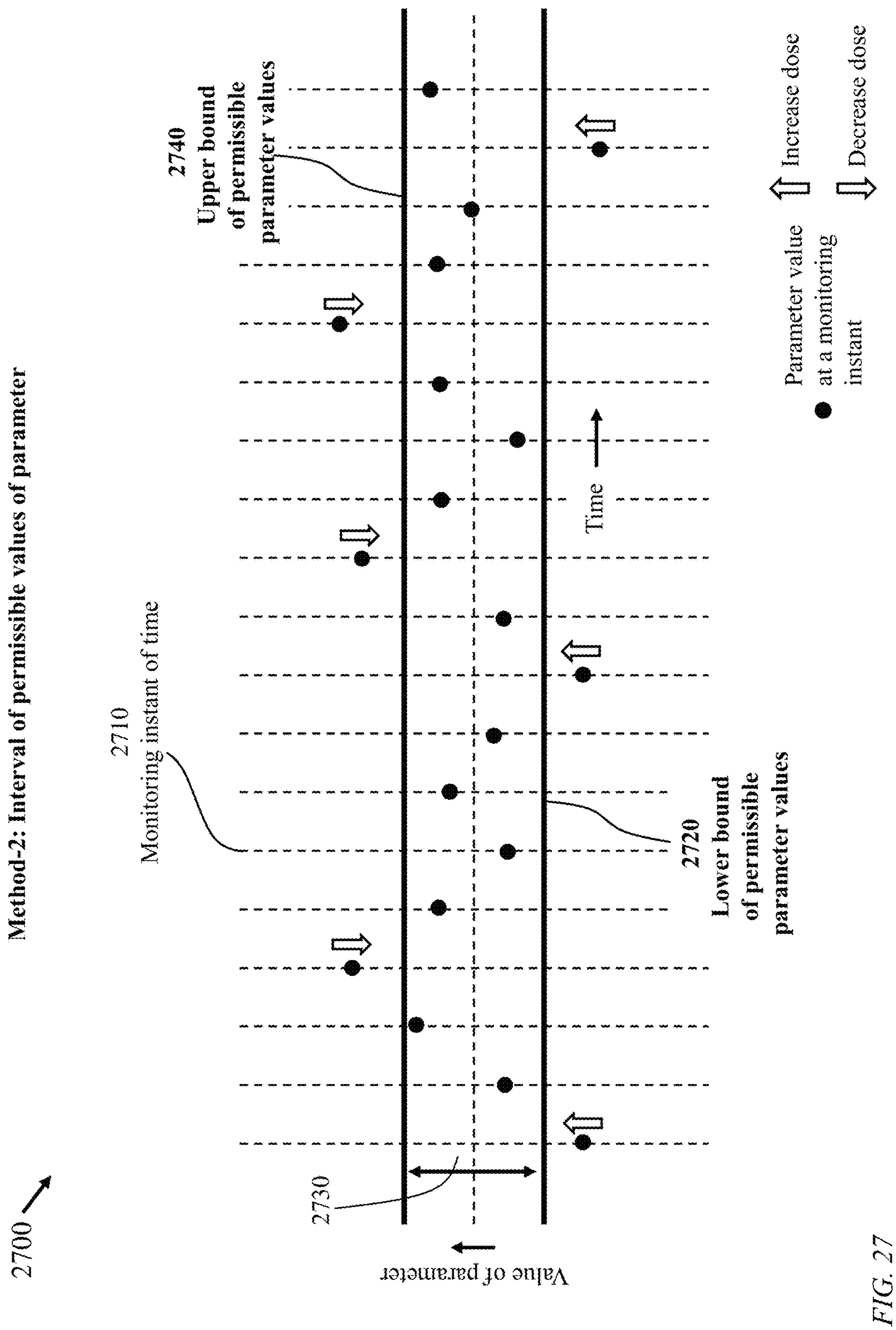
FIG. 27 illustrates a criterion of dosing control based on adhering to a reference interval of permissible values of each designated parameter, in accordance with an embodiment of the present invention.

FIG. 27 illustrates a second criterion 2700 of dosing control based on adhering to a reference interval 2730 of permissible values of each designated parameter. A prescribed lower bound 2720 of the reference interval and a prescribed upper bound 2740 of the reference interval are set based on applicable regulations. Selecting the width 2730 of the reference interval has significant implications regarding the rate of dose-amount changes.

According to the present invention, two embodiments regarding disciplines for controlling the rate of dosing are applicable to the aforementioned dosing station. According to a first embodiment, the amount of dosing is based on continuous sensing of the effect of dosing. According to the second embodiment, controlling the dosing rate is based on characterizing the raw water, which may vary over time, and continuously tracking dosing amounts over a moving time window. The dosing rate is then based on verified characterization of chemical reactions for each pair of {alkalinity-source type, raw water type}. The verified characterization may necessitate off-site experimentation which would rely on sensors. However, sensors would not be needed in actual field operations apart from further assurance of consistency of operation of the dosing station.

Figure 28:
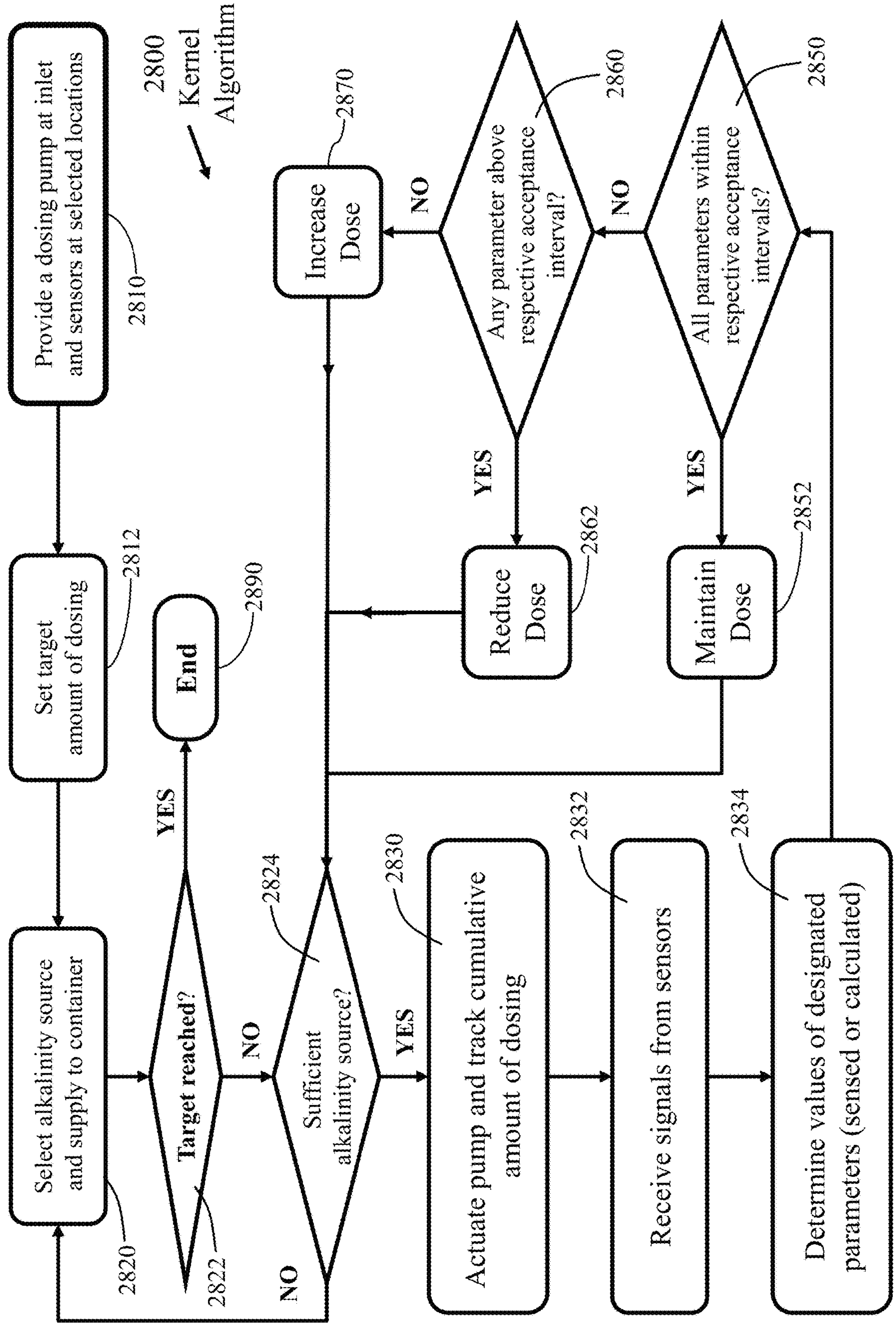
FIG. 28 illustrates the kernel algorithm of a discipline of dose-control based on the criterion of FIG. 27 (which degenerates to the criterion of FIG. 26 when the width of the reference interval is set to equal zero), in accordance with an embodiment of the present invention.

FIG. 28 illustrates the kernel algorithm 2800 of a discipline according to the first embodiment of dose control which is based on use of field sensors. The second criterion of FIG. 27 based on adhering to a reference interval of parameters is applied. Naturally, the second-criterion of FIG. 27 degenerates to the first criterion of FIG. 26 when the width of the reference interval is set to equal zero.

To start, a dosing pump and appropriate sensors are installed (process 2810). Process 2820 selects an alkalinity source to be supplied to a container. Process 2824 determines whether a sufficient amount of the alkalinity source is currently available. If a supply of the alkalinity source is needed, process 2820 is revisited. If the container has a sufficient amount, process 2830 actuates the pump and tracks the cumulative amount of released alkalinity substance. Process 2832 detects signals from relevant sensors and process 2834 determines values of relevant water parameters. Process 2850 determines whether all of the relevant parameters are within the reference interval 2730. If so, the current amount of the periodic dose need not be changed (reference 2852) and process 2824 is revisited. Otherwise, process 2860 determines whether any of the relevant parameters is above the reference interval 2730. If so, process 2862 is activated to reduce the dose according to the algorithm of FIG. 34 and process 2824 is revisited. If process 2860 determines that all of the relevant parameters are below the reference interval 2730, process 2870 is activated to increase the dose according to the algorithm of FIG. 34 and process 2824 is revisited.

Figure 29:
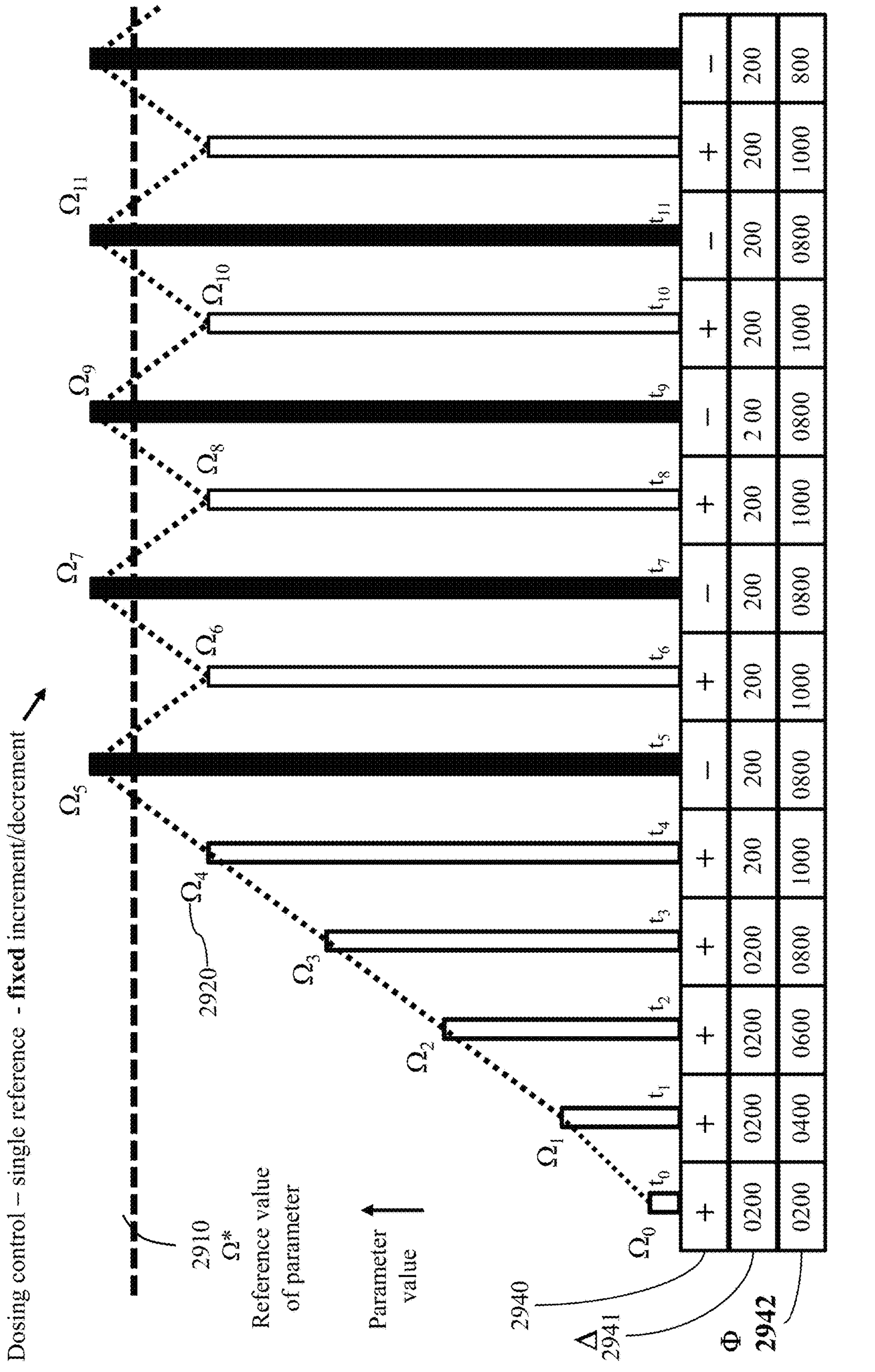
FIG. 29 illustrates an exemplary application of the kernel algorithm of FIG. 28 with a reference interval of zero width and constant magnitudes of dose increments and decrements.

FIG. 29 illustrates an exemplary application 2900 of the kernel algorithm of FIG. 28 with periodic dosing, a reference interval 2730, of a tracked parameter, of zero width, and with constant magnitudes of dose increments and decrements. With zero width of the reference interval, a single reference value 2910, of the parameter, denoted $\Omega^*$, of a given tracked parameter is selected. At each monitoring instant, a signal from a respective sensor is acquired and a controller determines a value 2920 of a corresponding parameter $\Omega j$, $j>0$. In the illustrated example, values of the parameter denoted $\{\Omega_0, \Omega_1, \Omega_{10}, \ldots\}$ are indicated. Following the algorithm of FIG. 28 with a constant magnitude, of $\beta$ units (arbitrary units), of dose changes (increment or decrement), yields the results tabulated at the bottom of the drawing including:

(i) an indication 2940 of type of change (with "+" indicating an increment and "−" indicating a decrement of a respective dose;

(ii) magnitude 2941, $\beta$, of an increment or a decrement ($\beta=200$ in the example of FIG. 20), and (iii) dose magnitude 2942 (same arbitrary units) after an increment or a decrement.

The doses are applied periodically, every D time units, and signals from a designated sensor are also acquired every D time units. As indicated in FIGS. 35-38, the duration D may be selected to be larger than, equal to, or less than advection delay, denoted $\delta$, between the point of application of the alkaline substance in a water medium and the location of the sensor under consideration. The instants of dose applications may be selected to coincide with instants of acquisition of the sensors signals. Preferably, $D\geq\delta$.

The value of the tracked parameter prior to applying the alkaline substance is denoted $\Omega_0$. A first dose of $\beta$ units is applied at time $t_0$. With the parameter equal to $\Omega_0$. At time $t_1$, $t_1=t_0+D$, a signal from the sensor is acquired and used to compute a corresponding value $\Omega_1$ of the parameter. Since, in the illustrated case, $\Omega_1<\Omega^*$, the dose applied at $t_1$ is increased to (D0+$\beta$), which is 400 units, according to process 2870. Likewise, the dose is increased at instants $t_2$, $t_3$, and $t_4$, leading to a dose of 1000 units at $t_4$. At time $t_5$, the signal from the sensor is processed and a corresponding value of the parameter, $\Omega_5$, is determined to be larger than $\Omega^*$. Thus, at instant $t_5$, the dose is decreased from its value of 1000 at $t_4$ to $(1000-\beta)=800$, according to process 2862. At instant $t_6$, the value $\Omega_6$ of the parameter is determined to be less than $\Omega^*$. Hence, the dose applied at $t_6$ is increased from its value at $t_5$ to $(800+\beta)=1000$, according to process 2870. The dose values continue to fluctuate and the corresponding values of the parameter continue to fluctuate around $\Omega^*$ until any of relevant conditions, such as changes in the composition of the raw water, causes the parameter values to drift before returning to fluctuate around $\Omega^*$.

Figure 30:
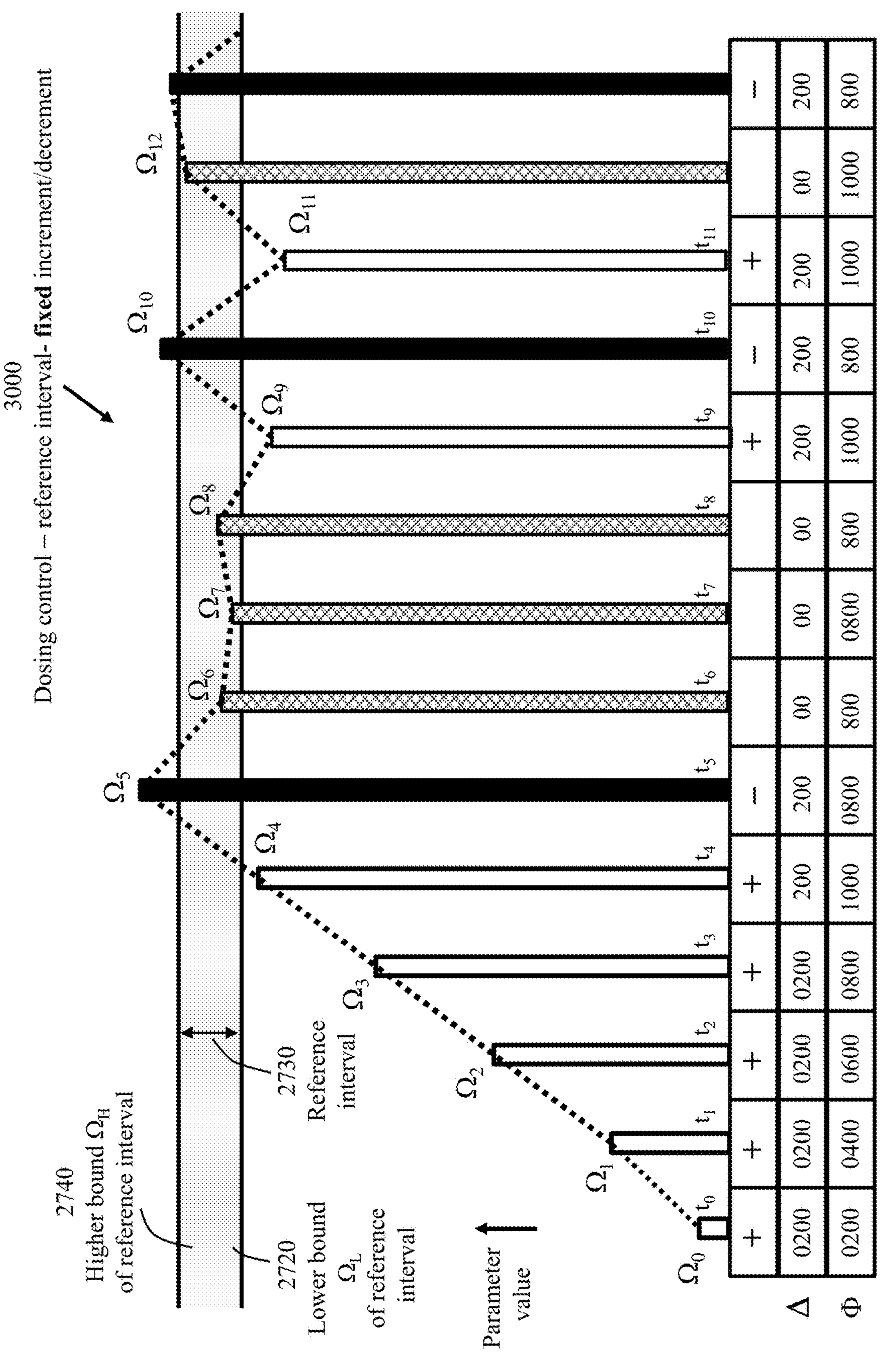
FIG. 30 illustrates an exemplary application of the kernel algorithm of FIG. 28 with a specified positive width of the reference interval and constant values of dose increments and decrements.

FIG. 30 illustrates an exemplary application 3000 of the kernel algorithm of FIG. 28 with a specified positive width of the reference interval 2730 of a tracked parameter and constant magnitudes of dose increments and decrements. The reference interval of the parameter is bounded between the lower bound 2720 (denoted $\Omega_L$) and the upper bound 2740 (denoted $\Omega_H$).

As in the case of FIG. 29, a first dose of $\beta$ units is applied at time $t_0$. With the parameter equal to $\Omega_0$. At time $t_1$, $t_1=t_0+D$, a signal from the sensor is acquired and used to compute a corresponding value $\Omega_1$ of the parameter. Since, in the illustrated case, $\Omega_1<\Omega_L$, the dose applied at $t_1$ is increased to $(D0+\alpha)$, which is 400 units, according to process 2870. Likewise, the dose is increased at instants $t_2$, $t_3$, and $t_4$, leading to a dose of 1000 units at $t_4$. At time $t_5$, the signal from the sensor is processed and a corresponding value of the parameter, $\Omega_5$, is determined to be larger than $\Omega_H$. Thus, at instant $t_5$, the dose is decreased from its value of 1000 at $t_4$ to $(1000-\beta)=800$, according to process 2862. At instant $t_6$, the value $\Omega_6$ of the parameter is determined to be within the reference interval 2730. Hence, the dose applied at $t_6$ remains unchanged from its value of 800 at $t_5$, according to process 2852. At instant $t_7$, the value $\Omega_7$ of the parameter is determined to be within the reference interval 2730. Hence, the dose applied at $t_7$ remains unchanged from its value of 800 at $t_6$, according to process 2852. Likewise, the dose applied at instant $t_8$ remains unchanged. The values of the parameter may remain within the reference interval for an extended period of time since the corresponding constant dose seems to be compatible with the composition of the raw water and the surrounding conditions. A major change of the raw water or atmospheric conditions may result in a different pattern of parameter-value fluctuations. An advantage of using an appropriate reference zone 2730 with a lower bound $\Omega_L$ and an upper bound $\Omega_H$ is a stabilized dose value.

Figure 31:
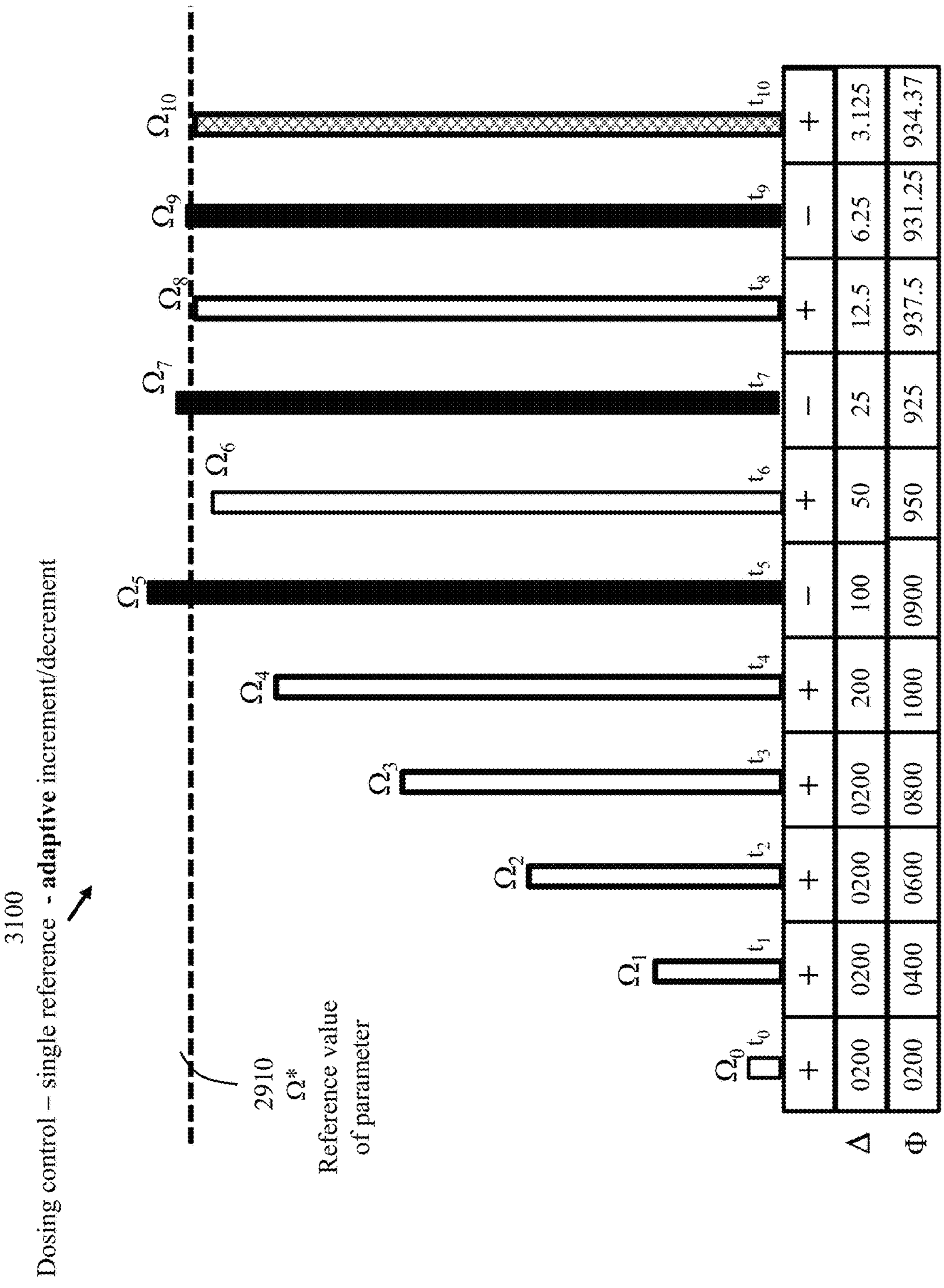
FIG. 31 illustrates an application of kernel algorithm, with the reference interval set to zero, and with adaptive magnitudes of dose increments and decrements.
Figure 33:
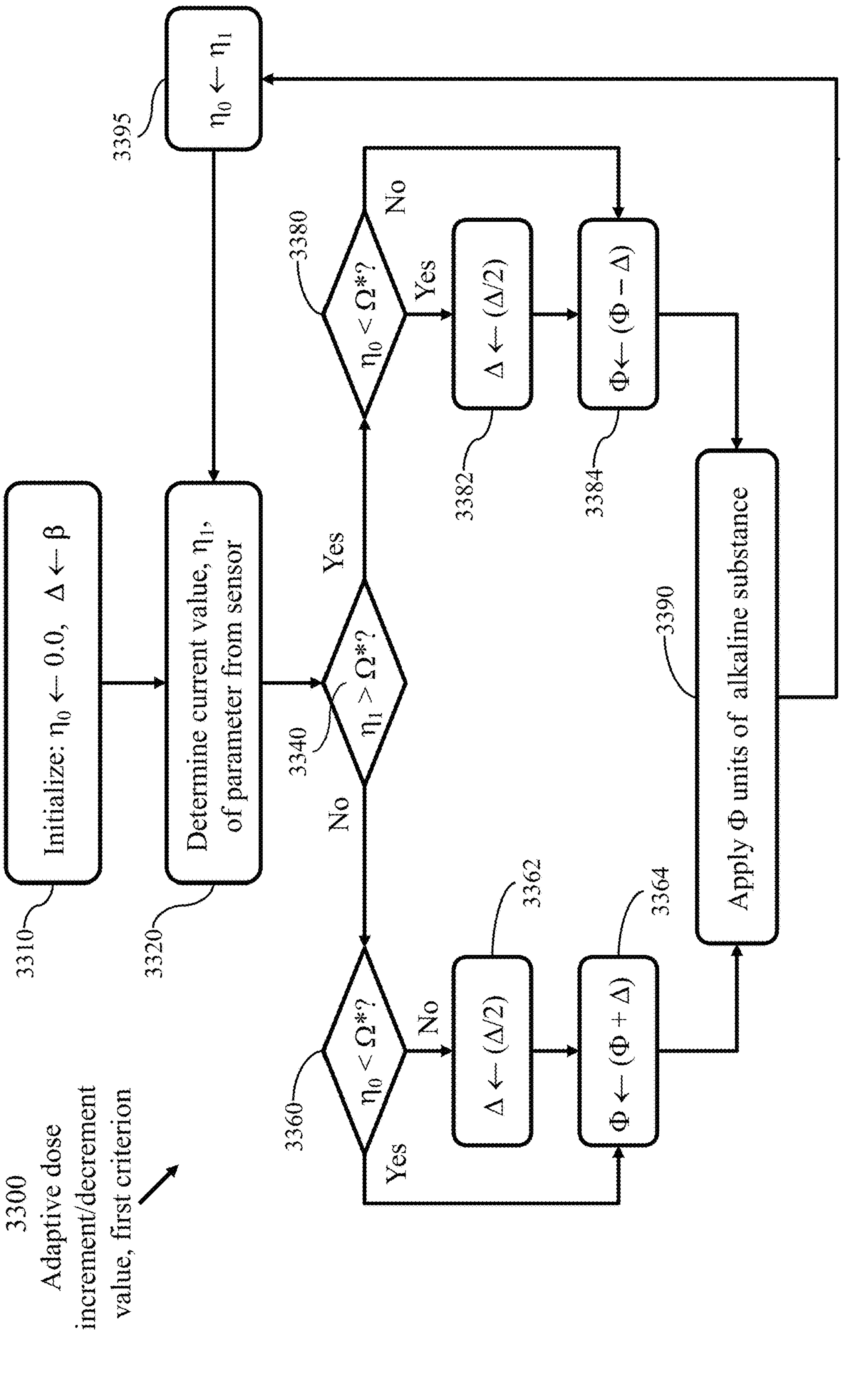
FIG. 33 illustrates a procedure for determining adaptive dose increments and decrements observing a single-reference value for each designated parameter, in accordance with an embodiment of the present invention.

FIG. 31 illustrates an exemplary application 3100 of kernel algorithm of FIG. 28, with the reference interval set to zero, and with adaptive magnitudes of dose increments and decrements determined according to the algorithm of FIG. 33.

As in the case of FIG. 29, a first dose of $\beta$ units is applied at time $t_0$. The values of doses applied at $t_1$, $t_2$, $t_3$, $t_4$ are the same as those determined in the case of FIG. 29.

At time $t_5$, the signal from the sensor is processed and a corresponding value of the parameter, $\Omega_5$, is determined to be larger than $\Omega^*$. Thus, at instant $t_5$, the dose is decreased from its value of 1000 at $t_4$ to $(1000-0.5\times\beta)=900$, according to process 2862 and process 3384 (FIG. 33). At instant $t_6$, the value $\Omega_6$ of the parameter is determined to be less than $\Omega^*$. Hence, the dose applied at $t_6$ is increased from its value 900 at $t_5$ to $(900+0.5\times\beta)=950$, according to process 2870 and process 3364 (FIG. 33). The dose values gradually settles to an appropriate value and corresponding values of the parameter continue to gradually approach $\Omega^*$ until any of relevant conditions, such as changes in the composition of the raw water, causes a deviation of the parameter value from $\Omega^*$ to exceed a predefined threshold at which point algorithm 3300 is restarted with process 3310 re-initializing the magnitude $\Delta$ of dose change to equal the predefined nominal value $\beta$.

Figure 32:
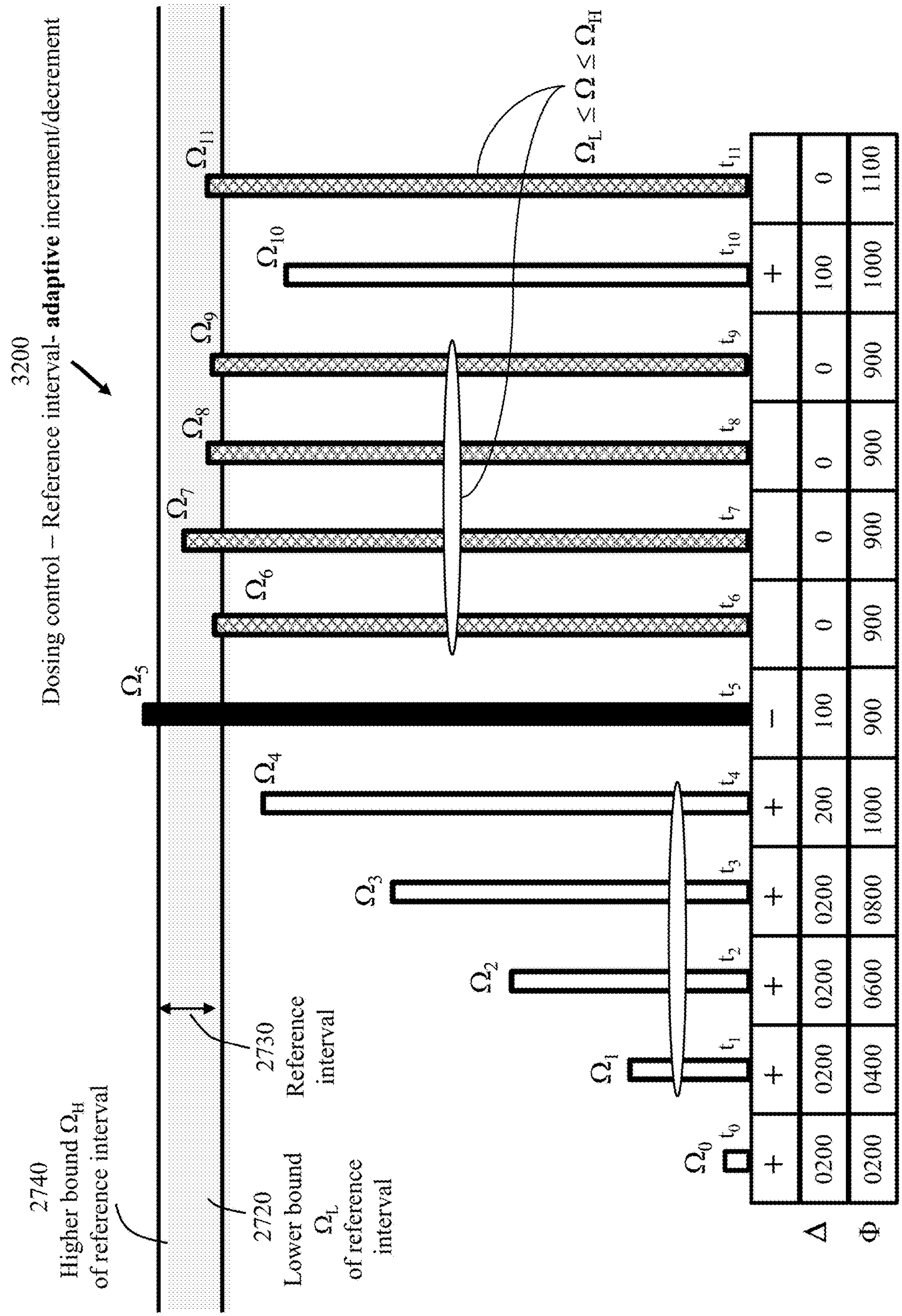
FIG. 32 illustrates an exemplary application of the kernel algorithm of FIG. 28 with a specified positive width of the reference interval and adaptive values of dose increments and decrements.
Figure 34:
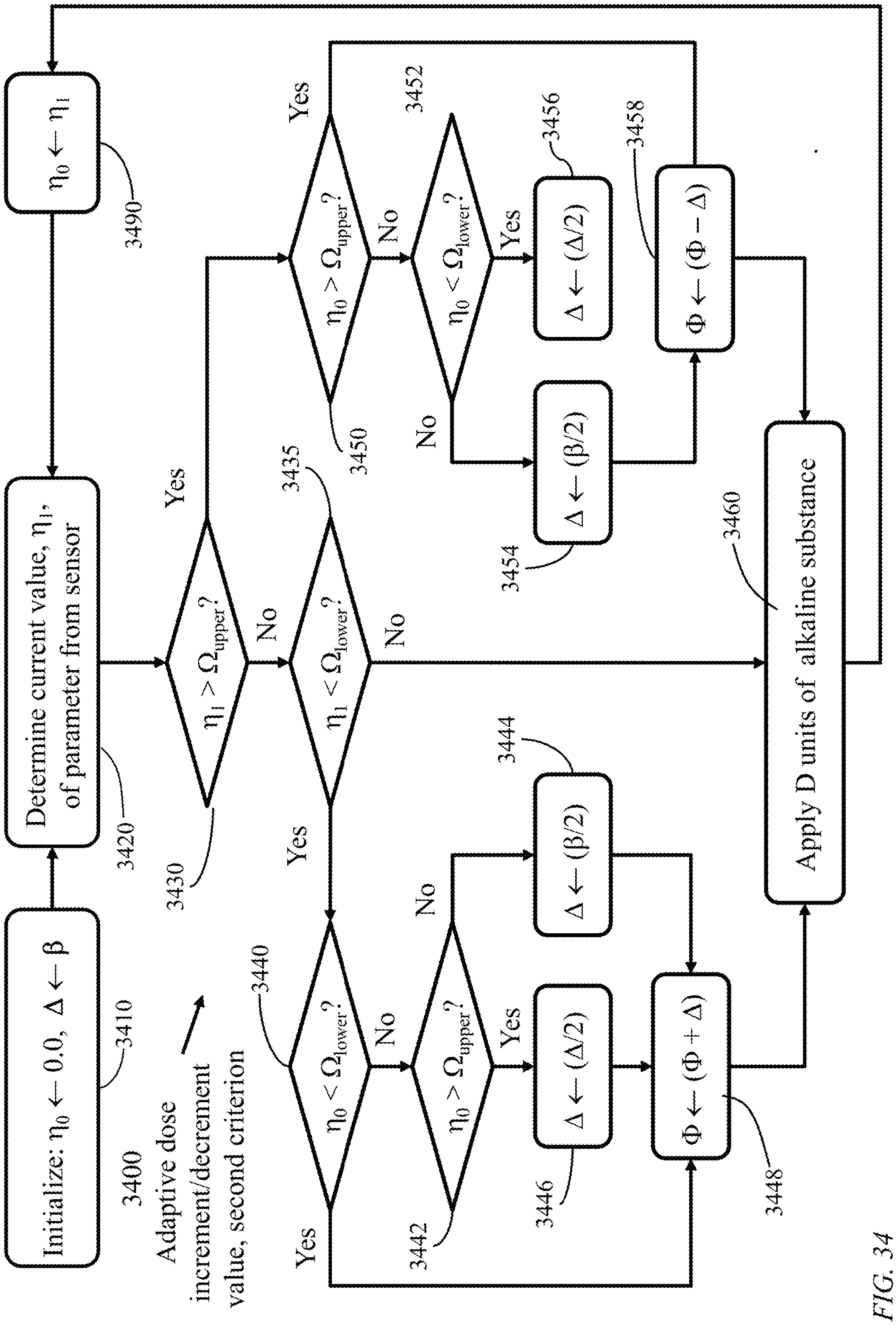
FIG. 34 illustrates a procedure for determining adaptive dose increments and decrements observing a reference interval of permissible values of each designated parameter, in accordance with an embodiment of the present invention.

FIG. 32 illustrates an exemplary application 3200 of the kernel algorithm of FIG. 28 with a specified positive width of the reference interval and adaptive magnitudes of dose increments and decrements determined according to the algorithm of FIG. 34.

As in the case of FIG. 30, upon starting a dosing operation starting with parameter $\Omega_0$ at $t_0$, the dose values at instants $t_1$, $t_2$, $t_3$, and $t_4$ and corresponding values of the parameter before reaching the reference interval 2730 are the same as those indicated in FIG. 30.

At time instant $t_5$, the signal from the sensor is processed and a corresponding value of the parameter, $\Omega_5$, is determined to be larger than $\Omega_H$. Thus, at instant $t_5$, the dose value is decreased from its value of 1000 at $t_4$ to $(1000-0.5\times\beta)=900$, according to process 2862, 3456, and 3458. At instant $t_6$, the value $\Omega_6$ of the parameter is determined to be within the reference interval 2730. Hence, the dose applied at $t_6$ remains unchanged from its value of 900 at $t_5$, according to process 2852. Likewise, at instants $t_7$, $t_8$, and $t_9$ the dose value remains constant at 900 units. At instant $t_{10}$, the value $\Omega_{10}$ of the parameter is determined to be below $\Omega_L$ while the value of $\Omega_9$ is within the reference interval 2730, hence the dose value is increase from 900 to $(900+0.5\times\beta)$, which is 1000, according to processes 2870, 3444, and 3448.

The algorithms of FIG. 33 and FIG. 34 apply to adaptive magnitude of dose-value changes at dosing instants $t_j$, $j>0$. In both figures, $\eta_0$ and $\eta_1$ denote successive values of the determined parameters so that: $\eta_1=\Omega_j$, $\eta_0=\Omega_{(j-1)}$, for all positive integer values of j representing successive indices of monitoring instants of time.

FIG. 33 illustrates an algorithm 3300 for determining adaptive dose increments and decrements observing a single-reference value for each designated parameter. Process 3310 initializes $\eta_0$ to equal 0.0 and the magnitude $\Delta$ of a dose-value change to equal the preset value $\Delta$, selected to be 200 units in the examples of FIG. 29 to FIG. 32.

Process 3320 determines a current value of $\eta_1$, which starts with $\Omega_j$, j=1, based on a sensor's signal. Process 3340 branches to process 3380 if $\eta_1$ is greater than single reference value $\Omega^*$ or branches to process 3360 otherwise.

Process 3360 branches to process 3364 which increases the dose value according to a current value of $\Delta$ subject to a determination that $\eta_0$ is less than $\Omega^*$ or branches to process 3362 if $\eta_0\geq\Omega^*$ where $\Delta$ is reduced half its current value before performing process 3364.

Process 3380 branches to process 3384 which decreases the dose value according to a current value of $\Delta$ subject to a determination that $\eta_0\geq\Omega^*$ or branches to process 3382 if $\eta_0$ is less than $\Omega^*$ where $\Delta$ is reduced half its current value before performing process 3384.

Process 3390 then applies the calculated value of the dose. Process 3395 sets $\eta_0$ to equal $\eta_1$ then revisits process 3320 to continue the process of determining dose values.

FIG. 34 illustrates an algorithm 3400 for determining adaptive dose increments and decrements observing a reference interval of permissible values of each designated parameter. Process 3410 initializes $\eta_0$ to equal 0.0 and the magnitude $\Delta$ of a dose-value change to equal the preset value $\beta$, selected to be 200 units in the examples of FIG. 29 to FIG. 32.

Process 3420 determines a current value of $\eta_1$, which starts with $\Omega_j$, j=1, based on a sensor's signal. Process 3430 branches to process 3450 if current value of $\eta_1$ is greater than the upper bound value $\Omega_H$ or branches to process 3435 otherwise.

Process 3435 branches to process 3460 if the current value of $\eta_1$ is within the reference interval 2730. Otherwise, process 3435 branches to process 3440 which guides determination of a value of a dose increment. Process 3440 branches to process 3448 if the previous value $\eta_0$ of the parameter is less than $\Omega_L$. Process 3448 increases the dose value according to current value of $\Delta$ from $\Phi$ to $(\Phi+\Delta)$.

Process 3440 branches to process 3442 if the previous value $\eta_0$ of the parameter is equal to or greater than $\Omega_L$. If value $\eta_0$ is greater than $\Omega_H$, process 3442 branches to process 3446 which reduces the current value of $\Delta$ to $0.5\times\Delta$ then proceed to process 3448 to determine a new dose value. If value $\eta_0$ is within the reference interval 2730, process 3442 leads to process 3444 which resets the value of $\Delta$ to be half the preset value $\beta$ then proceed to process 3448 to determine a new dose value.

If $\eta_0$ is greater than $\Omega_H$. process 3450 branches to process 3458 which decreases the dose value from its current value $\Phi$ to $(\Phi-\Delta)$. Otherwise, process 3450 leads to process 3452. If $\eta_0$ is less than $\Omega_H$ process 3452 branches to process 3456 to reduce the value of $\Delta$ to $0.5\times\Delta$ before determining a new value of the dose in process 3458. If $\eta_0$ is within the reference interval 2730, process 3452 branches to process 3454 which resets $\Delta$ to equal half the preset value $\beta$ then leads to process 3458 to determine a new dose value.

This increases the dose value according to a current value of $\Delta$ subject to a determination that $\eta_0$ is less than $\Omega^*$ or branches to process 3362 if $\eta_0\geq\Omega^*$ where $\Delta$ is reduced half its current value before performing process 3364.

Process 3460 then applies the calculated value of the dose. Process 3490 sets $\eta_0$ to equal $\eta_1$ then revisits process 3320 to continue the process of determining dose values.

Figure 35:
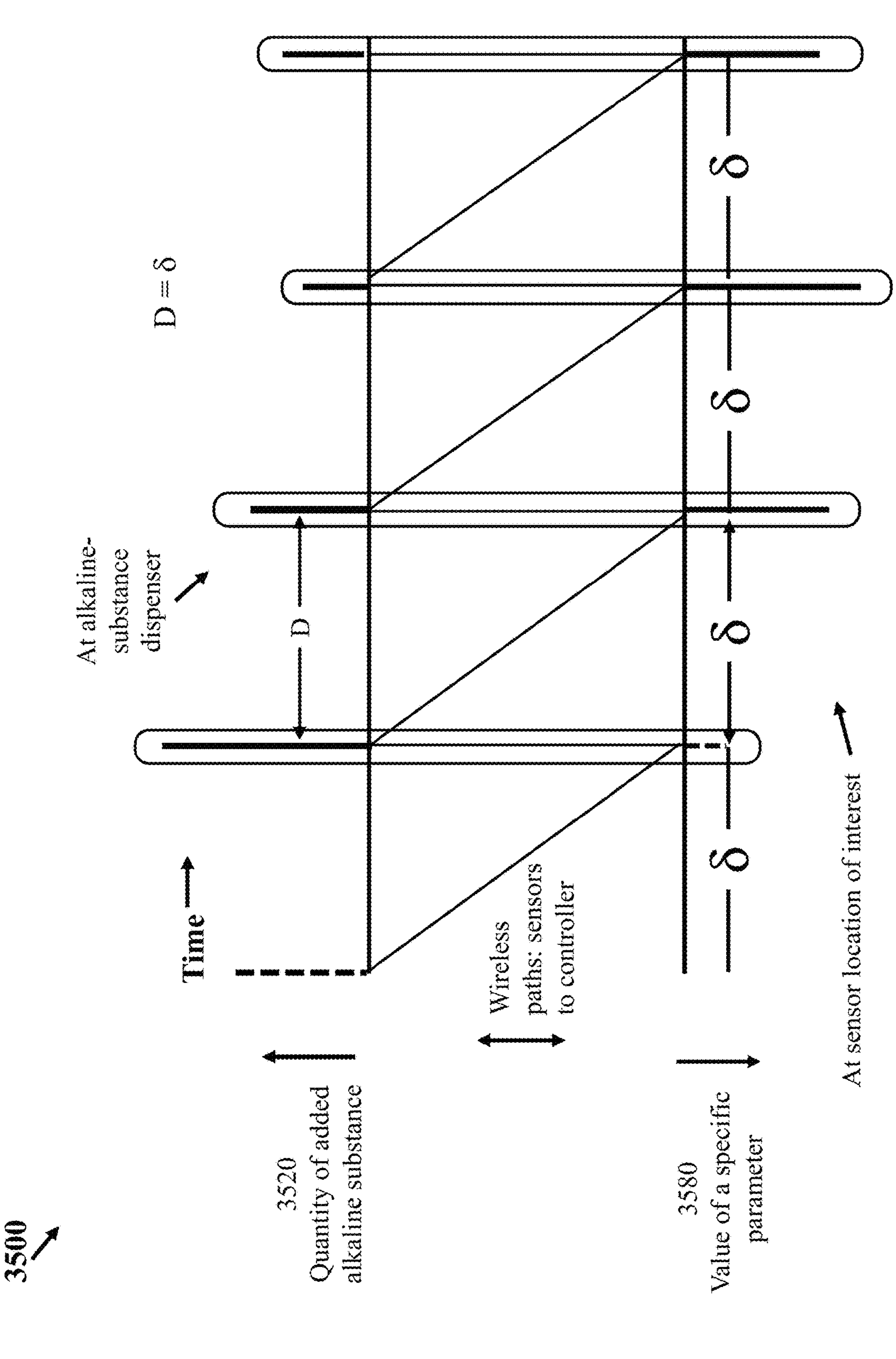
FIG. 35 illustrates dosing periodicity where inter-dose interval equals a known advection latency through a water-flow medium.

FIG. 35 illustrates dosing periodicity 3500 where an inter-dose interval equals a known advection latency through a water-flow medium. The dose amount 3520 (quantity of added alkaline substance) at each dosing instant and corresponding determined value 3580 of a parameter of interest at a subsequent monitoring instant are indicated.

Figure 36:
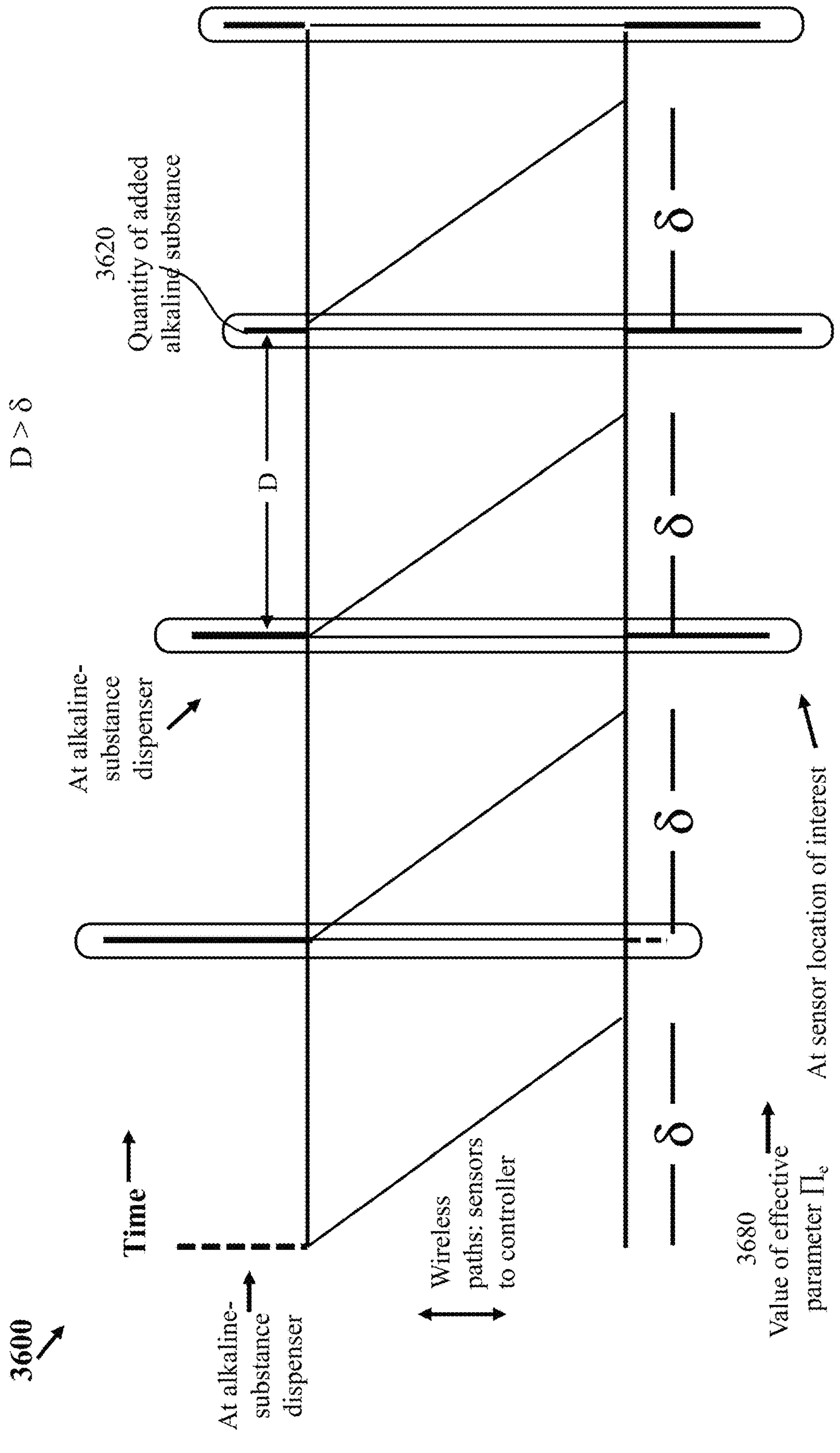
FIG. 36 illustrates dosing periodicity where inter-dose interval exceeds the known advection latency.

FIG. 36 illustrates dosing periodicity 3600 where inter-dose interval exceeds the known advection latency.

Figure 37:
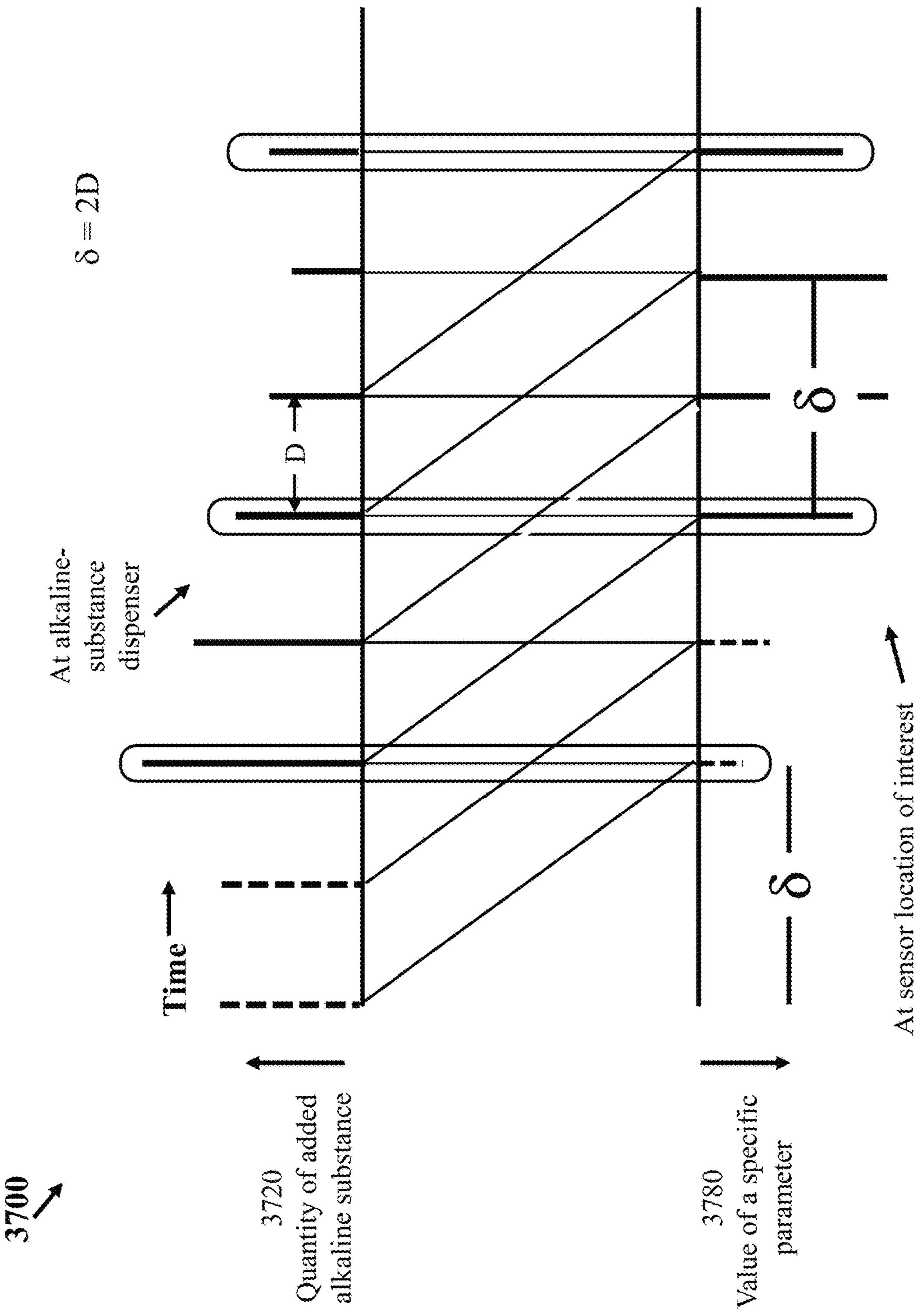
FIG. 37 Dosing periodicity where the inter-dose interval is half the known advection latency through a water-flow medium.

FIG. 37 illustrates dosing periodicity 3700 where the inter-dose interval is half the known advection latency through a water-flow medium.

Figure 38:
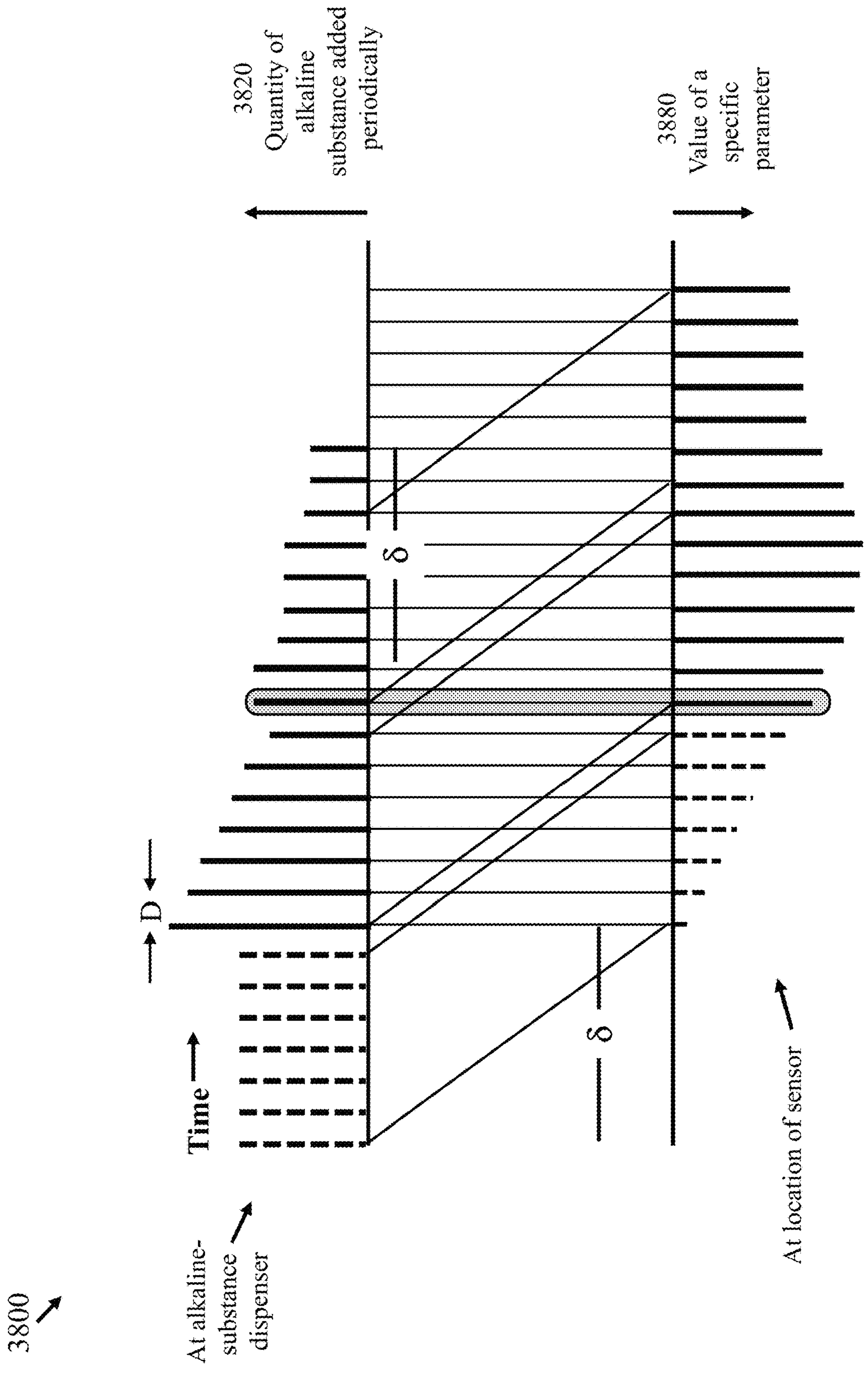
FIG. 38 illustrates dosing periodicity where the inter-dose interval is a small fraction of the known advection latency through a water-flow medium.

FIG. 38 illustrates dosing periodicity 3800 where the inter-dose interval is a small fraction of the known advection latency through a water-flow medium.

Figure 39:
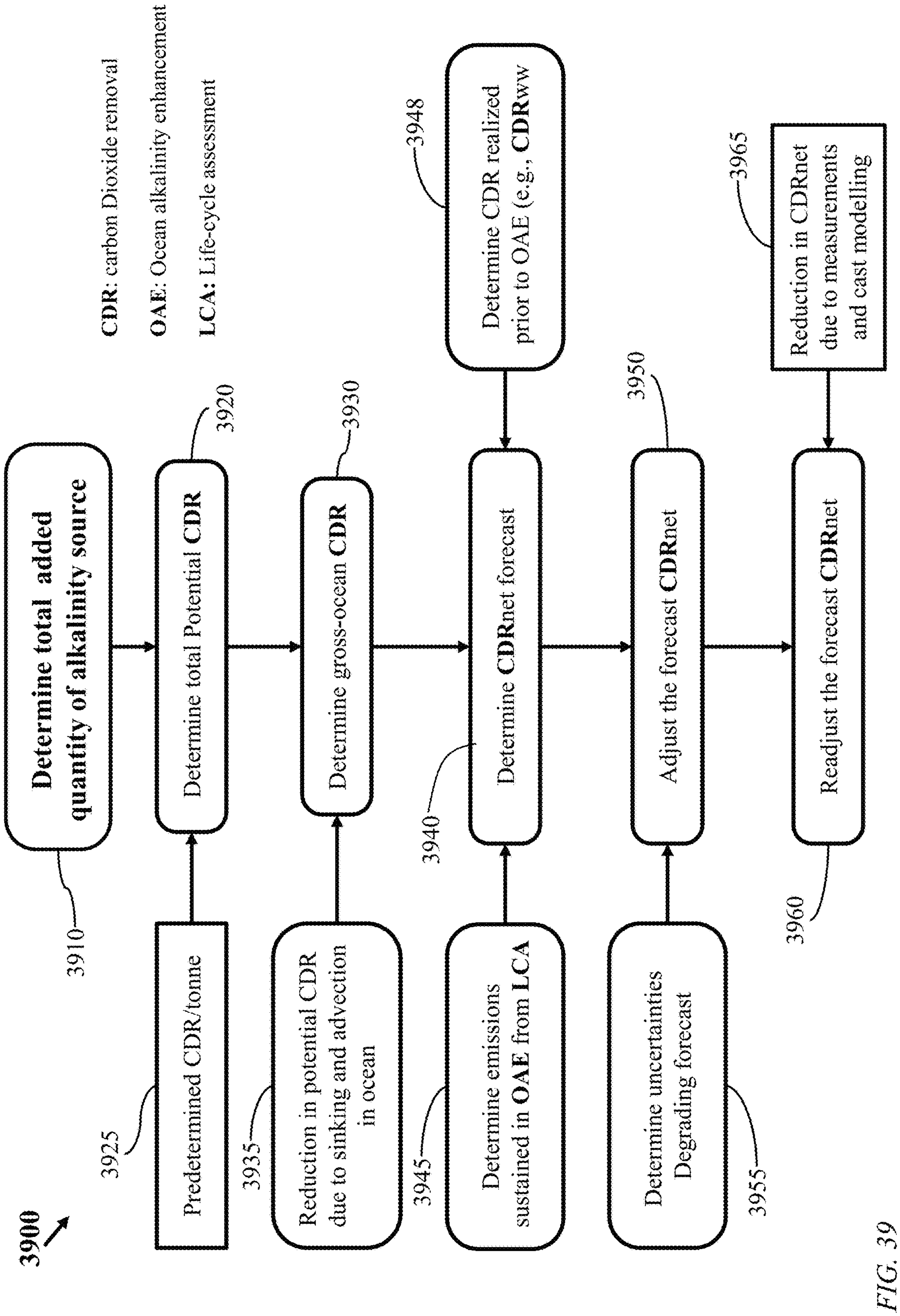
FIG. 39 illustrates steps of determining and refining CDR forecast.

FIG. 39 illustrates processes 3900 of determining and refining CDR forecast. Process 3910 determines the total added quantity of alkalinity substance. Process 3920 determines potential amount of CDR based on a predetermined CDR/tonne 3925 (based on analytical deduction or experimental data). Process 3940 determines a $CDR_{net}$ forecast based on determined emissions 3945 sustained in the CDR from $LCA_{emiss}$ and from any CDR occurring prior to alkalinity addition to a water body (e.g., $CDR_{ww}$) (see FIG. 7 to FIG. 10). Process 3960 readjusts the forecast based on known CDR reduction due to measurements and cast modelling.

Site Selection and Automation Process

Figure 40:
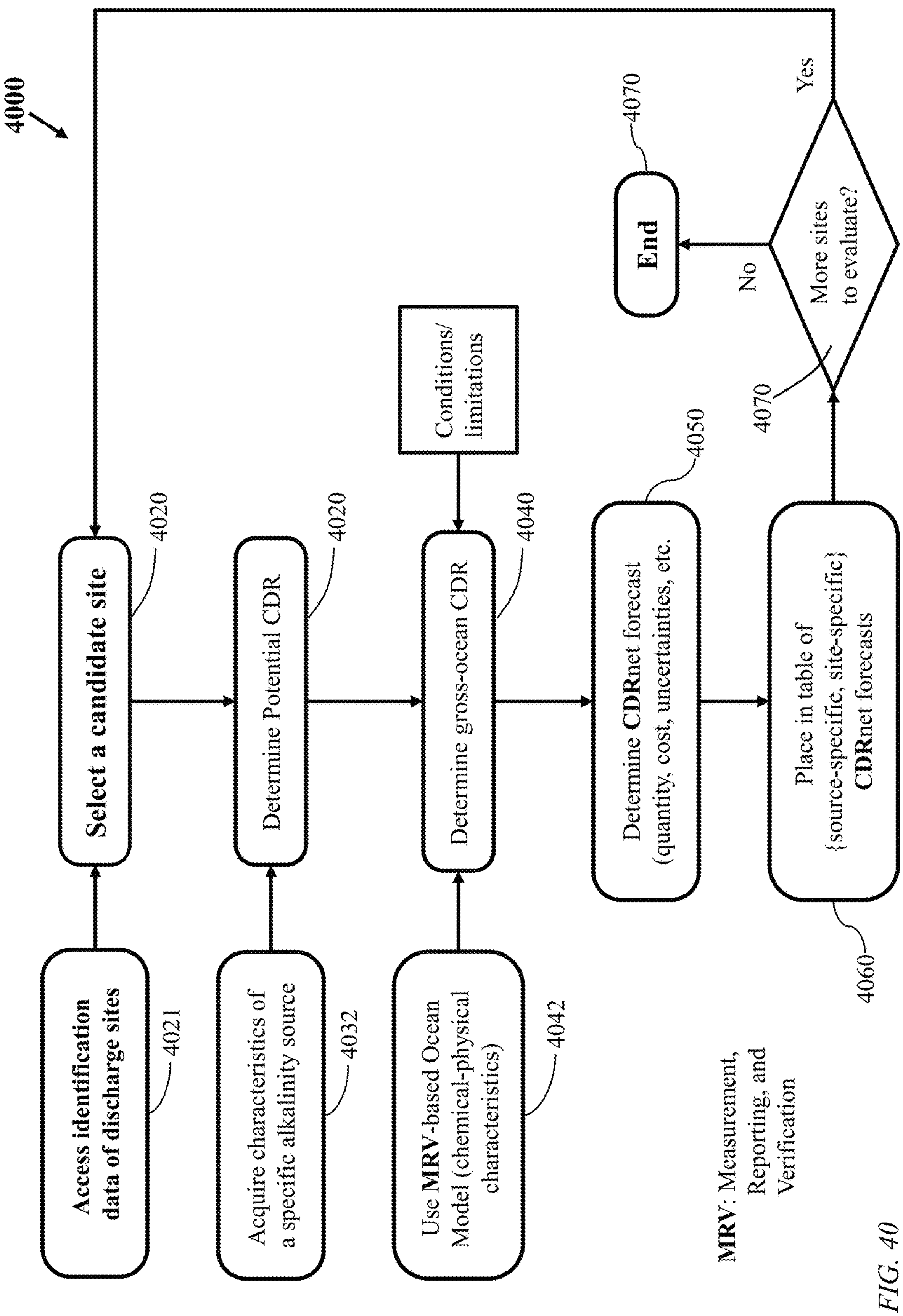
FIG. 40 illustrates selecting a site for application of a specific alkaline substance.

Site selection or conducting the CDR can be used to identify places that maximize the CDR performed while minimizing the cost of the CDR. This will be dictated by the cost, availability and $CO_2$ reactivity of alkalinity sources available (determined in the Alkalinity Selection and Supply activity) at a given site, the discharge rate and chemistry of a candidate alkalinity discharge stream (determined in a pre-alkalinity discharge MRV activity), the discharge permitting requirements of a given site, the chemistry and physics of the body of water into which the alkaline discharge is to be made and the $CO_2$ emissions associated with conducting the CDR. These features can be measured or modeled prior to alkalinity release to estimate the rate at which alkalinity could be discharged, the gross and net CDR achievable with that release per unit time, and the cost of the preceding activity at a given site. A model can be constructed that takes available information on alkalinity sources, discharge points, permitting requirements, water body (e.g., ocean) chemistry and circulation/mixing, and LCA emissions and generates an estimate of net CDR attainable per unit time, the cost of that net CDR, and the uncertainty of those estimates. The uncertainty can be determined by the sum of the statistical variances in each of the subcomponents of the contributing variables. In this way specific regions or locations can be evaluated for their potential CDR performance and cost prior to actual alkalinity release and thus potential sites prioritized for CDR activity. If data bases exist on potential sites, alkalinity sources, existing discharge characteristics, permitting and ocean conditions, then some or all of the selection process can be computer automated. FIG. 40 illustrates the site selection activity.

FIG. 40 illustrates a method 4000 of selecting a site for application of a specific alkaline substance. Process 4020 selects a candidate site from a source 4021 of information relevant to discharge sites. Process 4020 determines a potential CDR amount based on acquired characteristics 4032 of a specific alkalinity source. Process 4040 determines gross-ocean CDR based on an MRV-based ocean model 4042 of chemical-physical characteristics under certain conditions and limitations 4045. Process 4050 determines a CDRnet forecast. Process 4060 places forecast data in a table of forecasts. Process 4070 determines if there are more sites of interest to consider. If all sites of interest have been considered, the forecasts are considered to be complete. Otherwise, process 4020 is revisited.

Thus, methods and system for alkalizing a body of water that is in contact with the atmosphere, measuring the carbon dioxide uptake and storage, and a dosing station therefor have been described.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A computer implemented method for Carbon Dioxide Removal (CDR) from the atmosphere using a body of water that is in contact with the atmosphere, the method comprising:

(1) setting an amount of $CO_2$-reactive alkalinity to be added to the body of water, and a rate of dispensing of the amount to the body of water, the amount of $CO_2$-reactive alkalinity being less than a target amount;

(2) dispensing the amount of the $CO_2$-reactive alkalinity in the body of water at the rate of dispensing;

(3) during said dispensing, monitoring the body of water by one or more sensors, and adjusting the rate of dispensing so as to ensure measurements of said one or more sensors are within respective predetermined limits;

(4) estimating a CDR achieved by said dispensing, according to a chemical mass stoichiometry of carbon dioxide reaction with the $CO_2$-reactive alkalinity;

(5) adjusting the estimated CDR from the step (4) by taking into account a $F_{equil}$ factor, indicating a fraction of alkalized, $CO_2$-depleted water equilibrated with air, thus determining an adjusted CDR;

(6) determining a cumulative amount of the $CO_2$-reactive alkalinity that has been dispensed over time to the body of water; and (7) if the cumulative amount of the $CO_2$-reactive alkalinity is less than a predetermined target amount of alkalinity to be dispensed to the body of water, repeating the steps (1) to (6) until the predetermined target amount of alkalinity has been dispensed;

thereby removing carbon dioxide from the atmosphere.

2. The method of claim 1, further comprising:

before the step (1), setting a target CDR;

after the step (5), determining a cumulative adjusted CDR; and in the step (7), further verifying if the cumulative adjusted CDR is less than the target CDR, and repeating the steps (1) to (6) until the earlier of: the predetermined target amount of alkalinity has been dispensed or the target CDR has been achieved.

3. The method of claim 1, further comprising:

(5a) further adjusting the adjusted CDR by taking into account a $F_{hback}$ factor indicating a degree of uncertainty of the adjusted target CDR, thereby determining a further adjusted CDR, the step (5a) being performed after the step (5).

4. The method of claim 3, wherein the CDR of the step (5a) is determined as follows:

$CDR=(t\ alkalinity\ added \times t\ CO_2\ removed/t\ alkalinity)\times(F_{equil}-F_{hback})$, wherein "t" is amount measured in tonnes (metric tons).

5. The method of claim 3, further comprising:

(5b) further adjusting the further adjusted CDR of the step (5a) by taking into account a $CDR_{ww}$ achieved within a wastewater pipe prior to discharge to said body of water, wherein $CDR_{ww}$ is determined under assumption that unalkalized wastewater is supersaturated in $CO_2$ relative to air, the step (5b) being performed after the step (5a).

6. The method of claim 5, wherein the CDR of the step (5b) is determined as follows:

$CDR=[((t\ alkalinity\ added \times t\ CO_2\ removed/t\ alkalinity)-CDR_{ww})\times(F_{equil}-F_{hback})]+CDR_{ww}$ wherein "t" is amount measured in tonnes, and $F_{hback}$ is a factor, indicating a degree uncertainty of the adjusted target CDR of the step (5).

7. The method of claim 5, further comprising:

(5c) further adjusting the CDR of the step (5b) by taking into account carbon dioxide emissions that occurred during production, transportation and distribution of the $CO_2$-reactive alkalinity.

8. The method of claim 7, wherein the CDR of the step (5c) is determined as follows:

$CDR_{net}=[((t\ alkalinity\ added \times t\ CO_2\ removed/t\ alkalinity)-CDR_{ww})\times(F_{equil}-F_{hback})]+CDR_{ww}-LCA_{emiss}$, wherein "t" is amount measured in tonnes.

9. The method of claim 1, wherein the $CO_2$-reactive alkalinity is a metal hydroxide (metric tons).

10. The method of claim 9, wherein the metal hydroxide is a monovalent metal hydroxide.

11. The method of claim 9, wherein the metal hydroxide is a polyvalent metal hydroxide.

12. The method of claim 1, wherein the $CO_2$-reactive alkalinity is magnesium hydroxide.

13. The method of claim 1, wherein the step (5) further comprises determining the $F_{equil}$ factor by adding a chemical tracer mixed with the $CO_2$-reactive alkalinity, and monitoring a downstream concentration of the chemical tracer at specified locations in the body of water.

14. The method of claim 13, wherein the step (5) further comprises determining the $F_{equil}$ factor using a partial carbon dioxide pressure $pCO_{2air}$ in the air above the alkalized body of water, and a partial pressure of carbon dioxide $pCO_{2ocean}$ of the alkalized body of water.

15. The method of claim 14, wherein the step (5) comprises determining the $F_{equil}$ factor as follows:

$$F_{equil}=(Gas_{ex}-CDR_{loss})/Gas_{ex}$$

where $Gas_{ex}$ is a rate of air-water gas exchange, $CDR_{loss}$ is a rate of removal of $CO_2$ undersaturated water to depths out of contact with the atmosphere, and where $GAS_{ex}>CDR_{loss}$.

16. The method of claim 1, wherein said one or more sensors are capable of measuring one or more of the following characteristics of the body of water:

Temperature (T);

Salinity (S);

Pressure (depth);

pH, a measure of $H^+$ concentration;

$pCO_2$, partial pressure of $CO_2$;

TSS, total suspended solids;

$NH_3$, ammonia concentration;

DIC, total dissolved inorganic carbon; and

TA, total alkalinity concentration.

17. The method of claim 1, wherein the body of water is one or more of the following:

seawater;

the ocean;

a body of water that discharges into the ocean;

a wastewater discharge;

a discharge of cooling water from an industrial facility;

a natural or artificial reservoir of water.

18. The method of claim 1 wherein said adjusting the rate of dispensing further comprises:

dispensing the amount of $CO_2$-reactive alkalinity to the body of water in doses, at predetermined time intervals;

measuring respective water properties by said one or more sensors, at the predetermined time intervals; and for a next dose, regulating a magnitude of the next dose as a function of two successive measurements of said one or more sensors, respective pre-defined lower bounds and pre-defined upper bounds of said one or more sensors.

19. A system for Carbon Dioxide Removal (CDR) from the atmosphere using a body of water that is in contact with the atmosphere, the system comprising:

a dosing station, comprising:

a reservoir containing dissolved, partially dissolved or undissolved, $CO_2$-reactive alkalinity;

a dispenser for dispensing the $CO_2$-reactive alkalinity in the body of water;

a controller comprising:

a processor;

a memory device;

computer executable instructions stored in the memory device, for execution by the processor, causing the processor to:

(1) set an amount of $CO_2$-reactive alkalinity to be added to the body of water, and a rate of dispensing of the amount of $CO_2$-reactive alkalinity to the body of water, the amount of $CO_2$-reactive alkalinity being less than a target amount;

(2) dispense the amount of the $CO_2$-reactive alkalinity in the body of water at the rate of dispensing;

(3) during dispensing, monitor the body of water by one or more sensors, and adjust the rate of dispensing so as to ensure measurements of said one or more sensors are within respective predetermined limits;

(4) estimate a CDR achieved by the dispensing, according to a chemical mass stoichiometry of carbon dioxide reaction with the $CO_2$-reactive alkalinity;

(5) adjust the estimated CDR from (4) by taking into account a $F_{equil}$ factor, indicating a fraction of alkalized, $CO_2$-depleted water equilibrated with air, thus determining an adjusted CDR;

(6) determine a cumulative amount of the $CO_2$-reactive alkalinity that has been dispensed over time to the body of water; and (7) if the cumulative amount of the $CO_2$-reactive alkalinity is less than a predetermined target amount of alkalinity to be dispensed to the body of water, repeat the steps (1) to (6) until the predetermined target amount of alkalinity has been dispensed;

thereby removing carbon dioxide from the atmosphere.

20. The system of claim 19, wherein the computer executable instructions further cause the processor to:

before (1), set a target CDR;

after (5), determine a cumulative adjusted CDR; and in (7), further verify if the cumulative adjusted CDR is less than the target CDR, and repeat the steps (1) to (6) until the earlier of: the predetermined target amount of alkalinity has been dispensed or the target CDR has been achieved.

21. The system of claim 18, further comprising a floating platform having a hull for holding the $CO_2$-reactive alkalinity, for delivering and disposing a required amount of the $CO_2$-reactive alkalinity in the body of water.

22. A system for Carbon Dioxide Removal (CDR) from the atmosphere using a body of water that is in contact with the atmosphere, the system comprising:

a dosing station, comprising:

a reservoir containing dissolved, partially dissolved or undissolved, $CO_2$-reactive alkalinity;

a dispenser for dispensing, at a required rate, a required amount of the $CO_2$-reactive alkalinity in the body of water for achieving a permissible target CDR from the atmosphere;

a controller comprising:

a processor;

a memory device;

computer executable instructions stored in the memory device, for execution by the processor, causing the processor to determine the required amount of the $CO_2$-reactive alkalinity and the permissible target CDR, comprising:

setting a target CDR;

(i) estimating an amount of the $CO_2$-reactive alkalinity to be added to the body of water for achieving the target CDR as determined by mass chemical stoichiometry of carbon dioxide reaction with the $CO_2$-reactive alkalinity;

(ii-1) adjusting the target CDR by taking into account a $F_{equil}$ factor, indicating a fraction of alkalized water equilibrated with air, thus determining an adjusted target CDR and a corresponding adjusted amount of $CO_2$-reactive alkalinity;

(iii) monitoring the body of water by one or more sensors, and further limiting the adjusted amount of the $CO_2$-reactive alkalinity and the adjusted target CDR so as to ensure measurements of said one or more sensors are within respective predetermined limits when the further adjusted amount of the $CO_2$-reactive alkalinity is dispensed in the body of water over the given time interval, thus determining a further adjusted amount of the $CO_2$-reactive alkalinity and a corresponding further adjusted target CDR;

(iv) setting the further adjusted amount of $CO_2$-reactive alkalinity as the required amount, and the further adjusted target CDR as the permissible target CDR, and determining the required rate of dispensing over the given time interval based on the permissible target CDR and the respective predetermined limits of measurements of said one or more sensors; and (v) dispensing the required amount of the $CO_2$-reactive alkalinity in the body of water at the required rate, thereby achieving the permissible target CDR from the atmosphere in the given time interval.

* * * * *